US012345064B2

(12) United States Patent
Dresch et al.

(10) Patent No.: US 12,345,064 B2
(45) Date of Patent: *Jul. 1, 2025

(54) WIND-RESISTANT ADJUSTABLE SHADE SHELTER

(71) Applicants: John J. Dresch, Chapin, SC (US); Jaclyn L. Dresch, Chapin, SC (US)

(72) Inventors: John J. Dresch, Chapin, SC (US); Jaclyn L. Dresch, Chapin, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/530,173

(22) Filed: Dec. 5, 2023

(65) Prior Publication Data

US 2024/0344350 A1   Oct. 17, 2024

Related U.S. Application Data

(63) Continuation of application No. 18/075,368, filed on Dec. 5, 2022, now Pat. No. 11,834,857, which is a continuation of application No. 17/157,856, filed on Jan. 25, 2021, now Pat. No. 11,519,194, which is a continuation of application No. 16/579,828, filed on Sep. 23, 2019, now Pat. No. 10,900,249, which is a continuation-in-part of application No. 15/702,737, filed on Sep. 12, 2017, now Pat. No. 10,422,152, which is a continuation of application No.
(Continued)

(51) Int. Cl.
*E04H 15/58* (2006.01)
*E04H 15/14* (2006.01)
*E04H 15/16* (2006.01)
*E04H 15/46* (2006.01)
*E04H 15/50* (2006.01)
*E04H 15/54* (2006.01)
*E04H 15/64* (2006.01)
*A01G 13/21* (2025.01)

(52) U.S. Cl.
CPC ............. *E04H 15/14* (2013.01); *E04H 15/16* (2013.01); *E04H 15/46* (2013.01); *E04H 15/50* (2013.01); *E04H 15/54* (2013.01); *E04H 15/58* (2013.01); *E04H 15/64* (2013.01); *A01G 13/21* (2025.01)

(58) Field of Classification Search
CPC ......... E04H 15/14; E04H 15/16; E04H 15/54; E04H 15/64; A01G 13/0206
USPC .............................. 135/93, 94; 47/29.5, 31.1
See application file for complete search history.

(56) References Cited

U.S. PATENT DOCUMENTS 1,114,057 A * 10/1914 Spalding ................. E04B 7/166
                                                        135/90
2,118,474 A *  5/1938 Morton ................. E04H 15/003
                                                        135/93
(Continued)

FOREIGN PATENT DOCUMENTS

DE      20313601 U1 *  2/2001

*Primary Examiner* — Robert Canfield
(74) *Attorney, Agent, or Firm* — John J. Dresch

(57) ABSTRACT

A portable shade shelter has a plurality of canopies including at least a first canopy and a second canopy. The first canopy is disposed over the second canopy, and the first canopy is capable of being spaced apart from the second canopy in a vertical direction such that air is capable of flowing between the first canopy and the second canopy. Each of the first canopy and the second canopy includes a plurality of openings configured to permit air and light to pass through the respective first canopy and second canopy.

20 Claims, 40 Drawing Sheets

Related U.S. Application Data

15/439,933, filed on Feb. 22, 2017, now Pat. No. 9,777,503.

(60) Provisional application No. 62/298,457, filed on Feb. 22, 2016.

(56) References Cited

U.S. PATENT DOCUMENTS

| | | | | |
|---|---|---|---|---|
| 3,581,436 A * | 6/1971 | Basiger | A01G 13/0206 160/24 |
| 3,863,660 A * | 2/1975 | Glaeser | A45B 25/20 135/33.7 |
| 4,452,230 A * | 6/1984 | Nelson | E04H 15/644 126/621 |
| 4,487,212 A * | 12/1984 | Moore | E04H 6/04 135/117 |
| 4,750,508 A * | 6/1988 | Tatoian | E04H 15/003 135/118 |
| 6,102,059 A * | 8/2000 | Miller | E04H 6/04 135/141 |
| 7,353,769 B2 * | 4/2008 | Unrast | E04H 6/025 114/361 |
| 8,006,956 B2 * | 8/2011 | Payne | B65D 88/125 254/286 |
| 9,598,147 B2 * | 3/2017 | Templeton | B63B 17/02 |
| 9,777,503 B2 * | 10/2017 | Dresch | E04H 15/14 |
| 10,655,357 B1 * | 5/2020 | Graham | E04H 15/30 |
| 10,900,249 B2 * | 1/2021 | Dresch | E04H 15/64 |
| 11,035,145 B2 * | 6/2021 | Smith | E04H 15/16 |
| 11,058,068 B1 * | 7/2021 | Gravel | A01G 9/12 |
| 2002/0189656 A1 * | 12/2002 | David | A45B 25/22 135/33.7 |
| 2004/0074154 A1 * | 4/2004 | Mangeard | A01G 9/222 52/3 |
| 2016/0340928 A1 * | 11/2016 | Kent | E04H 3/10 |
| 2019/0053440 A1 * | 2/2019 | Lysak | A01G 13/10 |
| 2022/0167569 A1 * | 6/2022 | Daios | A01G 13/0206 |
| 2022/0167570 A1 * | 6/2022 | Daios | A01G 13/0206 |
| 2024/0110664 A1 * | 4/2024 | Alvergue | E04F 10/08 |

\* cited by examiner

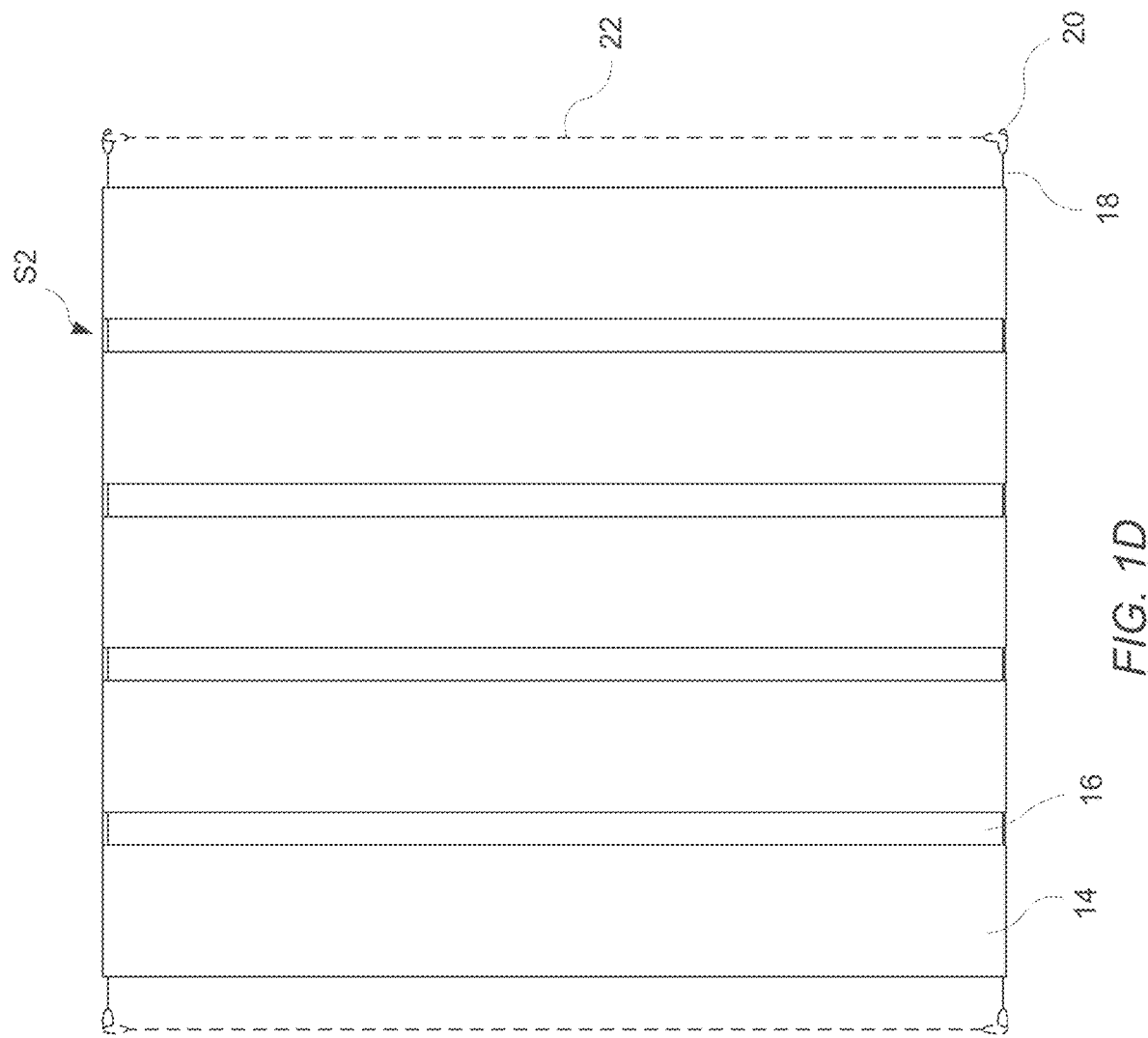

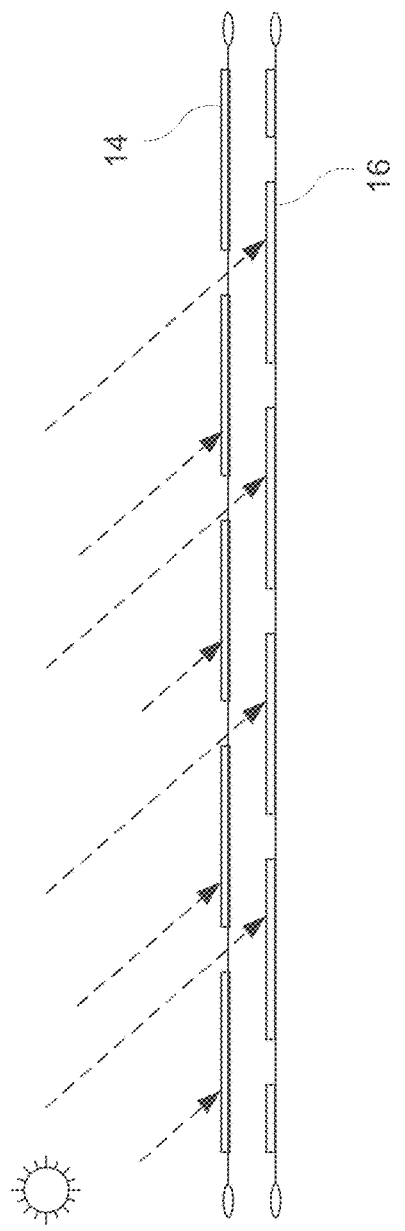
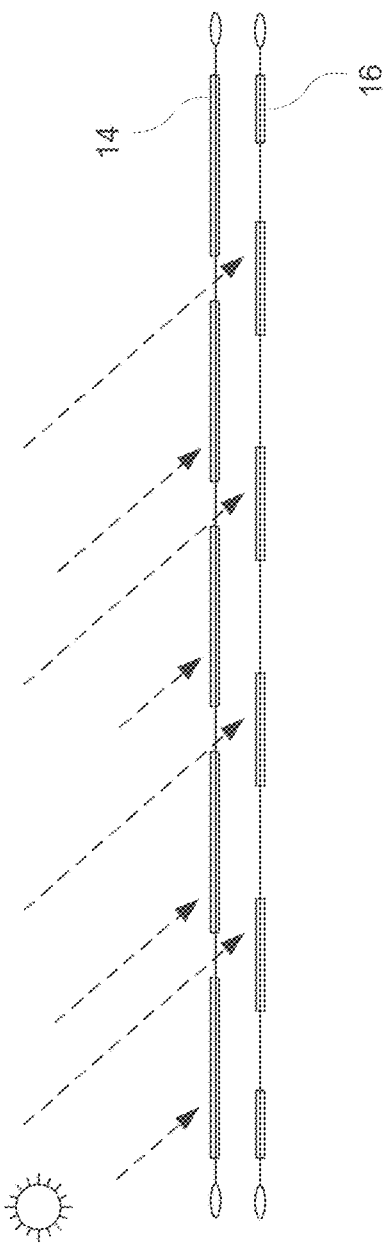
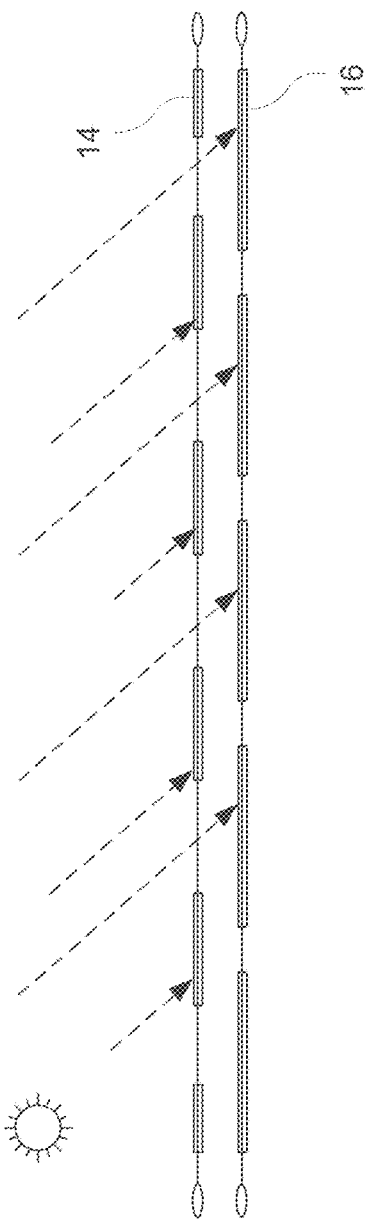

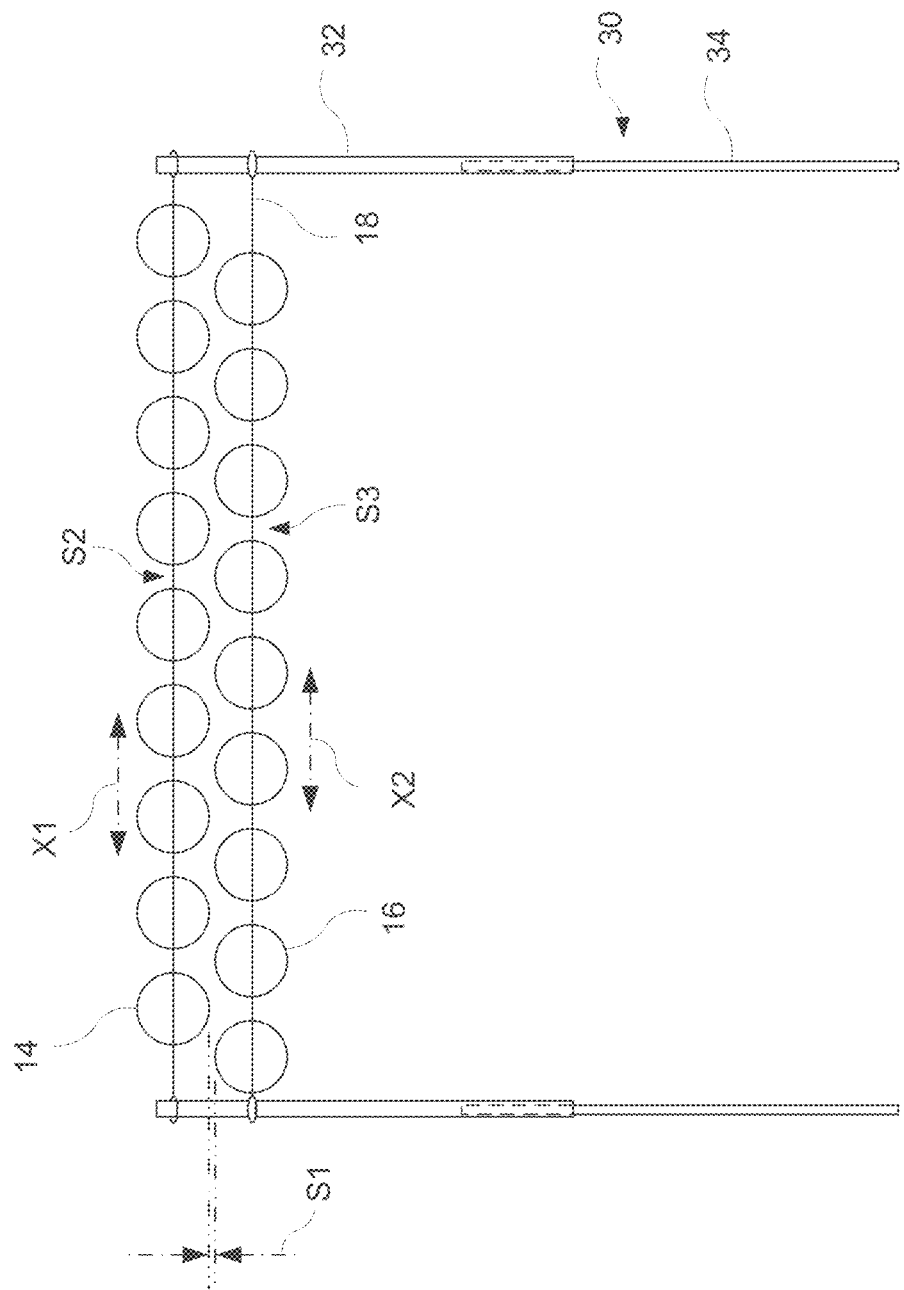

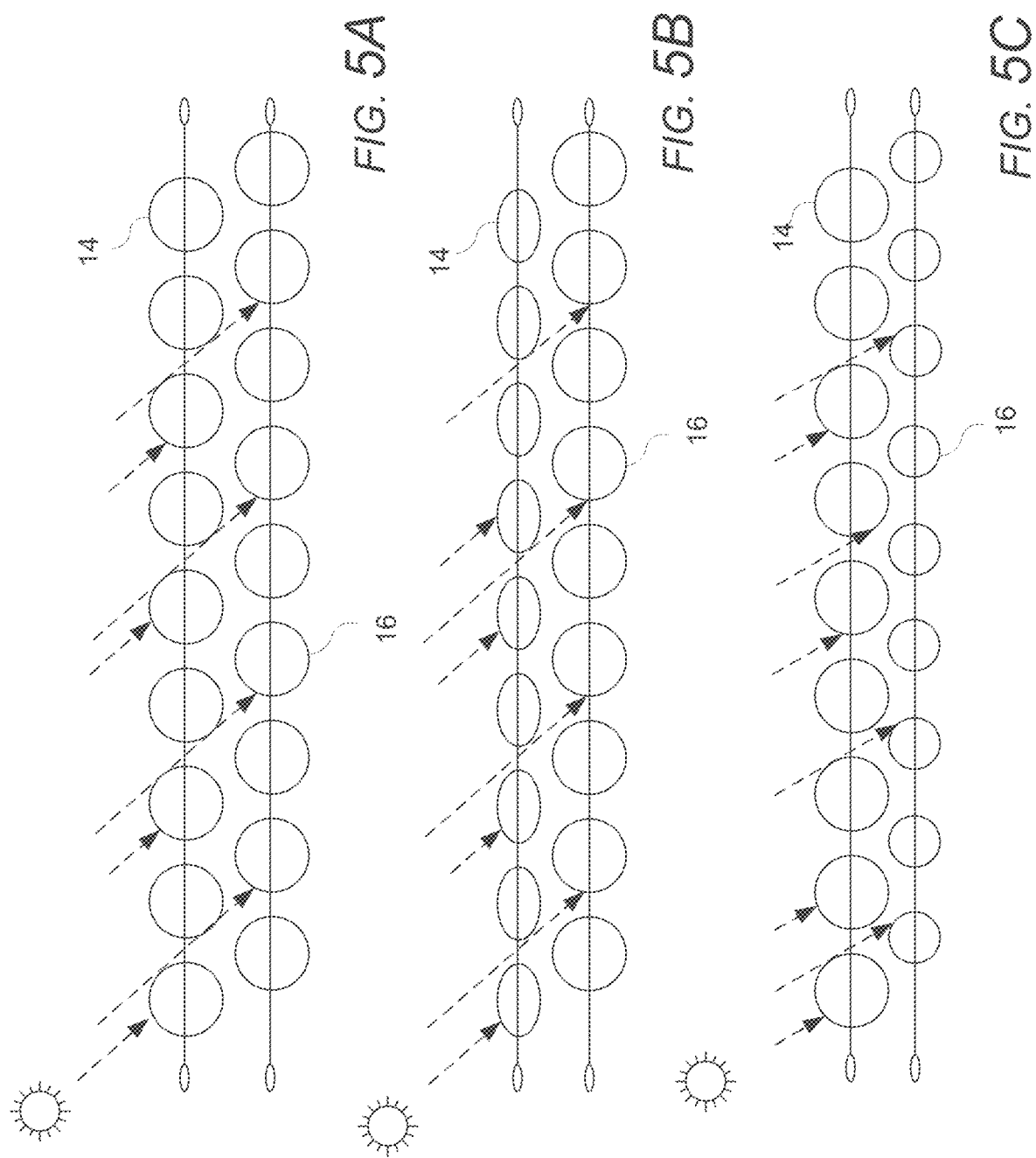

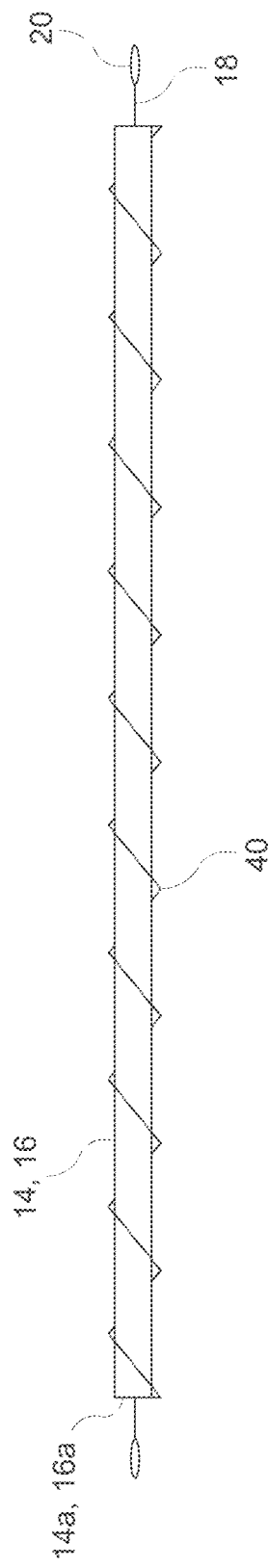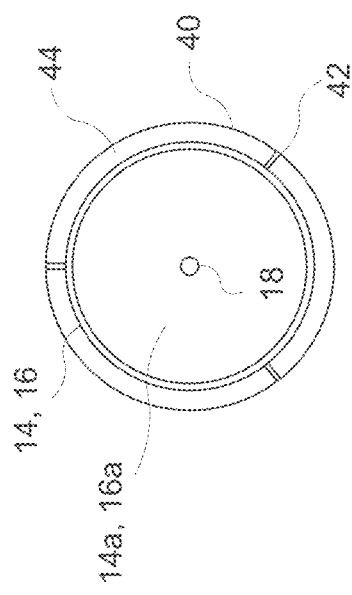
FIG. 6B
FIG. 6C

WIND-RESISTANT ADJUSTABLE SHADE SHELTER

CROSS-REFERENCE TO RELATED APPLICATIONS

The present invention is a Continuation Application under 35 U.S.C. § 120 of U.S. patent application Ser. No. 18/075,368 filed Dec. 5, 2022, now allowed, which is a Continuation Application of U.S. patent application Ser. No. 17/157,856 filed Jan. 25, 2021, now U.S. Pat. No. 11,519,194, issued Dec. 6, 2022, which is a Continuation Application of U.S. patent application Ser. No. 16/579,828 filed Sep. 23, 2019, now U.S. Pat. No. 10,900,249, issued Jan. 26, 2021, which is a Continuation-In-Part Application of U.S. patent application Ser. No. 15/702,737, filed Sep. 12, 2017, now U.S. Pat. No. 10,422,152, issued Sep. 24, 2019, which is Continuation Application under 35 U.S.C. § 120 of U.S. patent application Ser. No. 15/439,933, filed Feb. 22, 2017, now U.S. Pat. No. 9,777,503, issued Oct. 3, 2017, each of which claims the benefit of priority under 35 U.S.C. 119 (e) of U.S. Provisional Patent Application No. 62/298,457, filed Feb. 22, 2016, the entire contents of which are incorporated herein by reference in their entirety.

FIELD OF THE INVENTION

The present invention is directed to an adjustable shelter for providing shade, and more particularly, to an adjustable shelter for providing shade that has improved resistance to being lifted by wind.

BACKGROUND OF THE INVENTION

Many people enjoy outdoor activities or gatherings, such as picnics, camping, cook-outs, parties and celebrations such as weddings, receptions, graduation parties, birthday parties, etc., or relaxing at the beach. Restaurants and other businesses often provide outdoor seating or lounge areas where customers or visitors can relax, dine, or drink beverages while enjoying the outdoors. However, many people do not want to be exposed to direct sunlight and rain, and/or do not want food or supplies, etc., exposed to direct sunlight and rain. A variety of conventional portable and fixed structures and shelters have been used to provide protection or shelter from both direct sunshine and rain for users and other items, such as food, supplies, etc. Such portable structures typically are foldable or collapsible, while fixed structures typically are mounted or fixed to the ground, a deck surface, a patio surface, or building structure, etc. For example, a variety of umbrellas, tents, screened tents, cabanas, dome-shaped canopies, partial dome-shaped canopies, instant or portable canopies supported by metal frames, and other structures, such as sails supported by wires or ropes, have been provided to shelter persons from both direct sunlight and rain.

SUMMARY OF THE INVENTION

As will be explained in greater detail below, the present invention recognizes that conventional structures and shelters, whether portable or fixed/permanent structures, are designed to provide shelter from both rain and direct sunlight. As a result, conventional structures and shelters commonly are formed by a single canopy that guides or channels rain to the sides of the shelter, thereby protecting the area under the shelter from both rain and incident sunlight. However, the present invention recognizes that the emphasis of the conventional structures and shelters on providing protection from both rain and sunlight across a width of the structure increases the susceptibility of the conventional shelters to being rendered unstable when subjected to constant wind, high wind speeds, and/or wind gusts, etc. The present invention recognizes that, by deviating from conventional shelters which focus on rain protection, and instead focusing on improving airflow over the shelter and providing shade under and/or adjacent to the shelter, the present invention can provide a shade shelter that blocks all or a majority of incident sunlight from passing below the shade shelter, while at the same time permitting air to flow through the shade shelter, thereby minimizing forces exerted on the shelter and/or shelter frame when the shelter is subject to wind.

The present invention further recognizes that by permitting the amount of air to flow through the shade shelter to be adjustable, the present invention can provide a shade shelter that blocks all or a majority of incident sunlight from passing below the shade shelter, while at the same time being easily adjustable based on varying ambient conditions, such as a volume, speed, and/or direction of wind.

The present invention further recognizes that by enabling a user to selectively fix a height of each respective end of the lines of the canopies with respect to the frame, the present invention can provide a user with flexibility in selectively adjusting a height and/or angle of each of the canopies with respect to the frame, thereby enabling the user to independently select and optimize a position of each corner (e.g., each line) of each of the canopies depending on various factors such as an angle of the sun, a direction and magnitude of the wind, etc.

The present invention further recognizes that by coupling the canopies to the frame in a manner that transfers forces (e.g., lift forces and/or downforces) exerted on the canopies by air flow (e.g., wind) to the legs of the frame, for example, in an axial direction of the legs toward the ground, the present invention can increase downforce on the portable shelter and offsetting various forces applied to the canopies by wind and improving stability of the portable shelter.

An exemplary embodiment of the present invention comprises a portable shade shelter having a plurality of canopies including at least a first canopy and a second canopy, wherein the first canopy is disposed over the second canopy, wherein the first canopy is capable of being spaced apart from the second canopy in a vertical direction such that air is capable of flowing between the first canopy and the second canopy, and wherein each of the first canopy and the second canopy includes a plurality of openings configured to permit air and light to pass through the respective first canopy and second canopy. In this way, the present invention provides a shade shelter having a plurality of canopies that can cooperate to block all or a majority of direct sunlight from passing below the plurality of canopies, thereby providing a shaded area under and/or adjacent to the shelter similar to a canopy formed by a continuous sheet of material, while at the same time permitting air to flow horizontally though the vertical space or gap between the first and second canopies and permitting air to flow vertically through the openings in one or both of the first and second canopies, thereby minimizing forces exerted on the shelter and/or shelter frame when the shelter is subject to wind. The invention can provide a portable shelter having one or more of the canopies that provide improved air flow over the shelter while at the same time providing a shelter that is easily stowed, transported, and set up without tools, and that is lightweight, durable, and resistant to wind, sand, water, etc., as well as simple and economic to manufacture.

To provide a better understanding of the invention, a summary of the problems with the conventional designs recognized by the present invention along with the reasons for improving the structure and arrangement of shade shelters, and the corresponding advantages provided by the present invention will be explained in greater detail.

As explained above, during outdoor activities or gatherings, such as picnics, camping, cook-outs, parties and celebrations such as weddings, receptions, graduation parties, birthday parties, etc., sporting events, tailgating, or relaxing at the beach, many people do not want to be exposed to rain and direct sunlight, and/or do not want food or supplies, etc., exposed to rain and direct sunlight. A variety of conventional portable structures and shelters, such as umbrellas and conventional portable shelter, as shown for example in FIGS. 18A and 18B, have been used to provide protection or shelter from both rain and direct sunlight for users and other items, such as food, supplies, etc. Such portable structures typically include a foldable or collapsible frame 60 that supports a single layer canopy 70 thereon and can be transported or carried to the location of the outdoor activity or gathering, set up for protection from sunlight and rain, and then collapsed for carrying away. The expandable or collapsible metal frame 60 may include telescopic corner posts or legs 62, 64 and accordion sides 66 for supporting an elevated fabric canopy 70. The frame 60 and canopy 70 can form a shelter having, for example, a square or rectangular footprint. Common shelter sizes include, for example, 8 ft×8 ft, 10 ft×10 ft, 12 ft×12 ft, 10 ft×12 ft, etc., as well as much larger commercial-style shelters, for example for larger gatherings or events. The canopy 70 commonly is formed from a continuous material forming a roof 70a and side covers 70B that is water repellant or water resistant to provide shelter from rain and also blocks at least a portion of sunlight and/or ultraviolet light (UV) rays. The canopy 70 commonly is formed from a material such as canvas, nylon, or other fabric, etc.

While the single layer canopy of many of these conventional structures are capable of providing suitable shelter from direct sunlight and rain on a calm day, the present invention recognizes that such conventional structures and shelters may be rendered unstable when exposed to various levels of wind and can be lifted or dislodged from the ground by high winds or continuous wind, and in some cases, by gentle breezes or sudden gusts of wind on an otherwise windless day. The inability of such structures to withstand wind gusts, and in some cases low levels of wind speed, are an inconvenience for users and may also result in risk of bodily injury to the user(s) or others in the area. If such an instant or portable shelter is lifted or dislodged from the ground by wind, the structure may be carried or tumbled by the wind, in some cases over a long distance, thereby exposing the user or others in the area to a risk of being contacted or impacted by the structure or a part of the structure or mounting system of the structure, such as supporting poles, frames, mounting stakes, etc.

Several examples of conventional portable structures and shelters, such as umbrellas and conventional portable shelter, as shown for example in FIGS. 18A and 18B, will now be described.

For example, a variety of umbrella designs have been used to provide shelter from direct sunlight and rain. Conventional umbrellas commonly are difficult to mount securely in the ground and can be dislodged from the ground by wind, and in some cases, by gentle breezes or sudden gusts of wind on an otherwise windless day. The inability of such umbrellas to withstand wind, and in some cases low levels of wind speed, are an inconvenience for users and may also result in risk of bodily injury to the user or others in the area. For example, when an umbrella is dislodged from the ground (e.g., from the sand, when installed on a beach) by wind, the umbrella may be carried or tumbled by the wind over a distance, thereby exposing the user or others in the vicinity to a risk of being contacted or impacted by the umbrella or a part of the umbrella, such as the pointed support pole of the umbrella. The umbrella itself also may be damaged or even irreparably destroyed as the umbrella is subjected to the wind or tumbled by the wind. Even if the umbrella is not dislodged, the umbrella canopy may be susceptible to being blown inside out, which can startle a user and cause the user to have to turn the umbrella back into the correct position, which can be difficult to perform in high winds without the umbrella blowing inside out again.

A variety of umbrella designs have been provided, such as vented umbrellas, to release air pressure from under the canopy of the umbrella and reduce lift forces exerted on the umbrella by wind. A variety of materials have been provided for forming the single canopy of the umbrella, such as perforated materials or fabrics, canvas, nylon, etc., which may be more or less susceptible to permitting air to pass through the material. A variety of mounting systems also have been provided to increase an amount of force needed to lift am umbrella or dislodge an umbrella from the ground, such as screw-in bases which are mounted in the ground and hold the support shaft of the umbrella. Other common devices for increasing the required force to lift the umbrella include a cast iron base, a water-filled base, or a sand-filled base for increasing a mass of the umbrella assembly, thereby more securely mounting the umbrella on a patio, deck, etc. In other cases, the shaft of an umbrella may be inserted through an opening in a table or other furniture and secured with a base, such as a cast iron base. Other mounting systems may include tie lines having a first end coupled to the umbrella and a second end coupled to a stake (e.g., a screw-in or hammered-in stake). Still other mounting systems mount a part of the canopy itself to the ground, with the umbrella typically being disposed at an angled position such that one side of the umbrella contacts the ground. Many of these accessories can be heavy and difficult to transport or very time-intensive to set up, which typically is undesirable for a portable device.

Moreover, even if an umbrella design is capable of resisting wind, an umbrella typically casts a somewhat small and limited shadow, and therefore, only can provide shelter from direct sunlight for a limited number of people. Depending on the angle of the sunlight, the umbrella typically must be positioned at an angle with one side of the umbrella canopy being closer to the ground in order to project a shadow or shaded area. As a result, the umbrella canopy may obstruct a view of surrounding scenery for the user or others in the vicinity. Umbrellas typically do not provide enough clearance under the canopy for a user to walk or stand under the umbrella canopy, and therefore, a user may need to lean down or duck to get under the umbrella canopy, or remain in a seated or laying down position under the umbrella canopy to remain in the shade cast by the umbrella.

Other systems and designs have been provided to shelter users from direct sunlight and rain. For example, various tents, screened tents, cabanas, dome-shaped canopies, partial dome-shaped canopies, and other structures have been provided to shelter persons from direct sunlight and rain. These shelters may be metal-framed structures or pop-up style shelters, similar to camping tents. Other conventional systems and designs for providing shelter from direct sunlight and rain include a metal frame supporting an instant or portable canopy, such as the conventional shelter illustrated in FIGS. 18A and 18B.

Structures such as tents, cabanas, dome-shaped shelters, partial dome-shaped shelters, etc., typically cast a somewhat small and limited shadow and can only accommodate a limited number of people thereunder or in a shaded area provided by the canopy of the structure. These structures may obstruct a view of surrounding scenery for the user or others in the vicinity, and also typically do not provide enough clearance for a user to walk or stand under the canopy, and therefore, a user may need to lean down or duck to get under the canopy, or remain in a seated or laying down position under the canopy to remain in the shade cast by the canopy. Moreover, many structures such as tents, cabanas, dome-shaped shelters, partial dome-shaped shelters, etc. may retain warm or heated air, or stagnant air, under the canopy, which may result in an uncomfortable environment to a user. Structures such as instant or portable shelters with a rectangular or square-shaped canopy (such as the example shown in FIGS. 18A and 18B) typically are taller and may be capable of accommodating a person walking or standing under the canopy, and may cast a larger shadow and therefore accommodate more people (or other items such as food, supplies, tables, chairs, etc.) than umbrellas, tents, screened tents, cabanas, dome-shaped canopies, partial dome-shaped canopies, and other structures. However, such a large, continuous canopy commonly is more susceptible to forces from wind, which may cause the instant or portable canopy to lift from the ground, flip, or tumble.

Similar to umbrellas, these instant or portable structures typically are rendered unstable by exposure to various levels of wind and can be lifted or dislodged from the ground by high winds, and in some cases, by gentle breezes or sudden gusts of wind on an otherwise calm or windless day. In some circumstances, forces exerted by wind on the canopy can cause the structure to lift from the ground, for example, when the forces under or within the canopy exceed forces above or outside of the canopy. In other circumstances, forces exerted on the canopy by wind may cause the structure to collapse, fold, bend, or fracture parts of the support frame, for example, when the force above or outside of the canopy exceeds the forces under or within the canopy, thereby resulting in the frame losing some or all of its structural integrity such that the frame cannot support the canopy or to stand properly. For example, when the example conventional shelter shown in FIGS. 18A and 18B is subjected to constant wind, high wind speeds, or wind gusts, the forces exerted by the wind on the roof 70a and/or side covers 70b of the canopy 70 can cause the metal brackets and/or hinge parts of the accordion sides 66 to fatigue and eventually fold, bend, or fracture. Once this happens, the frame 60 may become unusable and the user typically will need to replace the entire shelter at great expense to the user.

The inability of such conventional shelters to tolerate wind, and in some cases low levels of wind speed, are not only an inconvenience and expensive for users, but the inability of such conventional shelters to tolerate wind also may result in risk of bodily injury to the user or others in the area. For example, when such an instant or portable shelter (such as the conventional shelter shown in FIGS. 18A and 18B) is lifted or dislodged from the ground by wind, the shelter may be carried or tumbled by the wind over a distance, thereby exposing the user or others to a risk of being contacted or impacted by the shelter or a part of the shelter, such as the metal support frame 60, support lines, mounting stakes, etc. On the other hand, when such a shelter is collapsed or folded by wind, the support frame 60 of the shelter may be damaged (e.g., bent, fractured, or broken), thereby hindering the ability of the support frame 60 to properly support the canopy 70, or in some cases rendering the frame 60 incapable of supporting the canopy 70, incapable of being collapsed for storage, or incapable of being reopened for future use. Similarly, the canopy 70 of the shelter may be damaged (e.g., cut, torn, etc.). As a result, a strong breeze or sudden wind may cause irreversible damage to either or both of the frame 60 or canopy 70, requiring either to be discarded. In some cases, the entire shelter may need to be discarded altogether, thereby resulting in inconvenience and expense to the user. The inconvenience and expense to the user may be compounded, for example, when damage occurs while a user is on vacation or away from home, resulting in the user having to take time away from their vacation to locate and purchase a new shelter from a local store or vendor.

A variety of mounting systems have been provided to increase an amount of force needed to lift or dislodge such structures from the ground. For example, a plurality of tie lines each can be coupled on one end to the structure and on the other end to a stake (e.g., a screw-in or hammer-in stake). A plurality of stakes that can be coupled to the frame or to various mounting points (e.g., loops, hooks, rings, etc.) on the legs of the frame. One or more sand bags can be coupled to the telescopic legs of the shelter to increase a mass of the shelter. However, these additional devices add to the weight of the portable shelter that needs to be transported and also to the amount of space required to transport the portable shelter, each of which typically is undesirable to a user. Moreover, while these additional mounting systems may resist movement of the shelter, such devices typically will not avoid fatigue and eventually folding, bending, or fracturing of the frame parts, such as the accordion sides 66 of the conventional shelter shown in FIGS. 18A and 18B, when the canopy of the shelter is subjected to constant wind, high wind speeds, or wind gusts.

The present invention recognizes that conventional portable shelters are designed to provide shelter from both rain and direct sunlight, and thus, typically have a single canopy that provides protection from rain. However, the present invention recognizes that the features of these conventional portable structures that enable the structure to provide protection from rain (e.g., the single, continuous canopy) also increase the susceptibility of the shelter to problems associated with exposure to wind.

These problems and others are addressed by the present invention, an exemplary embodiment of which comprises a portable shade shelter having a plurality of canopies including at least a first canopy and a second canopy, wherein the first canopy is disposed over the second canopy, wherein the first canopy is capable of being spaced apart from the second canopy in a vertical direction such that air is capable of flowing between the first canopy and the second canopy, and wherein each of the first canopy and the second canopy includes a plurality of openings configured to permit air and light to pass through the respective first canopy and second canopy. In this way, the present invention provides a shade shelter having a plurality of canopies that can cooperate to block all or a majority of direct sunlight from passing below the plurality of canopies, thereby providing a continuous shaded area under and/or adjacent to the shelter similar to a canopy formed by a continuous sheet of material, while at the same time permitting air to flow horizontally through the vertical space or gap between the first and second canopies and permitting air to flow vertically through the openings in one or both of the first and second canopies, thereby minimizing forces exerted on the shelter and/or shelter frame when the shelter is subject to wind. As a result, the portable shelter is less susceptible to being rendered unstable by exposure to various levels of wind. Moreover, the vertical space or gap between the first and second canopies and the openings in one or both of the first and second canopies can permit warm or heated air to escape from under the shelter, thereby minimizing or avoiding the trapping of hot or stagnant air under the canopy, which may result in a more comfortable environment to a user.

The present invention further recognizes that the angle of sunlight varies throughout any given day, at different times of the year, and in different geographical locations, etc. Moreover, the wind speed typically also varies throughout any given day, at different times of the year, and in different geographical locations, etc. However, conventional instant or portable shelters typically include a fixed or static canopy that is not movable or capable of being adjusted. Depending on the angle of the sunlight, the canopy may cast a limited shadow requiring frequent repositioning of chairs and other items under or around the canopy to remain in the shade provide by the canopy. One common technique employed by users is to lower the telescopic legs on one side of the support structure such that the entire structure leans to one side in order to better position the canopy to provide the desired shade, for example, when the sun is positioned lower in the sky. This technique also commonly is used to attempt to reduce an amount of air pressure under the canopy on windy days, to thereby reduce a risk of the shelter being blown over. As a result, a broad area of the canopy, and particularly the upstream facing surface of the roof of the canopy, may be may be subject to greater forces by the wind, which may exceed the limitations of parts of the support frame and cause a part of the support frame to collapse, fold, bend, or fracture. Additionally, the position of the canopy may obstruct a view of surrounding scenery for the user or others in the vicinity.

Each of the plurality of canopies is formed from a material such as canvas, nylon, or other fabric, etc. The material of the canopy is flexible such that the canopy can be folded, rolled, or the like to pack the canopy into a small space for transporting the shelter from one place to another. The material of the canopy may be resilient such that the canopy can be coupled to the frame of the shelter in a stretched position, thereby minimizing or preventing sagging of the canopy between the parts of the support frame. The material of the canopy may provide a predetermined amount of UV protection or include a secondary material, film, or coating for providing a predetermined amount of UV protection. The embodiments also may provide increased UV protection (e.g., a greater sun protection factor [SPF] rating) beyond the UV protection of the individual material of each canopy since a plurality of canopies are arranged above each other, and thereby providing multi-layer (e.g., dual layer) protection against UV rays.

These problems and others are addressed by the present invention, an exemplary embodiment of which comprises a portable shade shelter having a plurality of canopies in which a position of at least one of the first canopy and the second canopy is adjustable. For example, at least one of the first canopy and the second canopy can be configured to be moveable toward and/or away from the other of the first canopy and the second canopy to change an amount of space between the first canopy and the second canopy and/or to change an angle of the first canopy with respect to the second canopy. In this way, the present invention provides a portable shelter having a plurality of canopies (e.g., independent and separate canopies) that are capable of being adjusted (e.g., independently adjusted) to compensate for various angles of sunlight, various wind speeds, etc.

Depending on the angle of the sunlight on the shelter, one or more of the canopies can be moved toward or away from another canopy in a vertical direction and/or moved with respect to another canopy in a horizontal direction to block any sunlight that is not being blocked by another canopy, thereby enabling the canopy to cast a continuous shadow below or adjacent to the shelter. Moreover, one or more of the canopies can be positioned at an angle with respect to another canopy and/or with respect to the ground. For example, one or more of the canopies can be positioned in a parallel arrangement with respect to each other and/or with respect to the ground, or one or more canopies can be positioned at an angle with respect to another canopy and/or with respect to the ground, thereby enabling the canopy to cast a continuous shadow below or adjacent to the shelter. In this way, a user can simply and easily adjust and vary the arrangement of one or more of the canopies to compensate for a variety of sun angles to thereby maximize an amount of shade provided by the shelter. Since the canopies have openings and are not continuous sheets of material, the present invention may provide increased visibility of surrounding scenery for the user or others in the vicinity through the openings in the canopies and gaps between the canopies.

Similarly, when little or no wind speeds are present, one or more of the canopies can be moved toward another canopy to substantially close off the space or gap between the canopies, such that the plurality of separate canopies cooperate to simulate a continuous canopy. When higher wind speeds are present, one or more of the canopies can be moved away from another canopy to increase a size of the space or gap between the canopies, thereby permitting a greater volume of air to pass through the space between the canopies and reducing forces exerted on the shelter by the wind. One or more of the canopies can be positioned in a parallel arrangement with respect to each other and/or with respect to the ground, or one or more canopies can be positioned at an angle with respect to another canopy and/or with respect to the ground. In this way, a user can simply and easily adjust and vary the arrangement of the canopies to compensate for a variety of wind conditions to thereby reduce the forces exerted on the shelter by the wind. Since the canopies have openings and are not continuous sheets of material, the present invention may provide increased visibility of surrounding scenery for the user or others in the vicinity through the openings in the canopies and spaces between the canopies. The present invention provides a portable shelter having a plurality of canopies (e.g., independent and separate canopies) that are capable of being adjusted (e.g., independently adjusted) to compensate for various angles of sunlight, various wind speeds, etc.

The exemplary embodiments of the invention can be configured to be mounted on a frame that is configured specifically to support the plurality of canopies. However, the exemplary embodiments of the invention also can be configured to be mounted on a frame that is intended to support a conventional canopy, thereby permitting the shelter having a plurality of canopies according to the invention to be substituted for a conventional, one piece or continuous canopy, which may minimize costs to a user and permit a conventional frame to be converted into a wind resistant shelter.

As mentioned, the shelter can include a plurality of canopies. For example, the shelter can have a dual canopy arrangement including a first canopy and a second canopy. Other arrangements are possible in which the shelter includes three or more canopies.

In an exemplary embodiment, one or more of the canopies (e.g., a first canopy) can be formed from a plurality of co-planar, parallel panels, which are spaced apart from each other by a predetermined distance extending in a plane of the first canopy, thereby forming openings or spaces between the panels of the first canopy. A second canopy can be formed from a plurality of co-planar, parallel panels, which are spaced apart from each other by a predetermined distance in a plane of the second canopy, thereby forming openings or spaces between the panels of the second canopy. The panels of the second canopy can be offset by a predetermined distance from the panels of the first canopy. Accordingly, when the first canopy and the second canopy are mounted on the support frame, the first canopy can be arranged over the second canopy in a vertical direction. The panels of the first canopy can be aligned over the openings or spaces in the second canopy, and the panels of the second canopy can be aligned below the openings or spaces in the first canopy, thereby casting a continuous shade area while permitting air to flow in the horizontal space between the canopies and to flow vertically between the panels of each canopy.

The panels of each canopy can have other configurations, shapes, and/or sizes within the spirit and scope of the invention.

For example, one or more of the canopies (e.g., a first canopy) can be formed from a plurality of co-planar, parallel tubulars, which are spaced apart from each other by a predetermined distance, thereby forming openings or spaces between the tubulars. As with the planar panels, when the first canopy and the second canopy are mounted on a support frame, the tubulars of the first canopy can be aligned over the opening or spaces in the second canopy, and the tubulars of the second canopy can be aligned below the openings or spaces in the first canopy, thereby casting a continuous shade area while permitting air to flow between the canopies and between the tubulars of each canopy. The size and shape of the tubulars are not limited to a particular design, and can include, for example, a tubular having a circular cross-section or a tubular having an oval cross-section.

One or more of the tubulars can include one or more helical strakes along a portion of, or all of, a longitudinal length of the tubular. The helical strakes can be continuous or intermittent along portions of the longitudinal length of the tubular. Additionally or alternatively, one or more of the tubulars can include one or more tail fairings along a portion of, or all of, a longitudinal length of the tubular. The fairings can be rotating or fixed fairings, continuous or intermittent fairings, long or short fairings, etc. In this way, the present invention may be capable of suppressing vortex-induced vibration (VIV) resulting from air (wind) flowing over the tubulars.

The tubulars can be configured to be collapsed (e.g., like an accordion) and tied or restrained in the collapsed position for transporting. The plurality of tubulars can be interconnected such that after the tubular are collapsed, the tubulars can be folded over on each other to provide compact storage. The helical strakes may assist with retaining the circular cross-section of the tubulars in both a stowed and expanded position. The helical strakes also may assist with unfolding or deploying the tubulars, owing to the elasticity of the helical strakes, such that the tubulars will spring into shape when untied or removed from a storage case in a manner similar to children's fabric play tunnels. In this way, the invention can provide a portable shelter having one or more of the canopies formed by a plurality of hollow fabric tubulars to provide improved air flow over the canopies while at the same time providing a shelter that is easily stowed, transported, and set up without tools, and that is lightweight, durable, and resistant to wind, sand, water, etc., as well as simple and economic to manufacture.

In other examples, one or more of the canopies (e.g., a first canopy) can be formed from a plurality of co-planar, parallel airfoils, which are spaced apart from each other by a predetermined distance, thereby forming openings or gaps between the airfoils. As with the planar panels, when the first canopy and the second canopy are mounted on a support frame, the airfoils of the first canopy can be aligned over the openings or spaces in the second canopy, and the airfoils of the second canopy can be aligned below the openings or spaces in the first canopy, thereby casting a continuous shade area while permitting air to flow between the canopies and between the airfoils of each canopy. The size and shape of the airfoils are not limited to a particular design, and can include, for example, an unsymmetrical airfoil or a symmetrical airfoil. The airfoil can be a laminar flow airfoil, circular arc airfoil, double wedge airfoil, etc.

For purposes of this disclosure, the term "portable frame" means a frame configured to support a canopy, wherein the frame is capable of being expanded or easily assembled without tools for supporting the canopy, and capable of being collapsed or easily disassembled without tools and transported, for example, by hand-carrying or in a rolling bag.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 1D is a plan view of a plurality of canopies for a portable shelter, according to an exemplary embodiment of the invention

FIGS. 2A-2F are schematic side views of a portable shelter having a plurality of canopies, according to exemplary embodiments of the invention, with a portion of the frame parts removed for clarity.

FIG. 4C is a side view of the portable shelter having a plurality of canopies according to the exemplary embodiment of FIG. 4B, with a portion of the frame parts removed for clarity and with at least one of the canopies adjusted into another position.

FIGS. 5A-5C are schematic first side views of a portable shelter having a plurality of canopies, according to exemplary embodiments of the invention with the frame parts removed for clarity.

FIG. 6B is a side view of a canopy of the portable shelter according to the exemplary embodiment of FIG. 6A.

FIG. 6C is an end view of a part of the canopy of the portable shelter according to the exemplary embodiment of FIG. 6A.

DETAILED DESCRIPTION OF THE EXEMPLARY EMBODIMENTS OF THE INVENTION

Figure 1A:
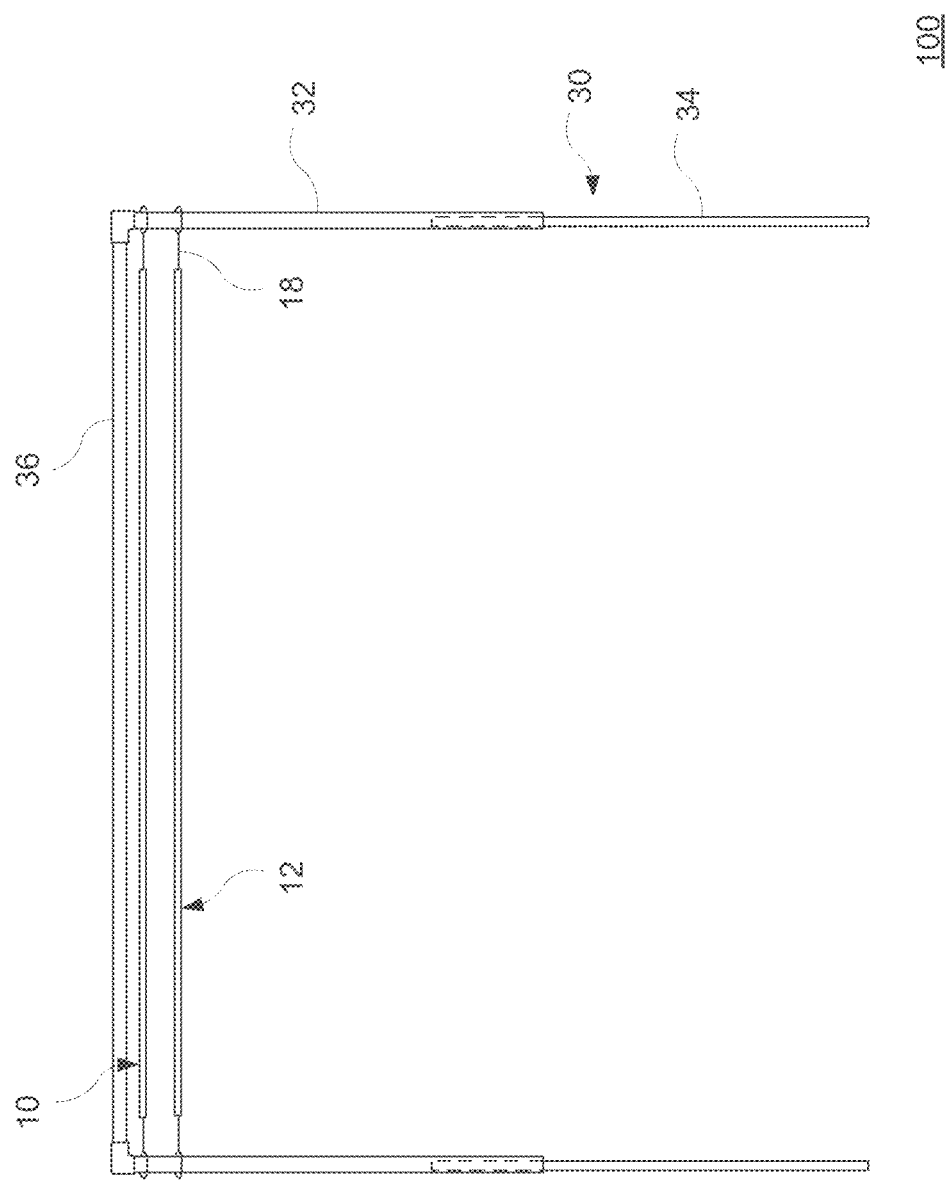
FIG. 1A is a first side view of a portable shelter having a collapsible frame and a plurality of canopies, according to an exemplary embodiment of the invention.
Figure 1B:
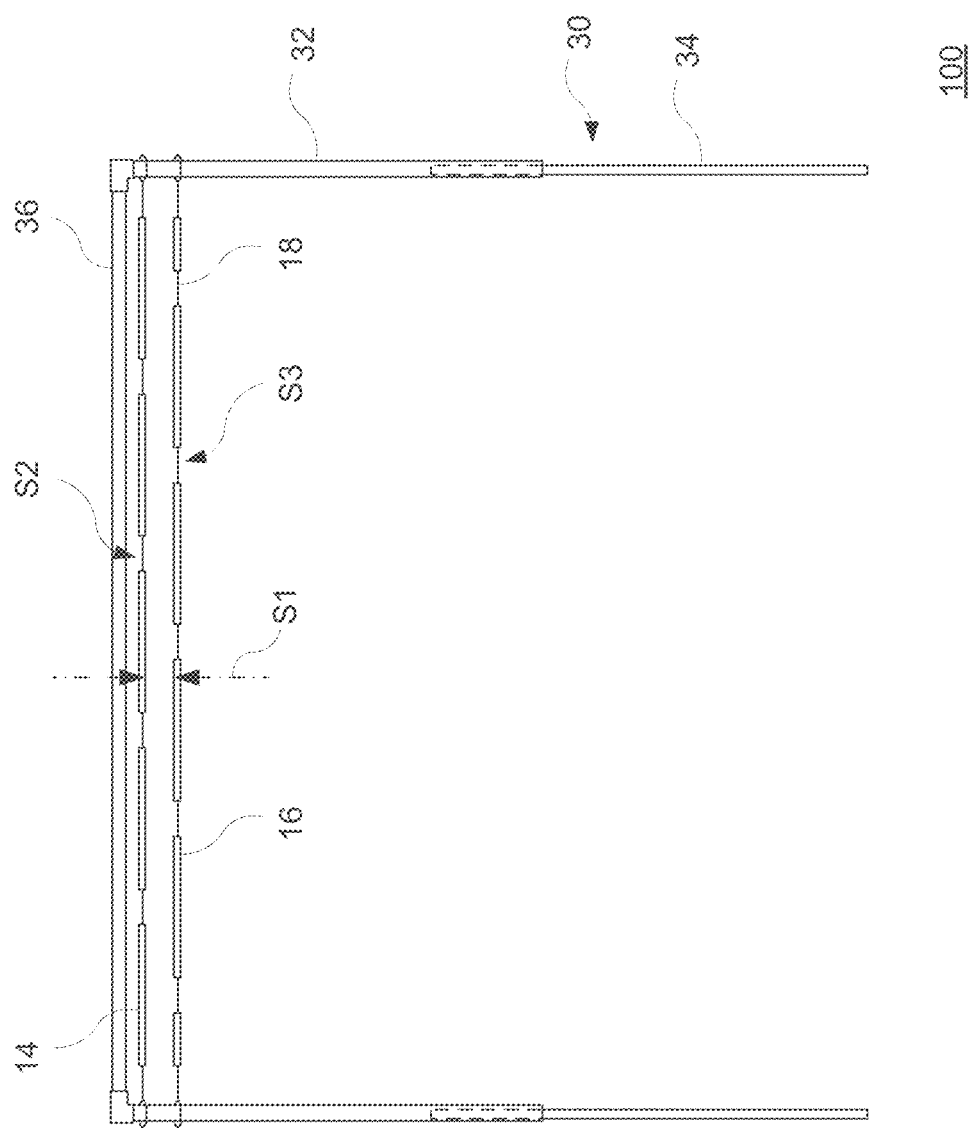
FIG. 1B is a second side view of a portable shelter having a plurality of canopies, according to an exemplary embodiment of the invention.
Figure 1C:
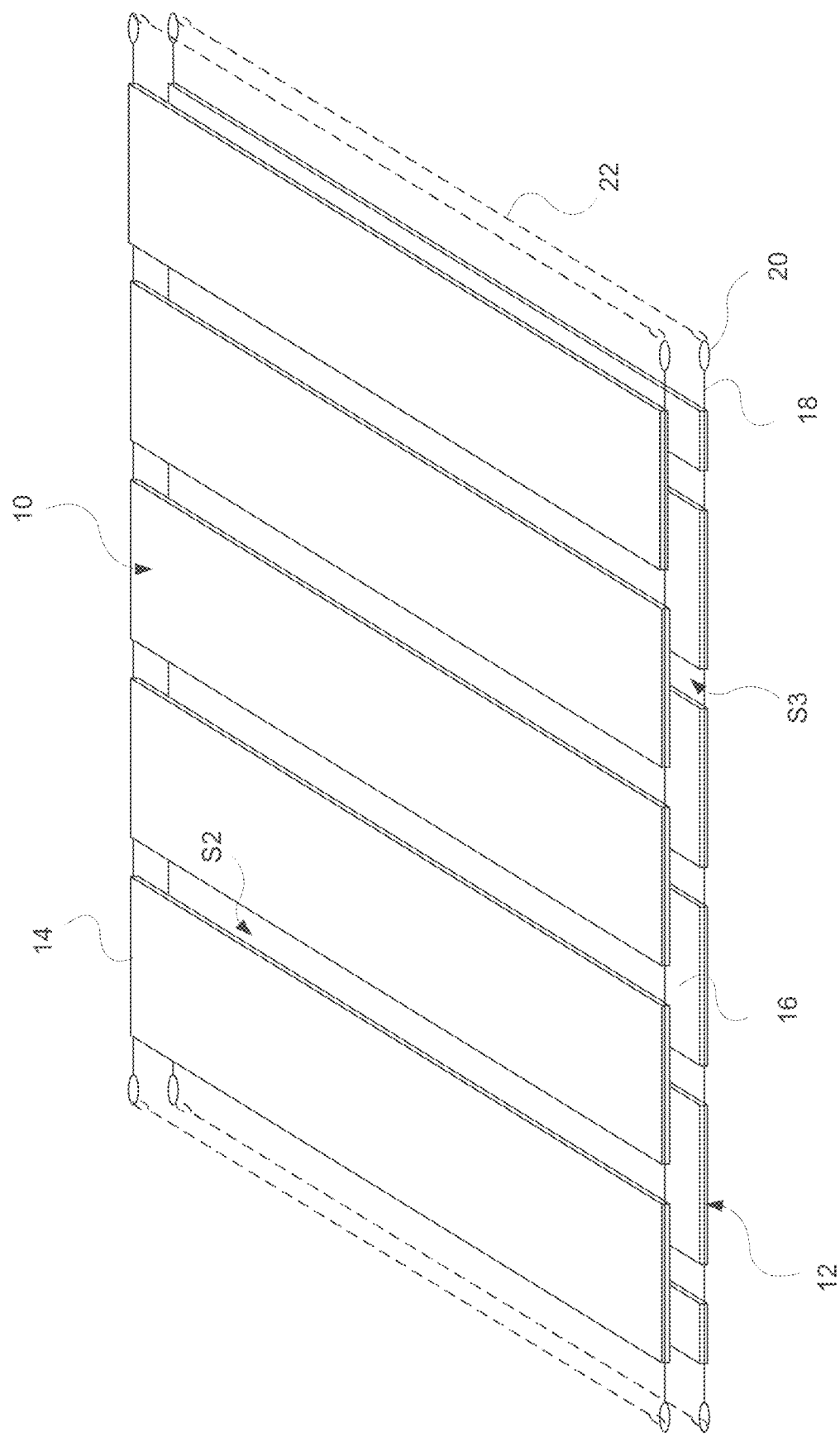
FIG. 1C is a perspective view of a plurality of canopies for a portable shelter, according to an exemplary embodiment of the invention.
Figure 1E:
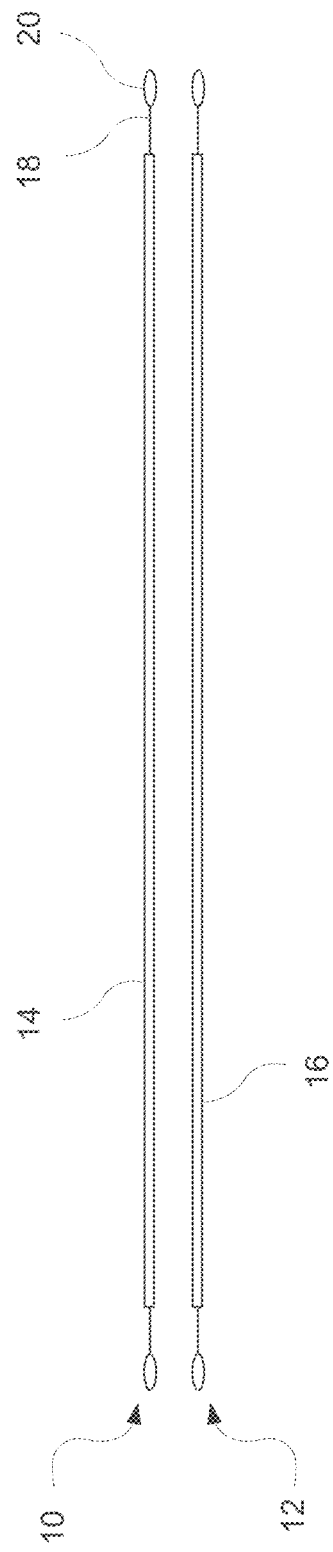
FIG. 1E is a second view of the plurality of canopies according to the exemplary embodiment of the invention illustrated in FIG. 1A.
Figure 1F:
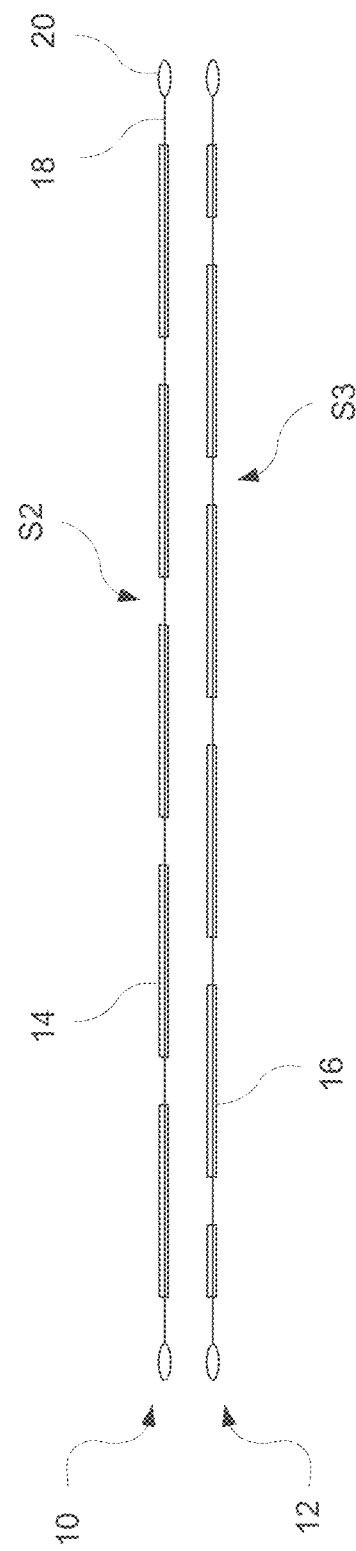
FIG. 1F is a side view of the plurality of canopies according to the exemplary embodiment of the invention illustrated in FIG. 1B.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1A-17, 19, and 20 illustrate exemplary embodiments of a portable shelter for providing shade, having a plurality of canopies that cooperate to block all or a majority of direct sunlight from passing below the plurality of canopies, thereby providing a shaded area under and/or adjacent to the shelter similar to a conventional canopy formed by a continuous sheet of material, while at the same time permitting air to flow horizontally through the vertical space or gap between the first and second canopies and permitting air to flow vertically through the openings in one or both of the first and second canopies, thereby minimizing forces exerted on the shelter and/or shelter frame when the shelter is subject to wind. The portable shelter includes a plurality of canopies (e.g., independent and separate canopies) that can be configured to be adjustable in one or more directions (e.g., adjustable in a vertical and/or horizontal direction either independently or in combination with each other) to compensate for various angles of sunlight, various wind speeds, etc.

Figure 1G:
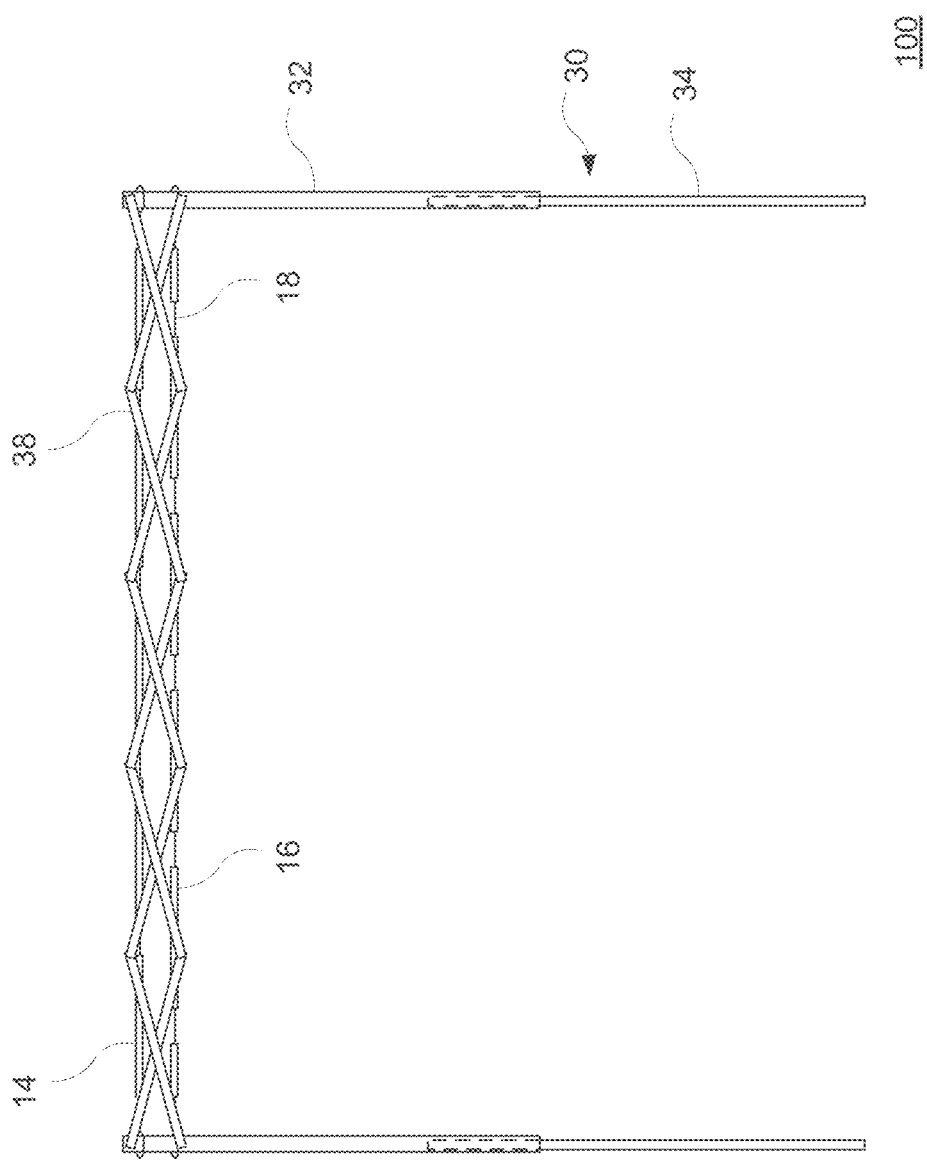
FIG. 1G is a side view of a portable shelter having a collapsible frame and a plurality of canopies, according to another exemplary embodiment of the invention.
Figure 2D:
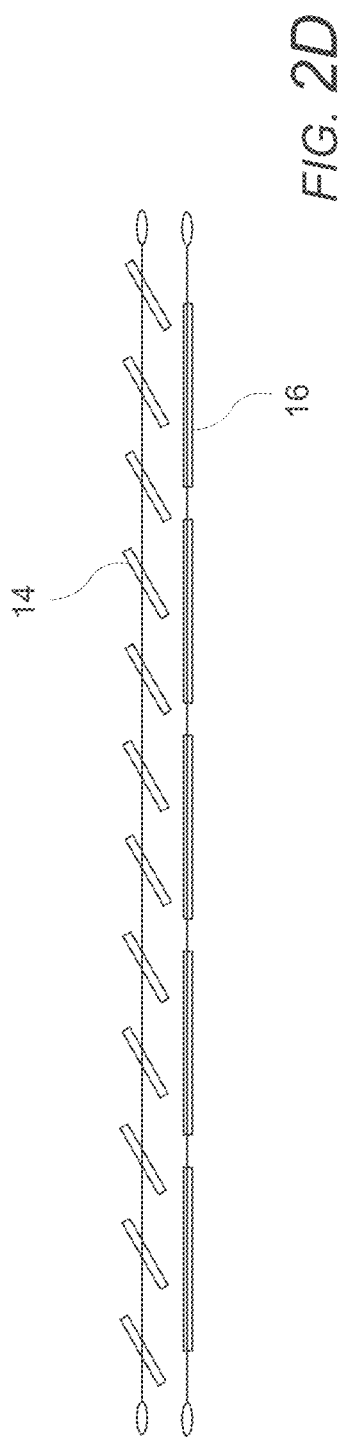
Figure 2E:
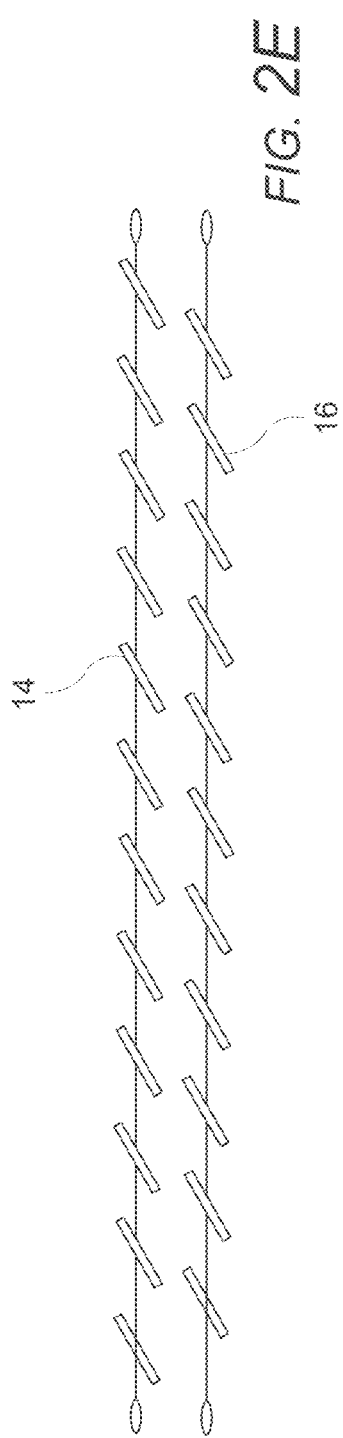
Figure 2F:
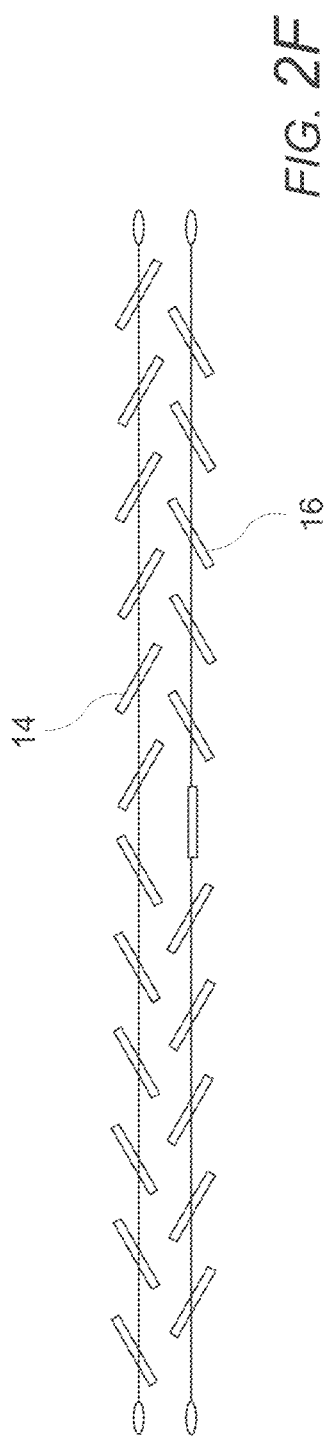

With reference to FIGS. 1A-1G, an exemplary embodiment of a portable shelter 100 includes a portable and collapsible support frame 30 and a plurality of canopies 10, 12. The support frame 30 can include, for example, telescopic legs 32, 34 with cross-bars 36 as shown in FIG. 1A, or with accordion sides 38 as shown in FIG. 1G. The plurality of canopies can include at least a first canopy 10 and a second canopy 12. The first canopy 10 is disposed over the second canopy 12. The first canopy 10 is capable of being spaced apart from the second canopy 12 in a vertical direction such that air is capable of flowing in a space S1 between the first canopy 10 and the second canopy 12. The canopies can include one or more openings (e.g., S2, S3) configured to permit air to pass through the respective canopy in a direction normal to the extent of the canopy, as will be explained in greater detail below.

The side profile of each canopy, or part of each canopy, of the plurality of canopies is not limited to any particular size and/or shape either along a longitudinal length or profile of the part. A size and shape of each canopy, or part of each canopy, of the plurality of canopies can be selected such that each of the canopies blocks a portion of the direct sunlight from passing below the respective canopy, and such that the combination of the plurality of canopies cooperates to block all or a majority of direct sunlight from passing below the plurality of canopies, thereby providing a shaded area under and/or adjacent to the canopy while at the same time minimizing forces exerted on the canopy and/or canopy frame by the air flow (wind) over the canopy.

One or more of the canopies 10, 12 can be formed from flexible or resilient material or fabric such that the canopy can be folded, rolled, or the like to pack the canopy into a small space for transporting the shelter from one place to another. The material of the canopy may be resilient such that the canopy can be coupled to the frame of the shelter and stretched into position, thereby minimizing or preventing sagging of the canopy between the parts of the support frame. The material of the canopy may provide a predetermined amount of UV protection or include a secondary material, film, or coating for providing a predetermined amount of UV protection. The embodiments also may provide increased UV protection beyond the UV protection of the individual material of each canopy since a plurality of canopies are arranged above each other. In this way, the portable shelter can provide multi-layer (e.g., dual layer) protection against UV rays. One or more of the canopies 10, 12 can include a water repellant or water resistant material or coating to provide the material from rain, ocean water, etc. The material can include one or more features for permitting air to pass or vent through the material, such as vent openings, perforated portions, flaps, etc.

The canopies 10, 12 can be supported by or suspended from the frame 30, for example, by support lines 18 (e.g., wires, cables, resilient cords or bungee cords, ropes, straps, chains, etc.). The support lines 18 can be coupled to legs 32 of the frame 30 and/or the cross-bar 36 or accordion sides 38 of the frame 30. The lines 18 can be coupled to the frame 30 in a variety of ways. For example, each line 18 can include a securing device 20 at one or both ends of the line 18 that is configured to engage and secure the line to the frame 30. The securing device 20 can be configured to directly engage a part of the frame 30 or to wrap around a part of the frame 30 and then engage another part of the line 18 or a separate part formed on the line 18. The securing device 20 can include one or more of a fixed hook, spring hook, clip, spring carabiner clip, screw gate carabiner clip, hook and loop fastener, etc. For example, in an aspect, to secure each canopy to the frame, each end of each line 18 can be wrapped around a respective leg 32 of the frame 30 and then the spring hook, carabiner clip, or the like can be secured onto the line 18, thereby securing the line to the frame. The line 18 can include one or more openings or protrusions for receiving the securing device 20 after the line 18 is wrapped around the frame 30. In other aspects, the frame 30 can include one or more openings or protrusions for receiving the securing device 20 of each line 18 with or without wrapping the line 18 around the frame 30. One or more securing devices 20 can be positioned at each corner and/or along one or more sides of the canopies.

The frame 30 can include means for restricting movement of the line 18 and/or maintaining the line 18 in position (e.g., one or more predetermined vertical positions on the frame 30), such as one or more recesses, projections, grip surfaces or friction surfaces, etc.

In the illustrated example, each canopy 10, 12 has a guide line 18 on opposite sides. Each canopy 10, 12 can have additional guide lines, such as optional guide lines 22 (shown by dashed lines in FIG. 1C). In other embodiments, each canopies 10, 12 can include a single guide line that extends around a perimeter (e.g., an entire perimeter) of the canopy 10, 12, respectively. A plurality of securing devices 20 can be positioned on the guide line, for example, at each corner and/or along one or more sides of the canopies.

With reference again to FIGS. 1A-1G, an exemplary embodiment of a shelter 100 comprises a plurality of canopies including a first, planar canopy 10 comprising a plurality panels or slats 14 separated by a plurality of openings S2, and a second, planar canopy 16 comprising a plurality of panels or slats 16 separated by a plurality of openings S3, wherein the panels 14, 16 and openings S2, S3 of the first and second canopies 10, 12, respectively, are staggered such that the openings S2, S3 do not coincide with each other in a vertical direction. In this way, the panels 14, 16 of the canopies 10, 12 can cooperate to block all or a majority of direct sunlight from passing below the plurality of canopies, thereby providing a shaded area under and/or adjacent to the canopy. At the same time, the exemplary embodiment can minimize forces exerted on the canopy by the air (wind) flowing over the canopies 10, 12 by permitting air to flow in the vertical space S1 between the first and second canopies 10, 12 and to flow through the openings S2, S3 in one or both canopies.

In the illustrated example in FIGS. 1A-1G, the panels 14, 16 of the canopies 10, 12 are planar sheets arranged to be substantially parallel to the ground. The leading edge and the trailing edge of the planar panels 14, 16 has a minimal surface area. If the wind is flowing, for example, in a direction substantially parallel to the surface of the ground (e.g., wind flowing along a beach parallel to the water's edge of a beach or wind flowing in from the water onto the beach), then the panels 14, 16 will have minimal surface area facing directly into the wind.

In the illustrated example in FIGS. 1A-1G, the panels 14, 16 and the openings S2, S3 generally have the same size and shape. However, as shown for example in FIGS. 2A-2C, in other embodiments, one or more of the panels 14, 16 in either or both canopies can have a different size (e.g., width, length, height), shape, and/or cross-section, etc. Additionally or alternatively, one or more of the openings S2, S3 in either or both canopies can have a different size and/or shape (e.g., circular, oval, square, rectangular, diamond, irregular, etc.). Moreover, the panels and/or openings can be configured to have a similar or corresponding pattern or different patterns on either or both of the canopies.

The panels (e.g., 14, 16) of the canopies 10, 12 can be configured to extend in a same direction, as shown in the examples, or in different directions with respect to each other. For example, the panels of one canopy can be arranged parallel to the panels of another canopy, the panels of one canopy can be arranged perpendicular to the panels of another canopy, or the panels of one canopy can be arranged at an angle other than parallel to or perpendicular to the panels of another canopy.

The panels (e.g., 14, 16) of the canopies 10, 12 can be configured such that a plane of the panel is substantially parallel to a longitudinal extent of the support lines 18. In other aspects, one or more of the panels (e.g., 14, 16) can be arranged to be at an angle or arranged vertically, as shown for example in FIGS. 2D-2E. The panels can be fixed with respect to the support lines or moveable (e.g., rotatable). In other embodiments, one or more of the openings S2, S3 can include a hood or flap (not shown), which can be either fixed or movable with respect to the canopy, to further block sunlight while permitting air to pass through the one or more openings. Accordingly, the arrangement of the panels 14, 16 and openings S1, S2, S3 can be selected to optimize an amount of shade provided by the plurality of canopies over a predetermined or maximum range of angles of incident sunlight, while at the same time optimizing a volume of air permitted to pass through the spaces S1, S2, and/or S3 to release pressure from under the canopies 10, 12 and reduce the wind pressure on the canopies 10, 12, and thus, reduce the undesirable effects of the wind on the shelter 100. The plurality of canopies can be arranged such that the shelter is directional, in which the shelter is configured to be better suited or optimized for incident sunlight and/or wind from one side of the shelter, or unidirectional, in which the shelter is configured to be suited or optimized for incident sunlight and/or wind from two or more sides of the shelter.

With reference to FIGS. 3A-3E, at least one of the first canopy and the second canopy can be configured to be moveable with respect to the other of the first canopy and the second canopy to change an amount of space between the first canopy and the second canopy, to change an angle of the first canopy with respect to the second canopy, and/or to change a lateral position of the first canopy with respect to the second canopy. In this way, the present invention provides a portable shelter having a plurality of canopies that are capable of being adjusted to compensate for various angles of sunlight, various wind speeds, etc.

Figure 3A:
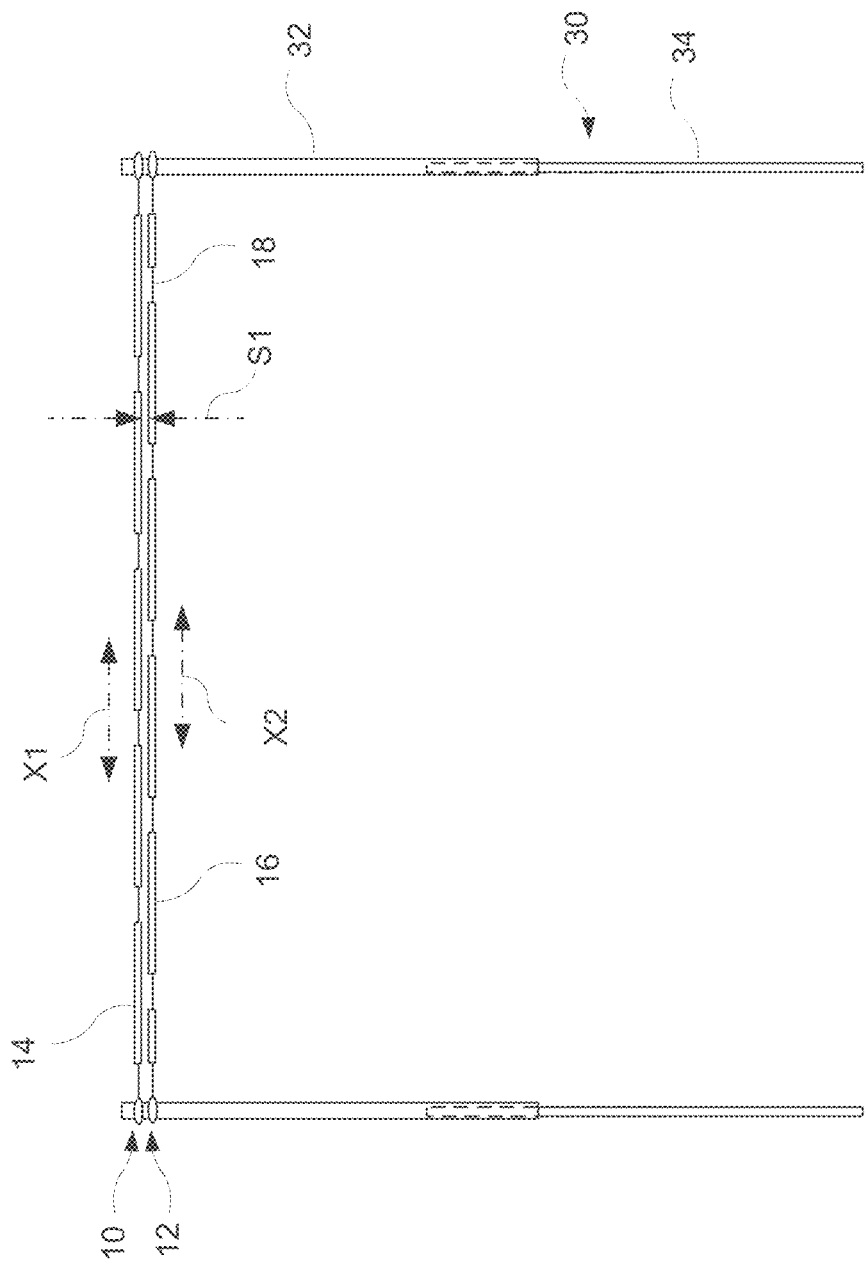
FIG. 3A is a side view of the portable shelter having a plurality of canopies according to the exemplary embodiment of FIG. 1B, with a portion of the frame parts removed for clarity and with at least one of the canopies adjusted into another position.
Figure 3B:
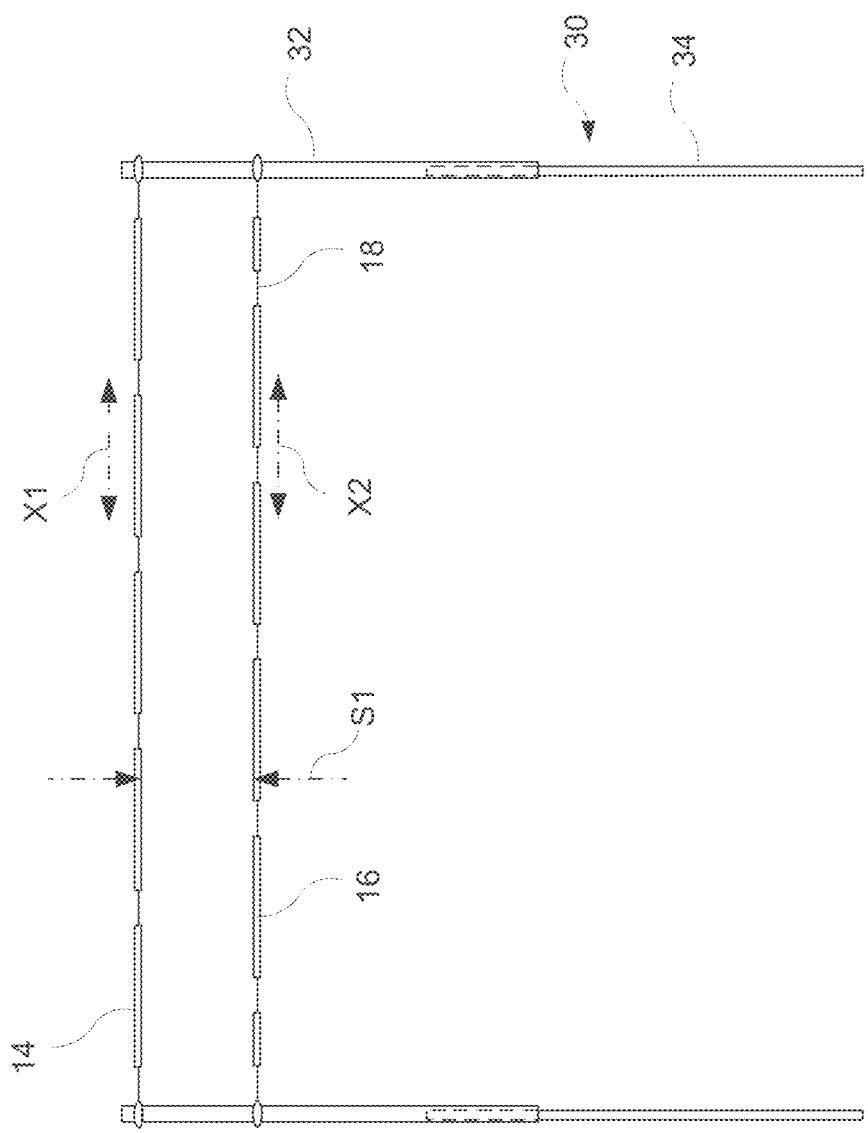
FIG. 3B is another side view of the portable shelter having a plurality of canopies according to the exemplary embodiment of FIG. 1B, with a portion of the frame parts removed for clarity and with at least one of the canopies adjusted into another position.

For example, as show in FIG. 3A, when little or no wind speeds are present, the canopy 12 can be moved toward (i.e., in a vertical or longitudinal direction of the frame leg 32) the canopy 10 to substantially close off the space S1 between the canopies, such that the separate canopies 10, 12 cooperate to simulate a continuous canopy. As show in FIG. 3B, when higher wind speeds are present, the canopy 12 can be moved away (e.g., in a vertical or longitudinal direction of the frame leg 32) from canopy 10 to increase a size of the space S1 between the canopies, thereby permitting a greater volume of air to pass through the space S1 between the canopies and reducing forces exerted on the shelter by the wind. In this way, a user can simply and easily adjust and vary the arrangement of the canopies to compensate for a variety of wind conditions to thereby reduce the forces exerted on the shelter by the wind.

Figure 3C:
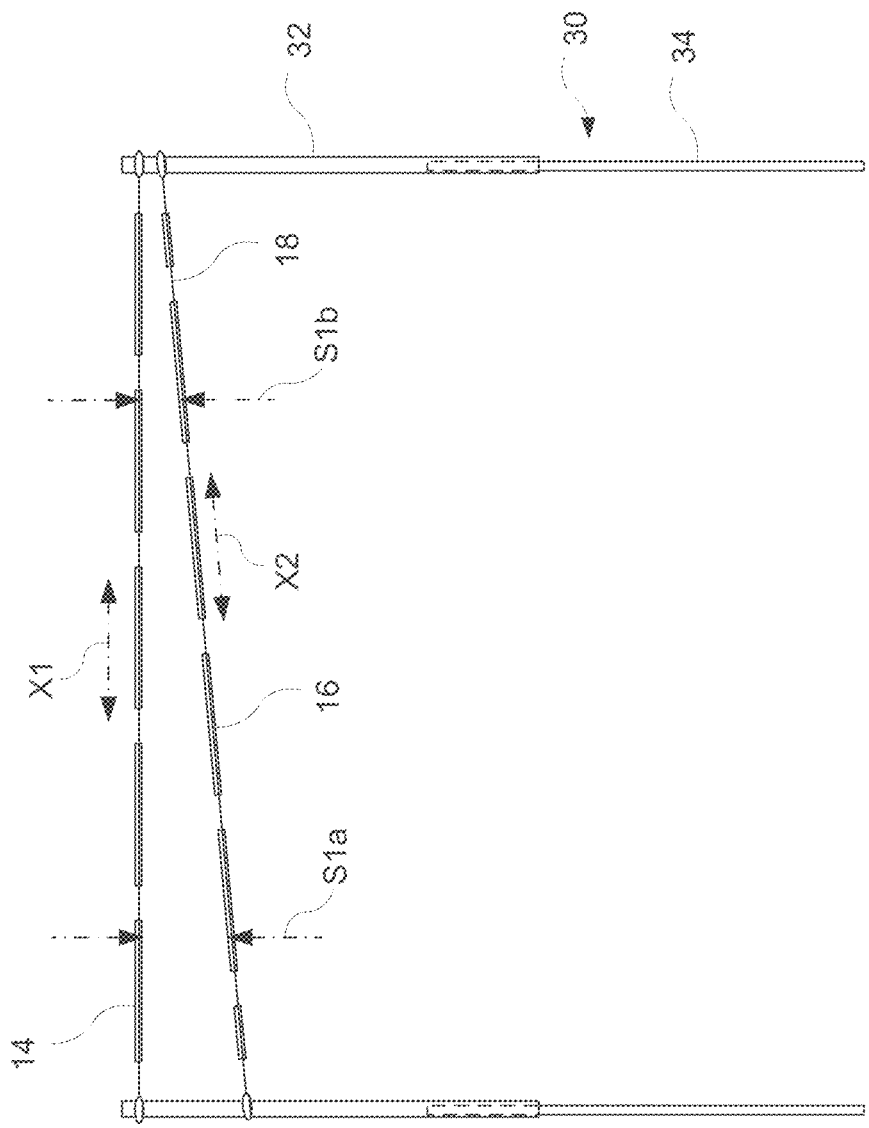
FIG. 3C is another side view of the portable shelter having a plurality of canopies according to the exemplary embodiment of FIG. 1B, with a portion of the frame parts removed for clarity and with at least one of the canopies adjusted into another position.
Figure 3D:
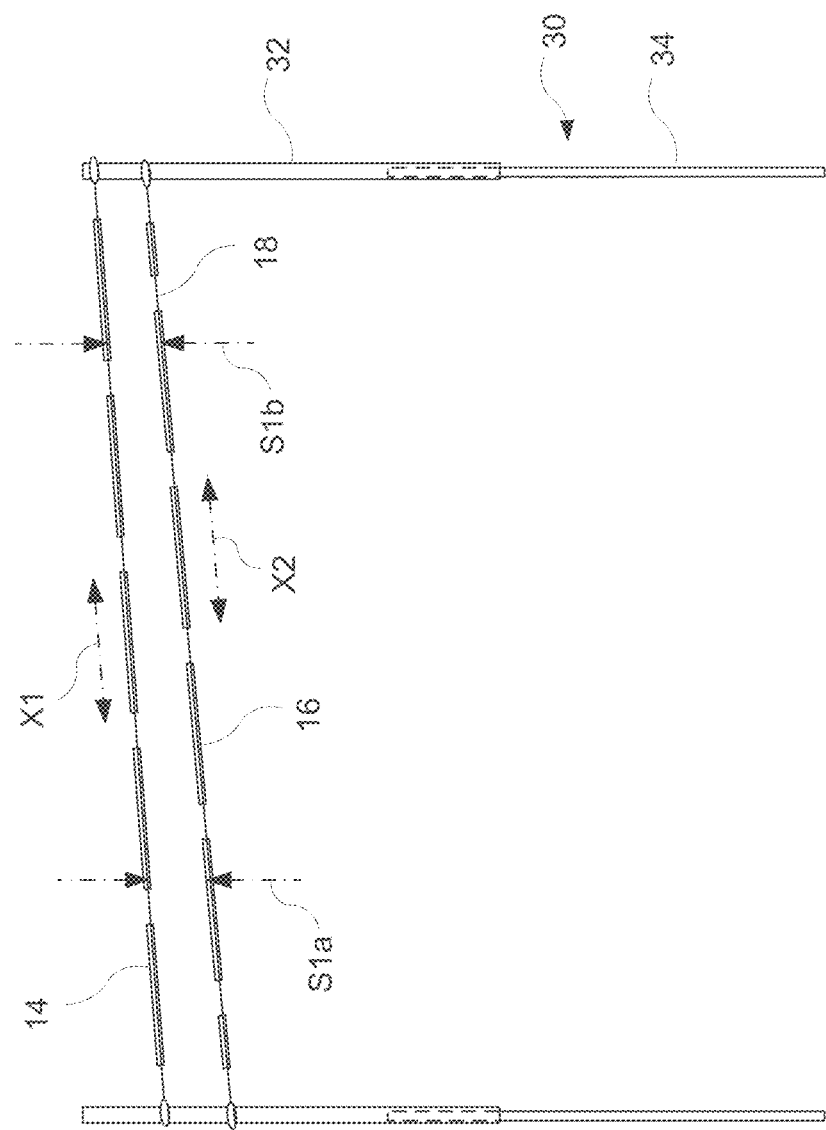
FIG. 3D is another side view of the portable shelter having a plurality of canopies according to the exemplary embodiment of FIG. 1B, with a portion of the frame parts removed for clarity and with at least one of the canopies adjusted into another position.
Figure 3E:
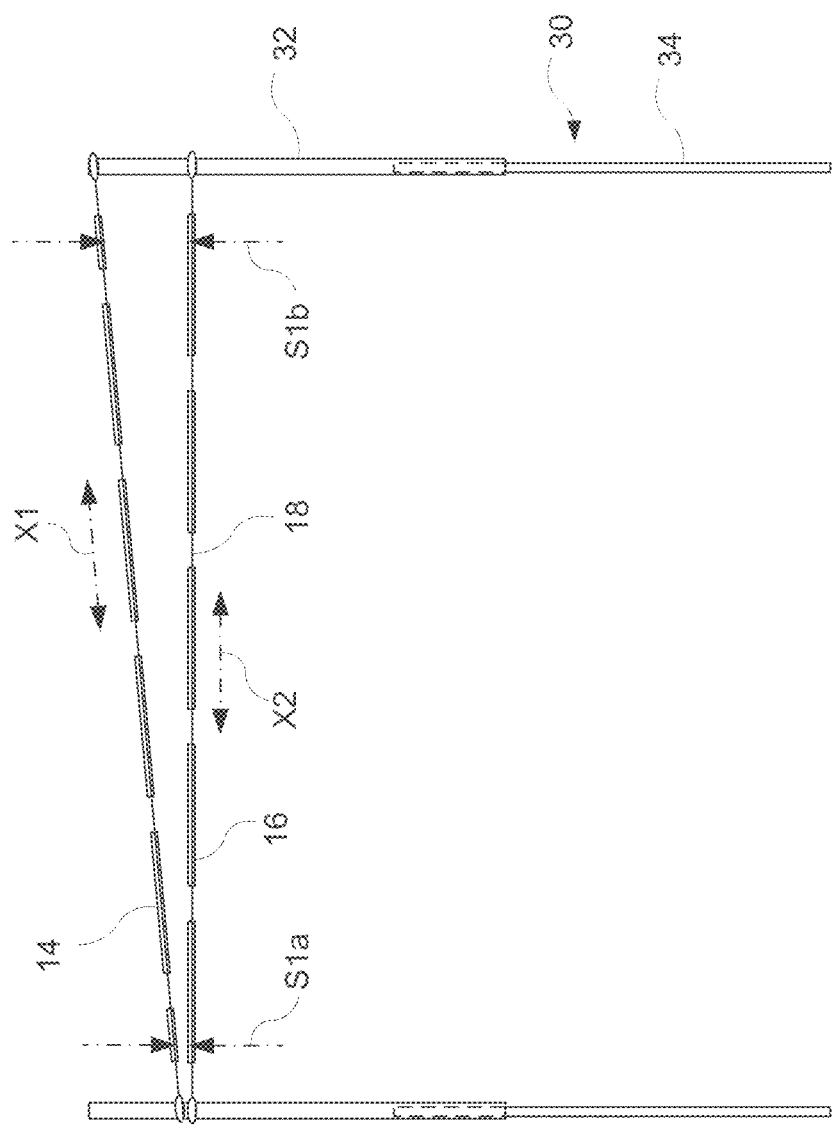
FIG. 3E is another side view of the portable shelter having a plurality of canopies according to the exemplary embodiment of FIG. 1B, with a portion of the frame parts removed for clarity and with at least one of the canopies adjusted into another position.

Similarly, depending on the angle of the incident sunlight on the shelter, one or more of the canopies can be moved in a horizontal direction (e.g., X1, X2 or Z1, Z2) to block any sunlight that is not being blocked by another canopy, thereby enabling the canopy to cast a continuous shadow below or adjacent to the shelter. Moreover, one or more of the canopies can be positioned at an angle with respect to another canopy and/or with respect to the ground. For example, as shown in FIGS. 3C-3E, one or more of the canopies 10, 12 can be positioned in a parallel arrangement with respect to each other and/or with respect to the ground, or one or more canopies 10, 12 can be positioned at an angle with respect to another canopy 10, 12 and/or with respect to the ground, thereby enabling the canopy to cast a continuous shadow below or adjacent to the shelter. In this way, a user can simply and easily adjust and vary the arrangement of the canopies to compensate for a variety of sun angles to thereby maximize an amount of shade provided by the shelter. Since the canopies have openings and are not continuous sheets of material, the present invention may provide increased visibility of surrounding scenery for the user or others in the vicinity through the openings S2, S3 in the canopies and space S1 between the canopies. The panels of each canopy can have other configurations, shapes, and/or sizes within the spirit and scope of the invention.

Figure 4A:
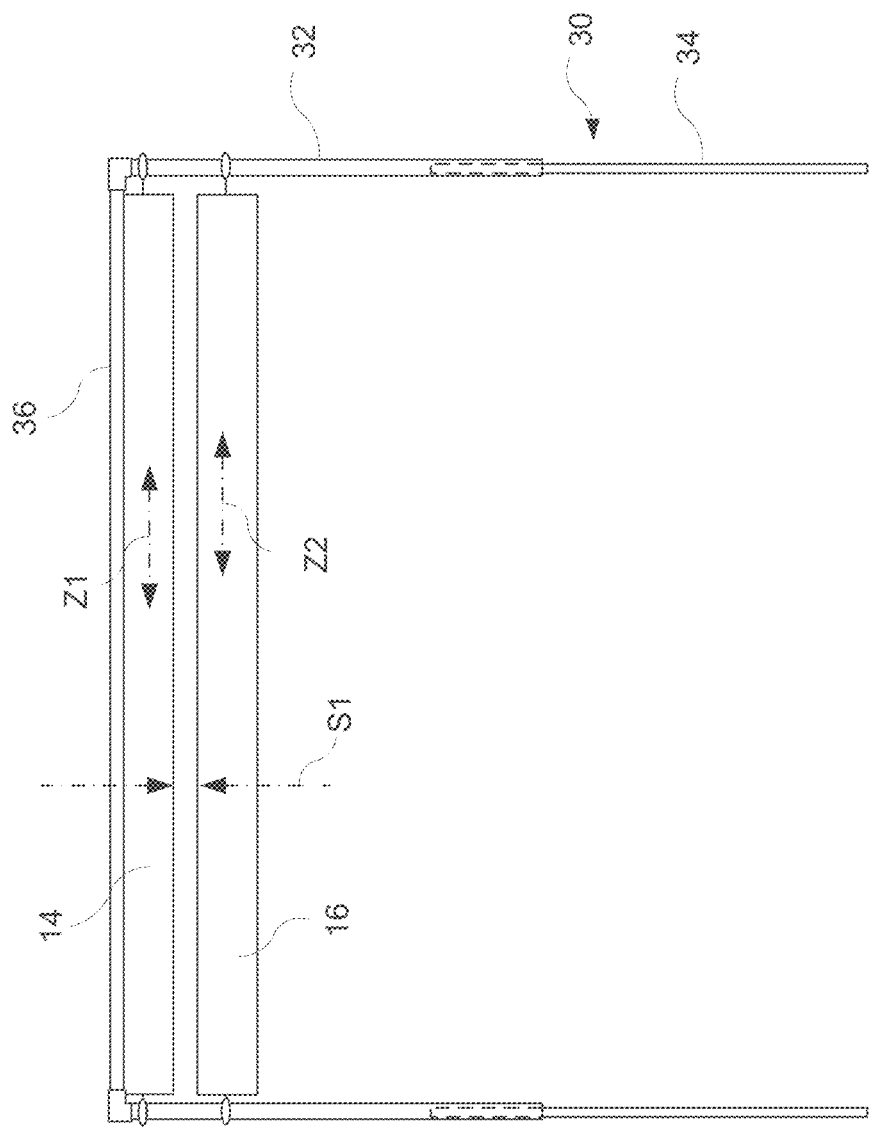
FIG. 4A is a first side view of a portable shelter having a collapsible frame and a plurality of canopies, according to an exemplary embodiment of the invention.
Figure 4B:
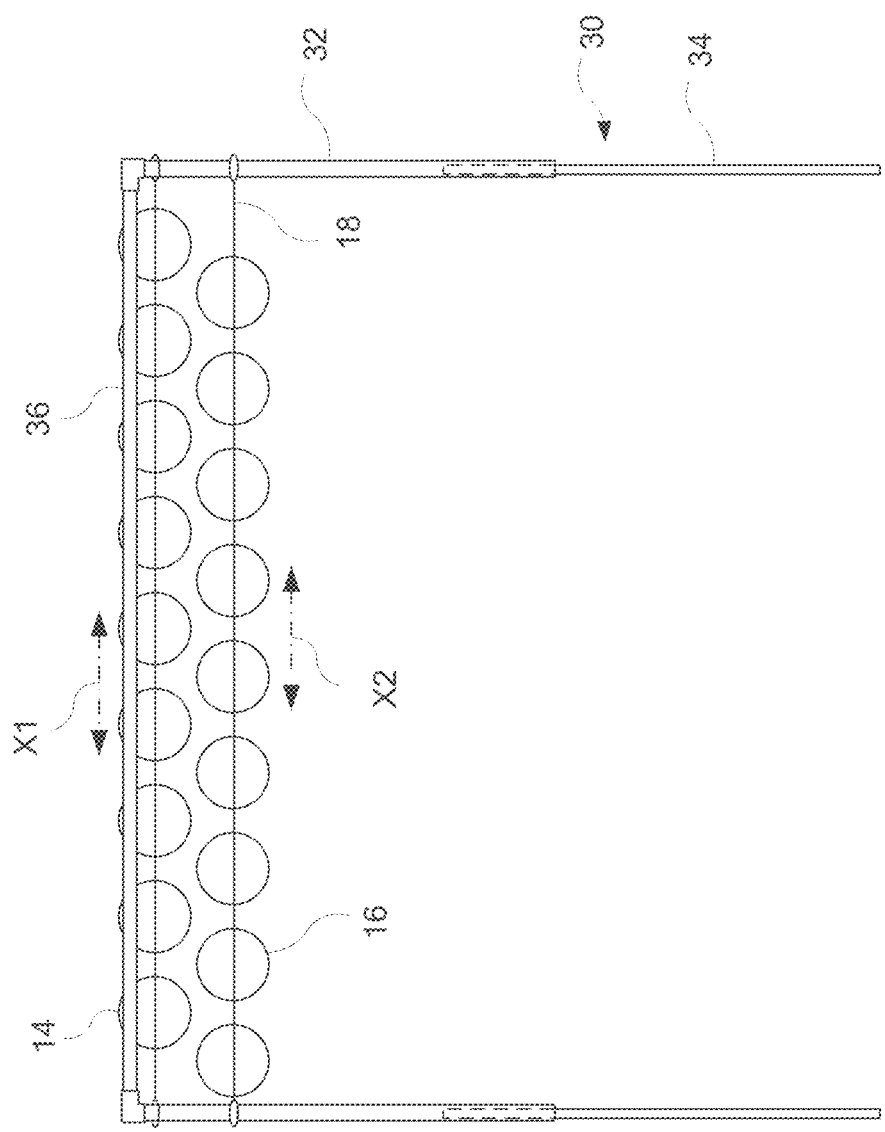
FIG. 4B is a second side view of a portable shelter having a collapsible frame and a plurality of canopies, according to an exemplary embodiment of the invention.
Figure 4D:
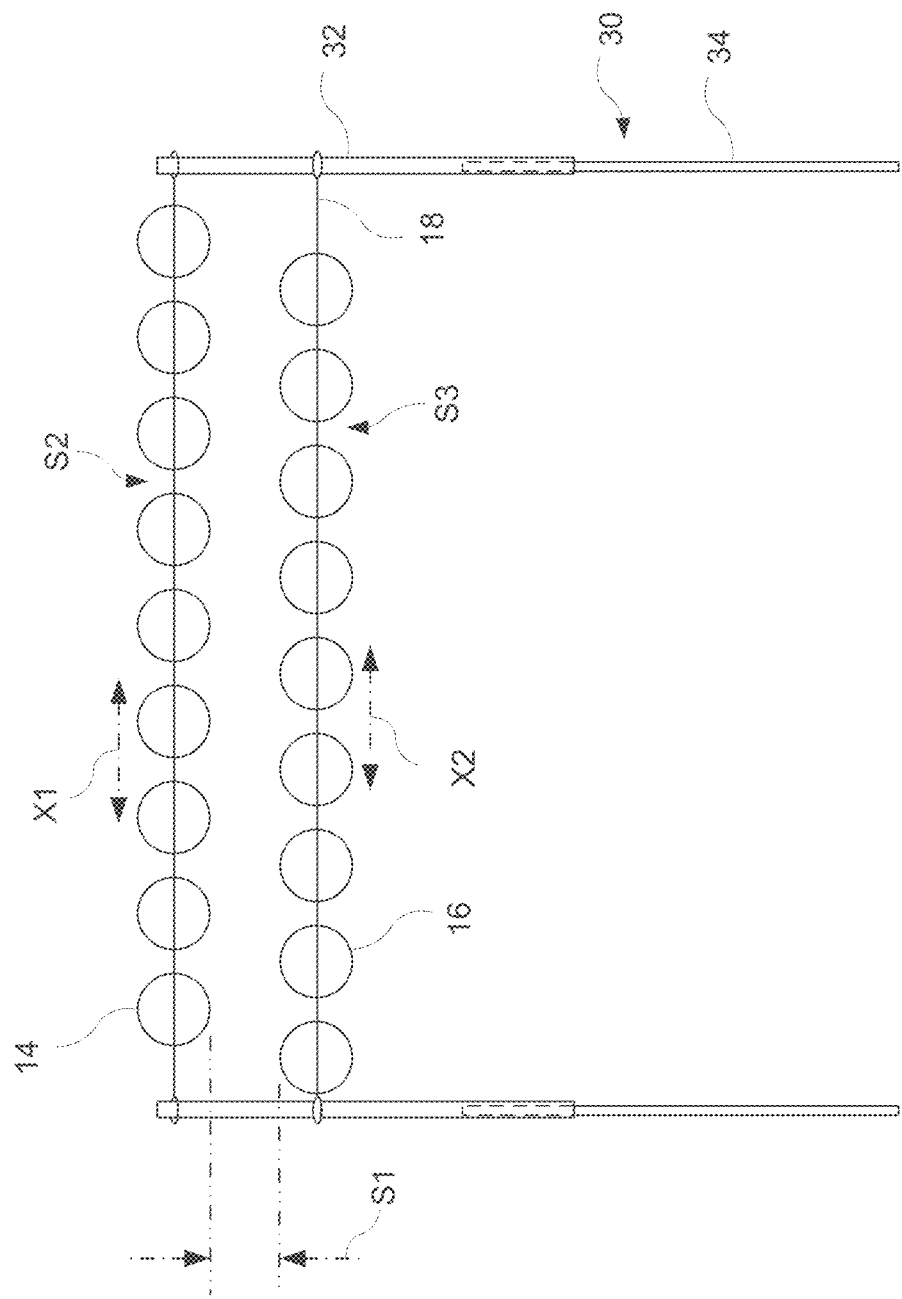
FIG. 4D is another side view of the portable shelter having a plurality of canopies according to the exemplary embodiment of FIG. 4B, with a portion of the frame parts removed for clarity and with at least one of the canopies adjusted into another position.
Figure 4E:
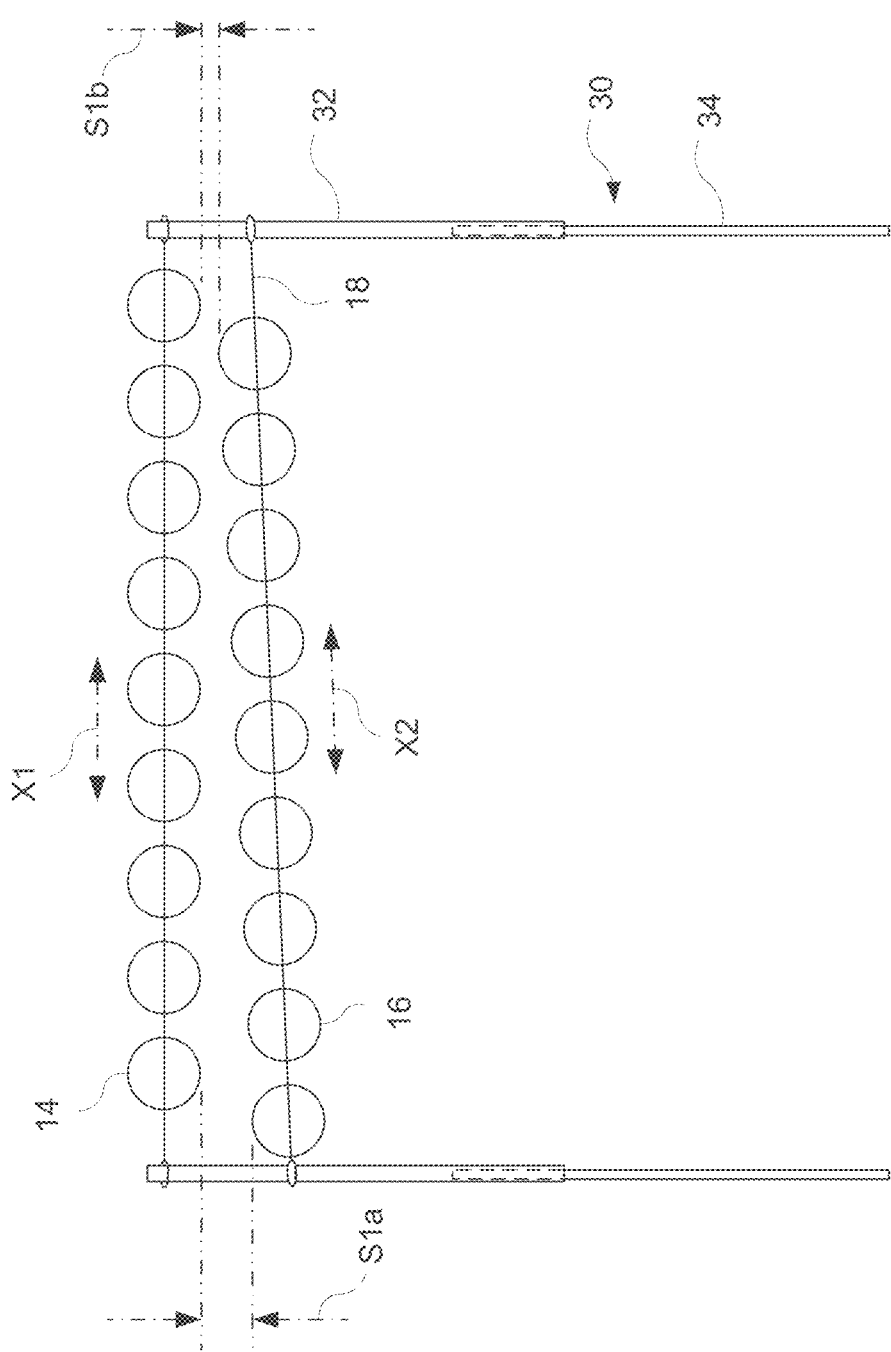
FIG. 4E is another side view of the portable shelter having a plurality of canopies according to the exemplary embodiment of FIG. 4B, with a portion of the frame parts removed for clarity and with at least one of the canopies adjusted into another position.

With reference to FIGS. 4A-4E, an exemplary embodiment of a shelter 100 comprises a plurality of canopies including a first canopy 10 comprising a plurality of co-planar, parallel tubulars 14, which are spaced apart from each other by a predetermined distance, thereby forming openings or spaces S2 between the tubulars 14, and a second canopy 16 comprising a plurality of parallel tubulars 16, which are spaced apart from each other by a predetermined distance, thereby forming openings or spaces S3 between the tubulars 16, wherein the panels 14, 16 and openings S2, S3 of the first and second canopies 10, 12, respectively, are staggered such that the openings S2, S3 do not coincide with each other in a vertical direction. The tubulars 14 of the first canopy 10 can be aligned above the opening or spaces S3 in the second canopy 12, and the tubulars 16 of the second canopy 12 can be aligned below the openings or spaces S2 in the first canopy 10, thereby casting a continuous shade area while permitting air to flow between the canopies 10, 12 and between the tubulars 14, 16 of each canopy 10, 12. The size and shape of the tubulars 14, 16 are not limited to a particular design, and can include, for example, a tubular having a circular cross-section or a tubular having an oval cross-section. The ends of the tubulars 14, 16 can be closed to prevent airflow within the tubular, or open to permit airflow within the tubular. As shown in FIGS. 4C-4E, at least one of the first canopy 10 and the second canopy 12 can be configured to be moveable toward and/or away (i.e., in a vertical direction or longitudinal direction of the frame leg 32) from the other of the first canopy 10 and the second canopy 12 to change an amount of space S1 between the tubulars 14, 16 of the first canopy 10 and the second canopy 12 and/or to change an angle of the first canopy 10 with respect to the second canopy 12. Similarly, depending on the angle of the incident sunlight on the shelter, one or more of the canopies 10, 12 can be moved in a horizontal direction (e.g., X1, X2 or Z1, Z2) to block any sunlight that is not being blocked by another canopy, thereby enabling the canopy to cast a continuous shadow below or adjacent to the shelter. In this way, the plurality of canopies 10, 12 are capable of being adjusted to compensate for various angles of sunlight, various wind speeds, etc.

The tubulars (e.g., 14, 16) of the canopies 10, 12 can be configured such that an axis of the tubular intersects with the support line 18. The tubulars (e.g., 14, 16) can be fixed with respect to the support lines 18 or moveable (e.g., rotatable). The arrangement of the tubulars 14, 16 and openings S1, S2, S3 can be selected to optimize an amount of shade provided by the plurality of canopies over a predetermined or maximum range of angles of incident sunlight, while at the same time optimizing a volume of air permitted to pass through the spaces S1, S2, and/or S3 to release pressure from under the canopies 10, 12 and reduce the wind pressure on the canopies 10, 12, and thus, reduce the undesirable effects of the wind on the shelter 100. The plurality of canopies can be arranged such that the shelter is directional, in which the shelter is configured to be better suited or optimized for incident sunlight and/or wind from one side of the shelter, or unidirectional, in which the shelter is configured to be suited or optimized for incident sunlight and/or wind from two or more sides of the shelter.

The side profile or cross-section of each tubular 14, 16 is not limited to any particular size and/or shape. With reference to FIGS. 5A-5C, the tubulars 14, 16 of each of the canopies 10, 12 can have the same or different sizes, and/or the same or different shapes, such as circular cross-sections, oval cross-sections, etc.

Figure 6A:
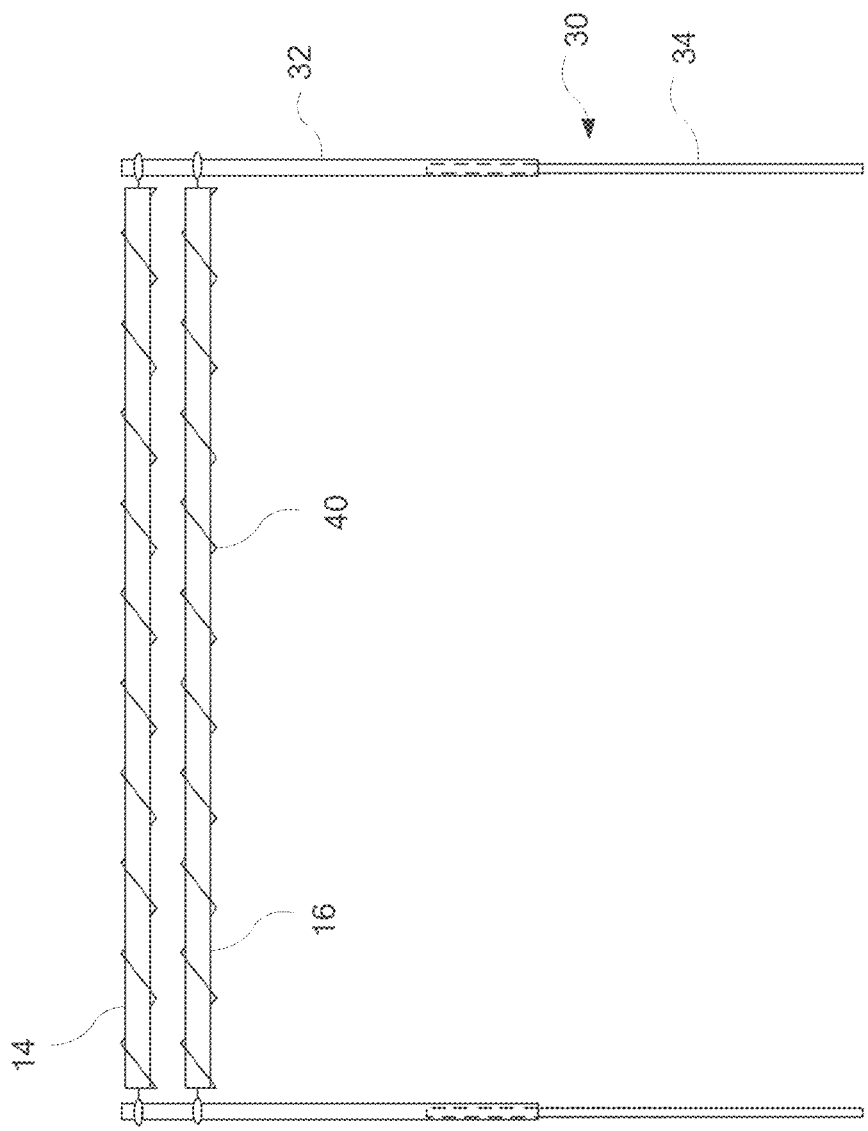
FIG. 6A is a first side view of a portable shelter having a plurality of canopies, according to another exemplary embodiment of the invention, with a portion of the frame parts removed for clarity.

With reference to FIGS. 6A-6C, one or more of the tubulars 14, 16 can include one or more helical strakes 40 along a portion of, or all of, a longitudinal length of the tubular 14, 16 to reduce vortex-induced vibration (VIV) forces by streamlining the flow of currents around the tubular. The helical strakes 40 can be continuous or intermittent along portions of the longitudinal length of the tubular 14, 16. As shown in FIG. 6C, the tubular 14, 16 can include a closed end 14a, 16a. The end of each helical strake 40 is shown by reference numeral 42 and the body of each helical strake 40 is shown by reference numeral 44.

The tubulars 14, 16 can be configured to be collapsed (e.g., like an accordion) and tied or restrained in the collapsed position for transporting. The plurality of tubulars can be interconnected such that after the tubular are collapsed, the tubulars can be folded over on each other to provide compact storage. The helical strakes may assist with retaining the circular cross-section of the tubulars in both a stowed and expanded position. The helical strakes also may assist with unfolding or deploying the tubulars, owing to the elasticity of the helical strakes, such that the tubulars will spring into shape when untied or removed from a storage case in a manner similar to children's fabric play tunnels. In this way, the invention can provide a portable shelter having one or more of the canopies 10, 12 formed by a plurality of hollow fabric tubulars to provide improved air flow over the canopies while at the same time providing a shelter that is easily stowed, transported, and set up without tools, and that is lightweight, durable, and resistant to wind, sand, water, etc., as well as simple and economic to manufacture.

Additionally or alternatively, one or more of the tubulars 14, 16 can include one or more tail fairings (not shown) along a portion of, or all of, a longitudinal length of the tubular. The fairings can be rotating or fixed fairings, continuous or intermittent fairings, long or short fairings, etc. In other aspects, the tubulars can include a combination of helical strakes and fairings. In this way, the present invention may be capable of suppressing vortex-induced vibration (VIV) resulting from air (wind) flowing over the tubulars.

Figure 7A:
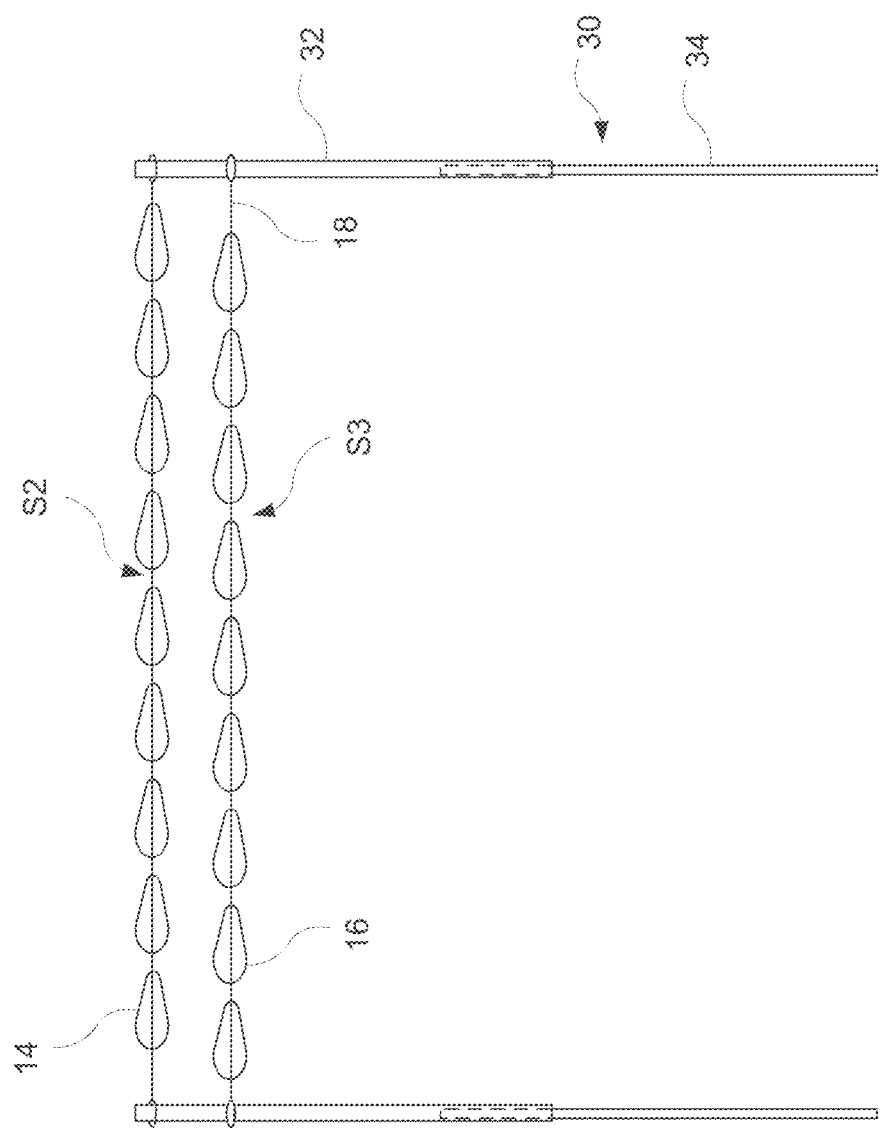
FIG. 7A is a side view of a portable shelter having a plurality of canopies, according to another exemplary embodiment of the invention, with a portion of the frame parts removed for clarity.

With reference to FIG. 7A, the panels 14, 16 of the canopies can have an airfoil shaped cross-section along all or a part of the longitudinal length of the tubular. One or more of the canopies 10, 12 can be formed from a plurality of co-planar, parallel airfoils 14, 16, which are spaced apart from each other by a predetermined distance, thereby forming openings or gaps S2, S3 between the airfoils. As with the planar panels, when the first canopy 10 and the second canopy 12 are mounted on a support frame 30, the airfoils 14 of the first canopy 10 can be aligned above the openings or spaces S3 in the second canopy 12, and the airfoils 16 of the second canopy 12 can be aligned below the openings or spaces S2 in the first canopy 10, thereby casting a continuous shade area while permitting air to flow between the canopies and between the airfoils of each canopy. The size and shape of the airfoils are not limited to a particular design, and can include, for example, an unsymmetrical airfoil or a symmetrical airfoil. The airfoil can be a laminar flow airfoil, circular arc airfoil, double wedge airfoil, etc.

Figure 7B:
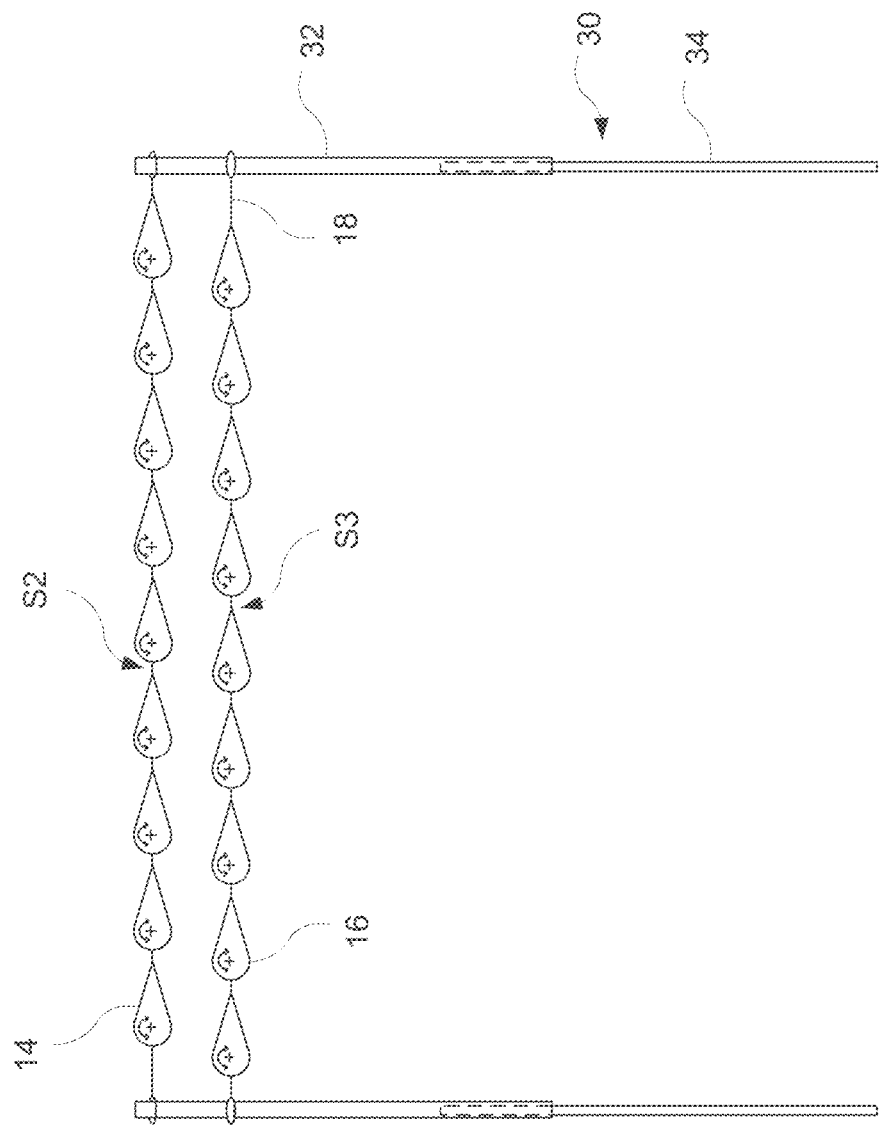
FIGS. 7B-7D are side views of a portable shelter having a plurality of canopies, according to another exemplary embodiment of the invention, with a portion of the frame parts removed for clarity.
Figure 7C:
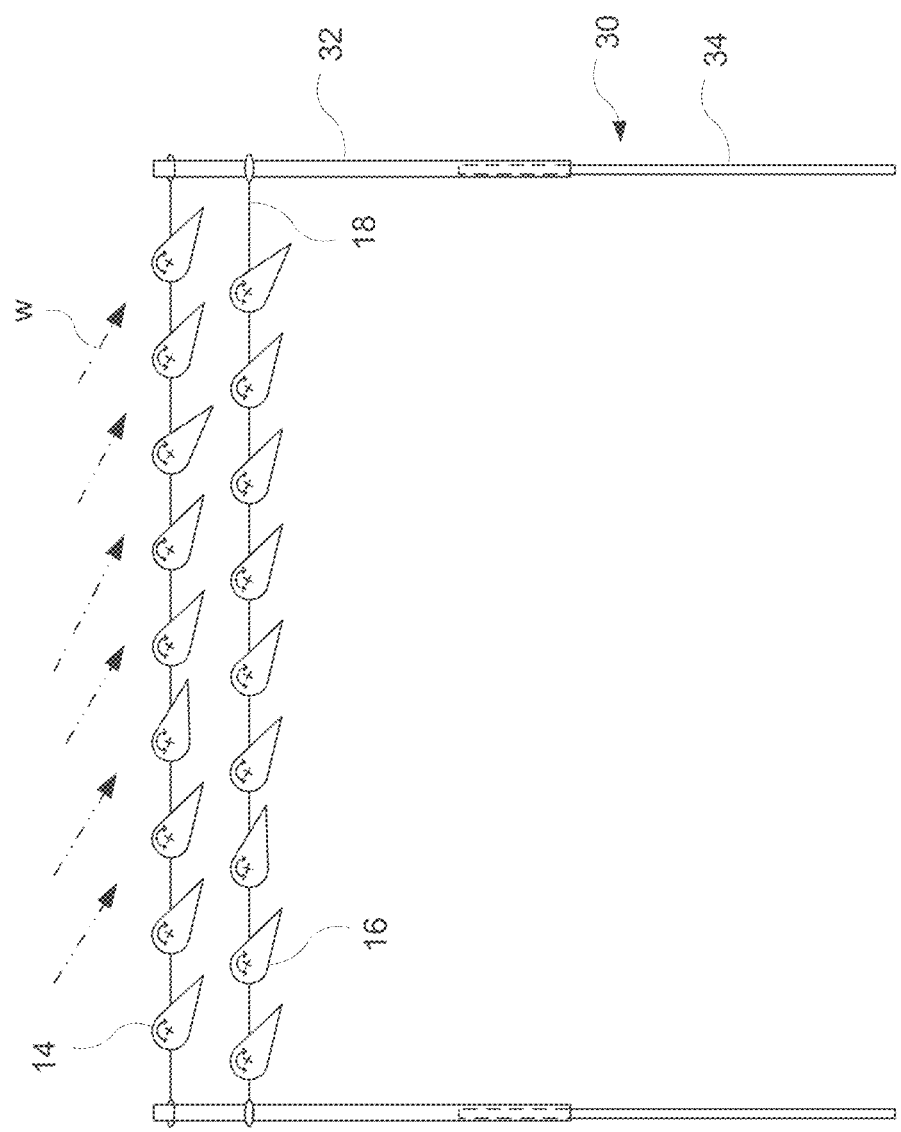
Figure 7D:
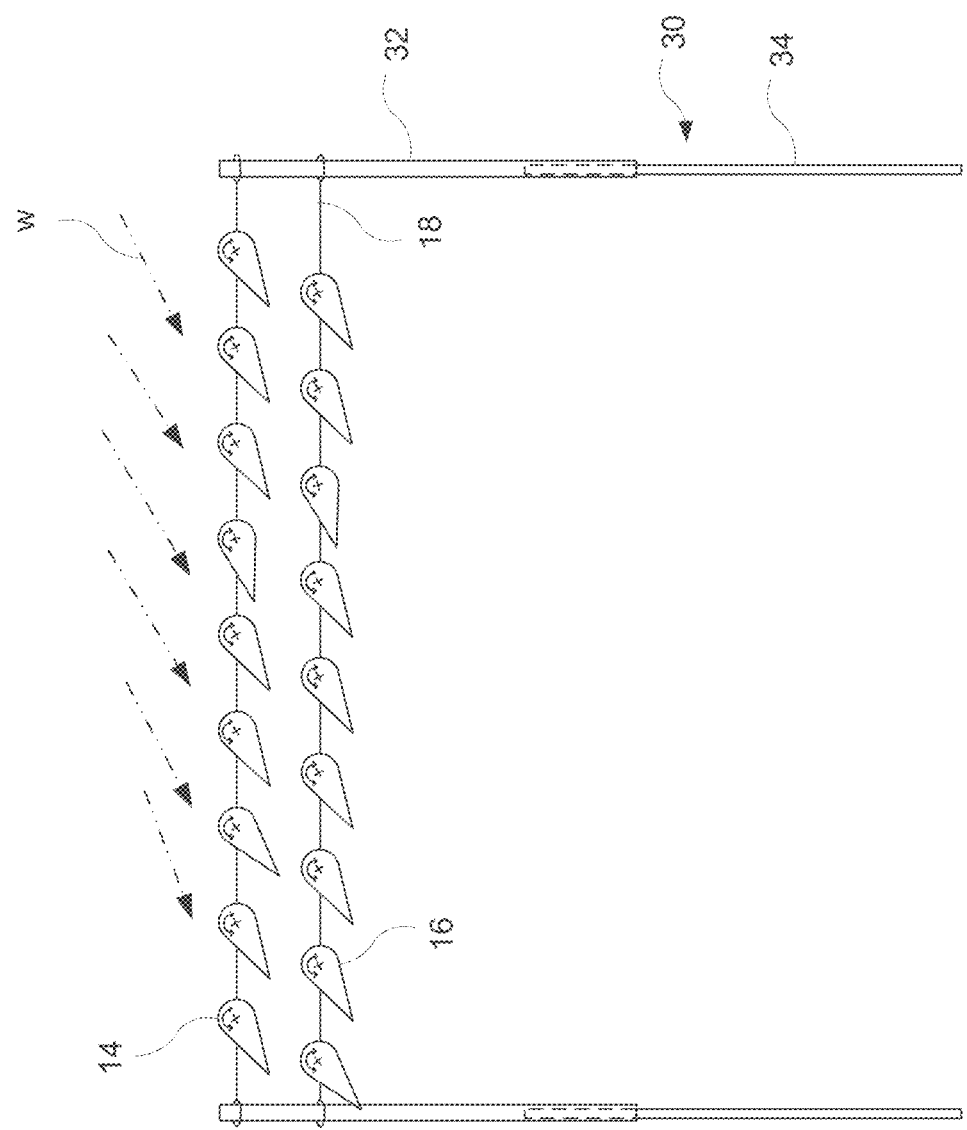
Figure 8A:
FIGS. 8A-8H are side profile views of exemplary shapes of a parts of a canopy of a portable shelter, according to an exemplary embodiment of the invention.
Figure 8B:
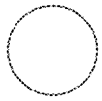
Figure 8C:
Figure 8D:
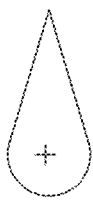
Figure 8E:
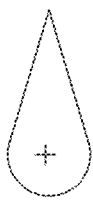
Figure 8F:
Figure 8G:
Figure 8H:

With reference to FIGS. 7B-7D, the panels 14, 16 can have a fairing shaped cross-section along all or a part of the longitudinal length of the tubulars. The tubulars 14, 16 can be freely rotatable about an axis of the tubular. In this way, the fairing-shaped tubulars 14, 16 of each canopy 10, 12 can rotate depending on the direction of the wind, thereby streamlining the flow of air over the canopies.

With reference to FIGS. 8A-8H, the side profile of each panel of the canopies is not limited to any particular size and/or shape either along a longitudinal length or profile of the part. For example, each part of a canopy can be formed by a panel having, for example, a planar-shaped profile (FIG. 8A), a circular-shaped profile (FIG. 8B), an oval-shaped profile (FIG. 8C), an airfoil-shaped profile (FIGS. 8D-8H), etc. The profile can be symmetrical or unsymmetrical. For example, the part can have a symmetrical airfoil shape intended, for example, to equalize air flow speed and pressure over and below the part, or an unsymmetrical airfoil shape intended, for example, to provide different air flow speeds and pressure above and below the part. In an embodiment, an unsymmetrical airfoil shape can be configured to provide downforce on the part of the canopy when air flows around the part, thereby minimizing lift on the canopy. The panels can be fixed or rotatable.

Figure 9A:
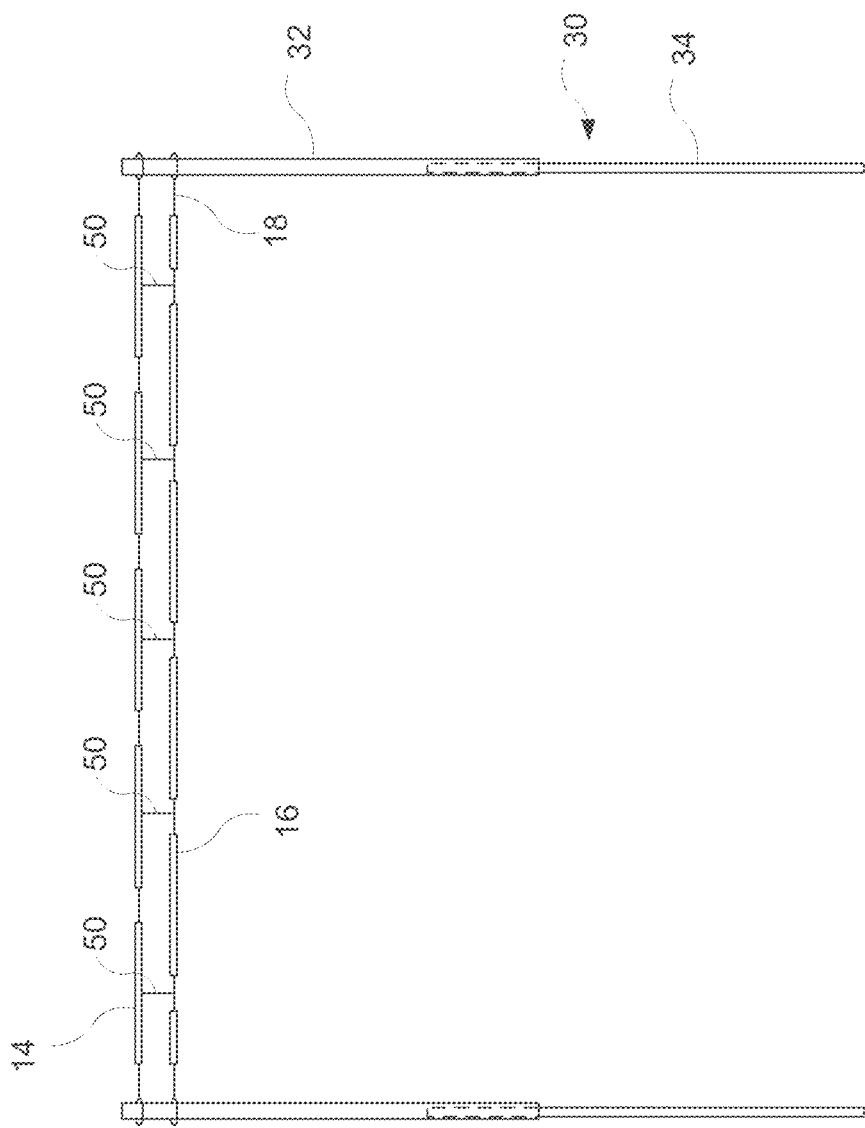
FIG. 9A is a side view of a portable shelter having a plurality of canopies, according to an exemplary embodiment of the invention, with a portion of the frame parts removed for clarity, and including one or more tethers.

With reference to FIG. 9A, one or more tethers 50 (e.g., connecting straps, bungee cords, ropes, etc.) can be coupled between the first canopy 10 and the second canopy 12 to maintain a predetermined maximum distance between the panels 14, 16 of the first and second canopies 10, 12 and/or the connecting lines 18 of the first and second canopies 10, 12. In the illustrated example, the tethers 50 can be coupled between the canopies 10, 12 (e.g., from support line to support line, from panel to panel, and/or from panel to support line) such that the canopies 10, 12 can move toward each in a vertical direction with little or no restriction, while being limited to a predetermined maximum distance between the canopies 10, 12 in the opposite direction. The tethers 50 are illustrated as being arranged in a vertical direction. However, the tethers 50 can extend at an angle to one or more of the canopies. The tethers 50 can permit movement of one or more of the canopies 10, 12 in a horizontal direction (e.g., X1, X2 or Z1, Z2) to block any sunlight that is not being blocked by another canopy, thereby enabling the canopy to cast a continuous shadow below or adjacent to the shelter.

Figure 9B:
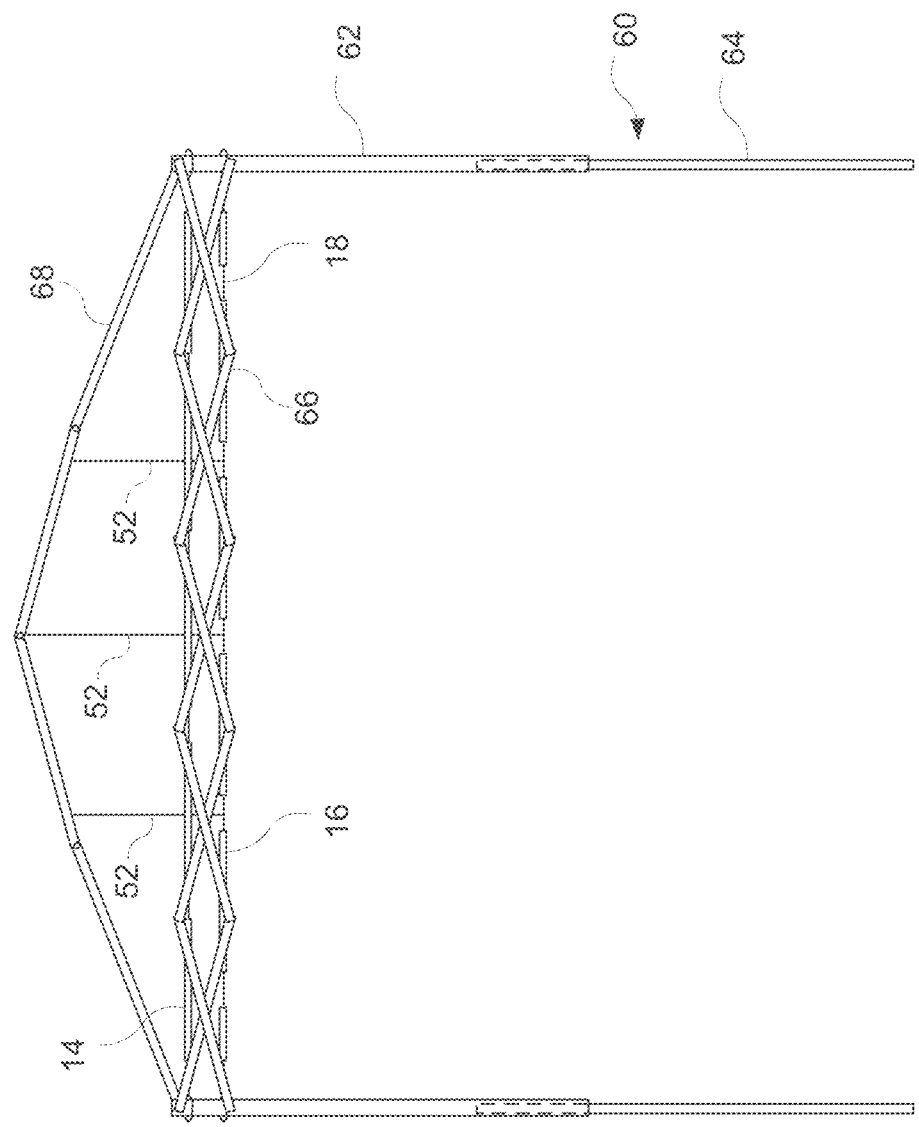
FIG. 9B is a side view of a shelter having a plurality of canopies, according to an exemplary embodiment of the invention, with a portion of the frame parts removed for clarity, and including one or more tethers.
Figure 10:
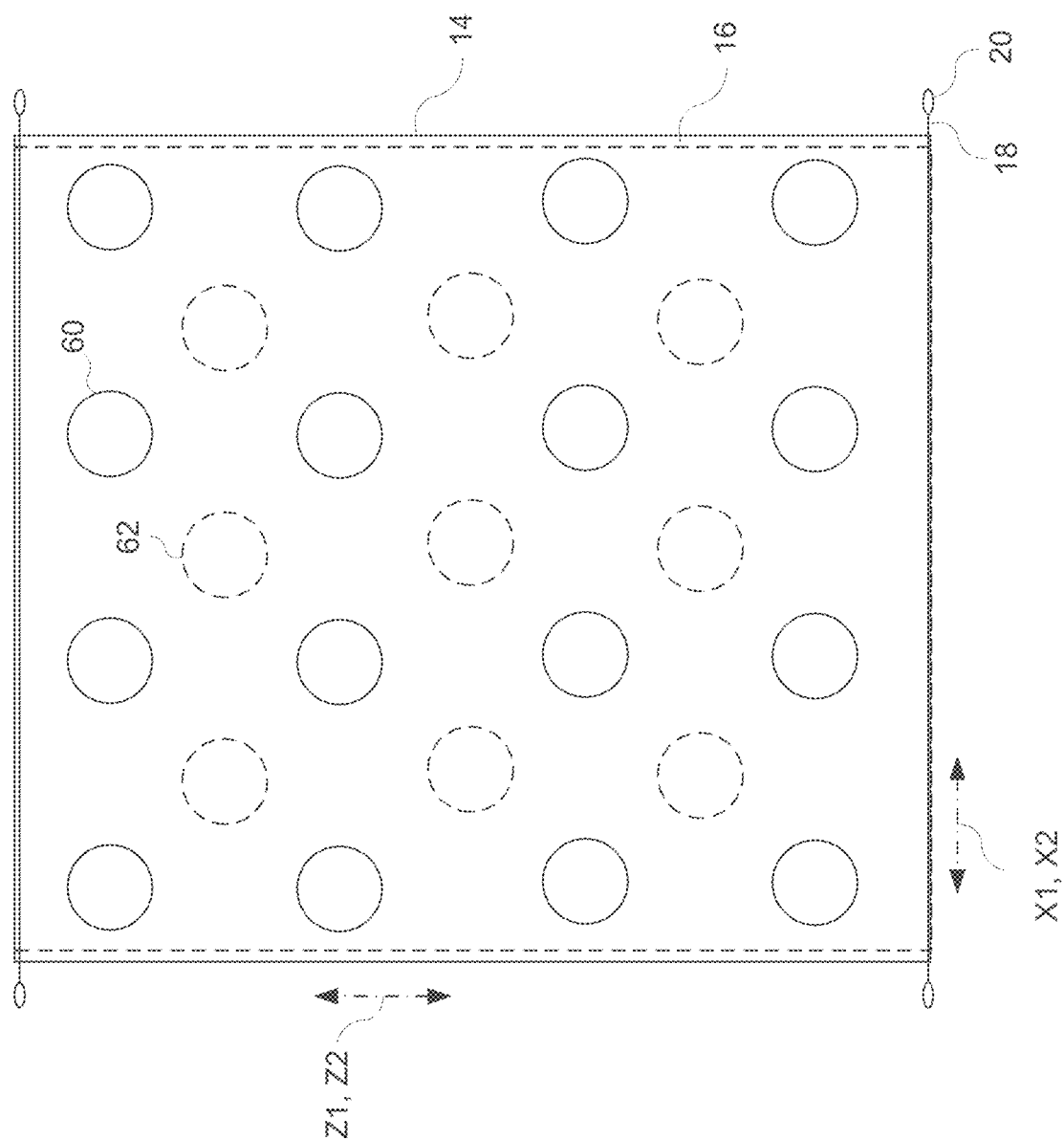
FIG. 10 is a plan view of a plurality of canopies for a portable shelter, according to an exemplary embodiment of the invention.
Figure 11:
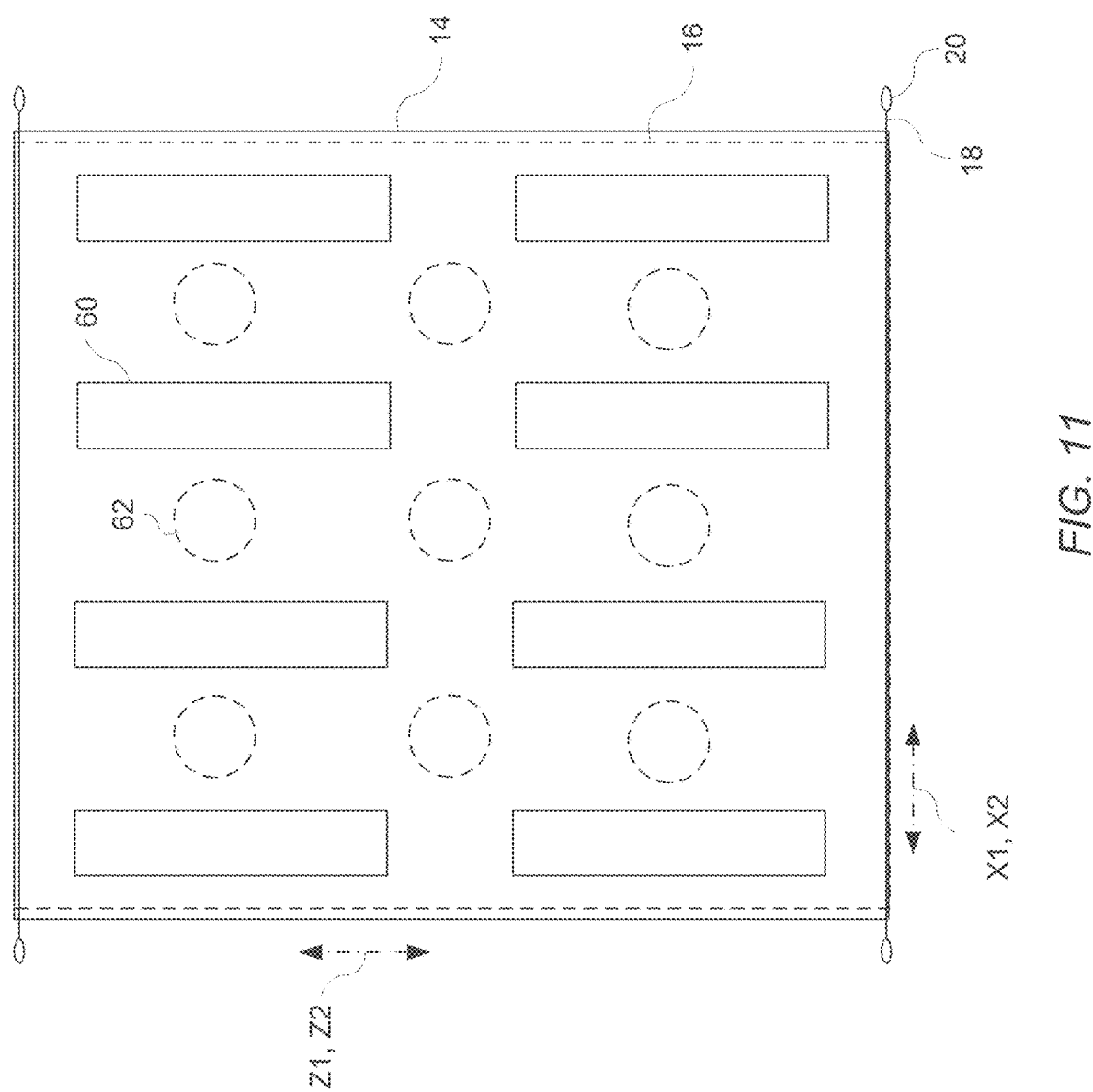
FIG. 11 is a plan view of a plurality of canopies for a portable shelter, according to another exemplary embodiment of the invention.
Figure 12:
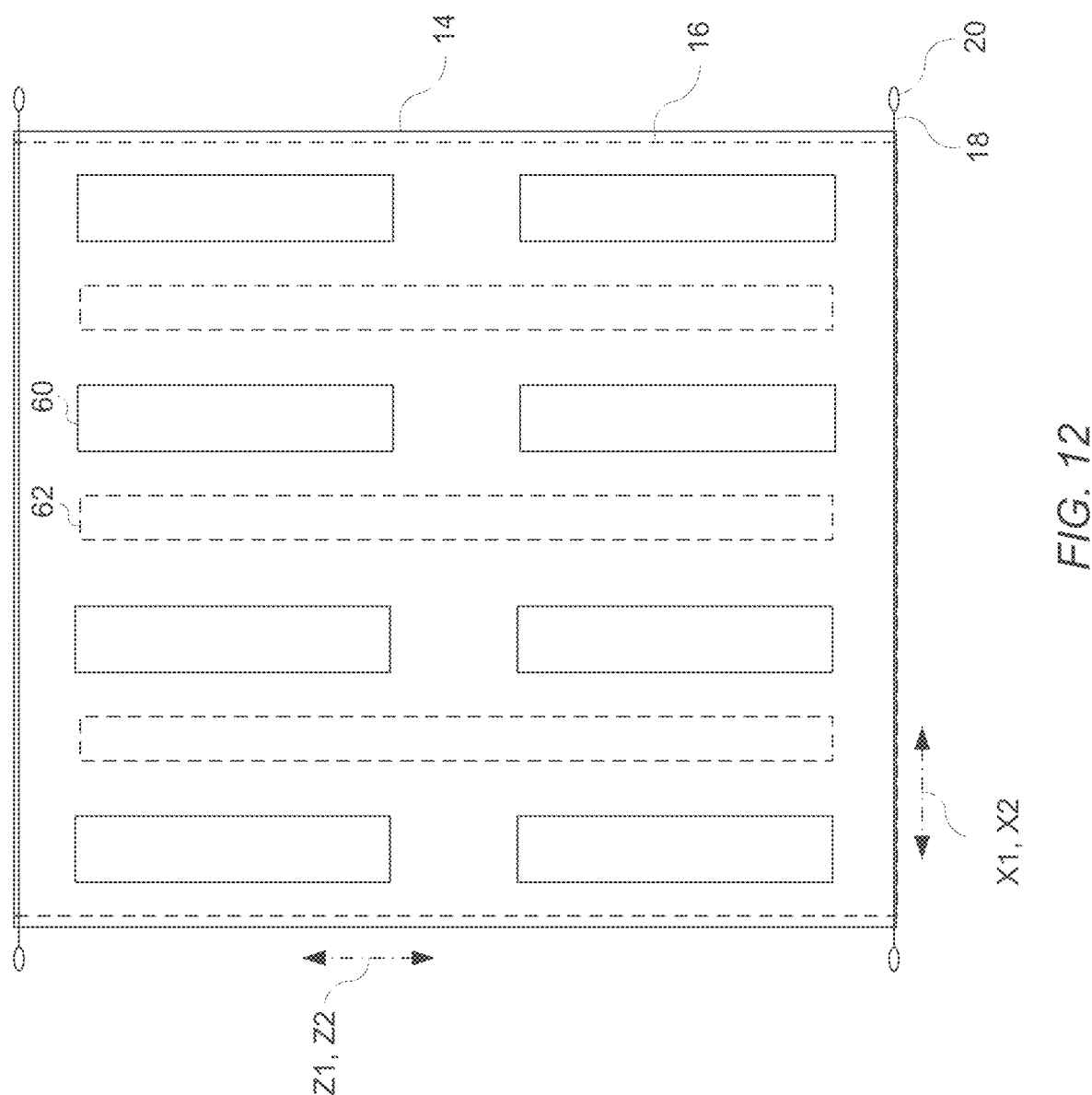
FIG. 12 is a plan view of a plurality of canopies for a portable shelter, according to another exemplary embodiment of the invention.
Figure 13:
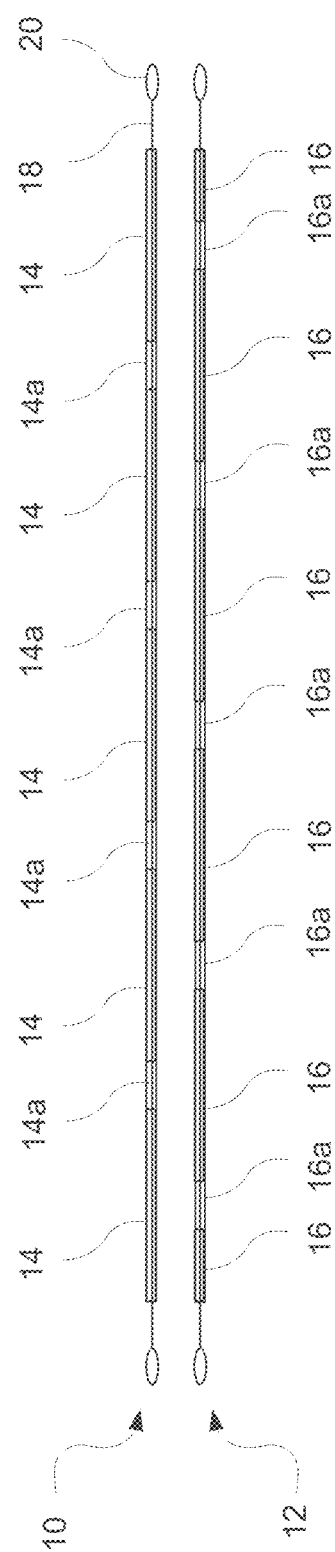
FIG. 13 is a first side view of the portable shelter having a plurality of canopies according to an exemplary embodiment of the invention.

With reference to FIG. 9B, one or more tethers 52 (e.g., connecting straps, bungee cords, ropes, etc.) can be coupled between a frame part 68 of the portable, collapsible frame 60 and one or both of the first canopy and the second canopy to provide support for interior areas of the canopy. As shown in FIG. 9B, if a canopy according to an embodiment of the present invention is installed on a frame 60 for a conventional canopy, which is configured to support a continuous panel in a pitched position, the upper parts 68 of the frame 60 can be used to secure an end of one or more tethers 52 to thereby suspend one or more of the plurality of canopies 10, 12 from the upper part 68 of the frame 60, thereby reducing a sagging appearance of the canopies 10, 12 when installed on the frame 60. In the illustrated example, the tethers 52 are illustrated as being arranged in a vertical direction. However, the tethers 52 can extend at an angle to one or more of the canopies. The tethers 52 can permit movement of one or more of the canopies 10, 12 in a vertical direction (e.g., a longitudinal direction of the frame leg 32) and/or a horizontal direction (e.g., X1, X2 or Z1, Z2) to block any sunlight that is not being blocked by another canopy, thereby enabling the canopy to cast a continuous shadow below or adjacent to the shelter.

As explained, the side profile of each canopy (e.g., 10, 12), or part (e.g., 14, 16, S2, S3) of each canopy, of the plurality of canopies is not limited to any particular size and/or shape either along a longitudinal length or profile of the part. A size and shape of each canopy, or part of each canopy, of the plurality of canopies can be selected such that each of the canopies blocks a portion of the direct sunlight from passing below the respective canopy, and such that the combination of the plurality of canopies cooperates to block all or a majority of direct sunlight from passing below the plurality of canopies, thereby providing a shaded area under and/or adjacent to the canopy while at the same time minimizing forces exerted on the canopy and/or canopy frame by the air flow (wind) over the canopy. With reference to the example in FIG. 10, the plurality of canopies 10, 12 can include a first, planar sheet 14 comprising having a plurality of first openings 60 and a second, planar sheet 16 having a plurality of second openings 62, wherein the first and second openings 60, 62 of each respective sheet 14, 16 are staggered such that the first and second openings 60, 62 do not coincide with each other. In this way, the canopies can cooperate to block all or a majority of direct sunlight from passing below the plurality of canopies, thereby providing a shaded area under and/or adjacent to the canopy, while at the same time, minimizing forces exerted on the canopy and/or canopy frame by the air (wind) flowing over the canopy by permitting air to flow in the vertical space between the first and second canopies and to flow through the first and second openings in one or both canopies. In the illustrated example, the first and second openings 60, 62 generally have the same size and shape. However, in other aspects, as shown for example in FIGS. 11 and 12, one or more of the openings 60, 62 in either or both canopies can have a different size and/or shape (e.g., circular, oval, square, rectangular, diamond, irregular, etc. Moreover, the openings 60, 62 can be configured to have a similar or corresponding pattern or different patterns on either or both of the canopies. In other embodiments, one or more of the openings 60, 62 can include a hood or flap (not shown), which can be either fixed or movable with respect to the canopy, to further block sunlight while permitting air to pass through the one or more openings.

With reference to FIGS. 13-17, 19, and 20 in another example, the plurality of canopies can include a first canopy 10 comprising a plurality of parallel planar panels 14 spaced apart from each other in a first direction (horizontal direction) to form a plurality of openings for permitting air to flow through the first canopy 10, and a second canopy 12 comprising a plurality of parallel planar panels 16 spaced apart from each other in the first direction (horizontal direction) to form a plurality of openings for permitting air to flow through the second canopy 12. The first canopy 10 and the second canopy 12 can include mesh panels, perforated panels, straps, bands, tethers, or the like (e.g., 14a, 16a) disposed between the plurality of parallel planar panels 14, 16, respectively, thereby providing additional stability to the panels 14, 16 while at the same time permitting air to flow through the openings between the panels 14, 16 of the canopies 10, 12.

The plurality of panels 14, 16 are illustrated as having planar panels. However, other aspects can include three-dimensional shaped profiles, such as tubulars, air foils, etc., separated by mesh panels, perforated panels, straps, bands, tethers, or the like (e.g., 14a, 16a). The plurality of panels 14, 16 can be the same or different sizes. One or more of the plurality of panels 14, 16 can be arranged parallel to each other, or at angles to each other.

Figure 14:
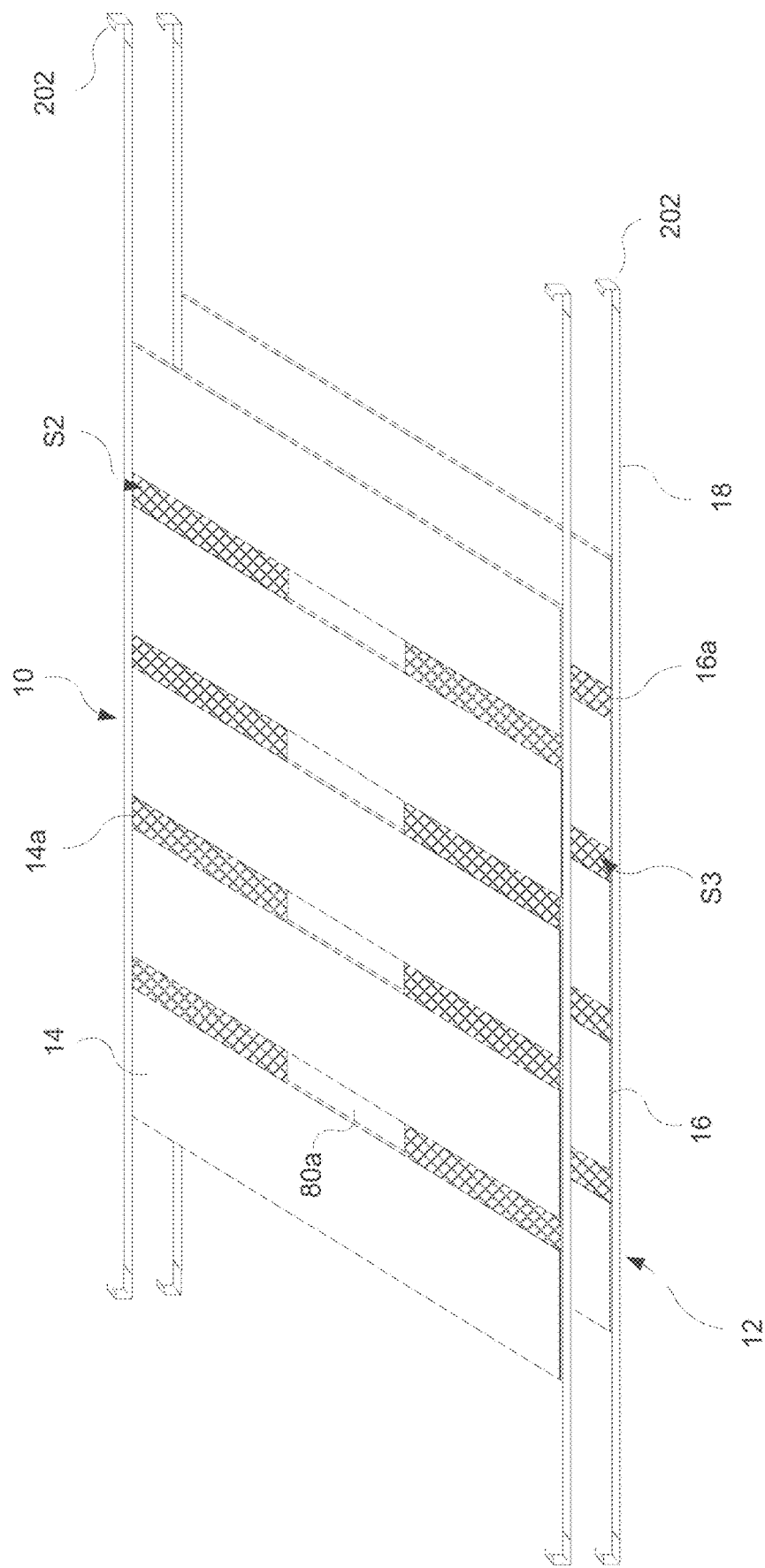
FIG. 14 is a perspective view of a plurality of canopies for a portable shelter, according to an exemplary embodiment of the invention.
Figure 15A:
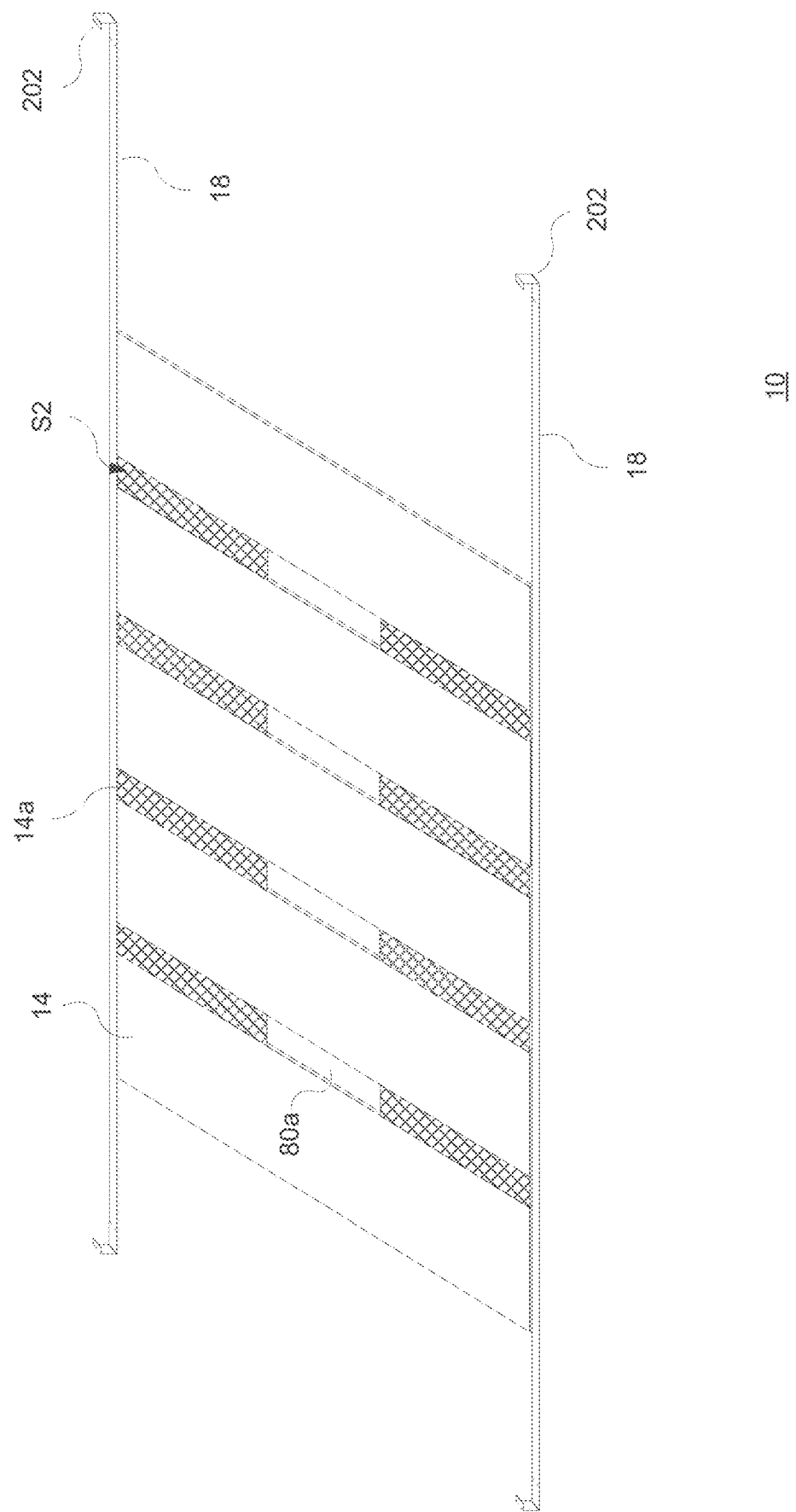
FIGS. 15A and 15B are perspective views of each of the individual canopies according to the exemplary embodiment of FIG. 14.
Figure 15B:
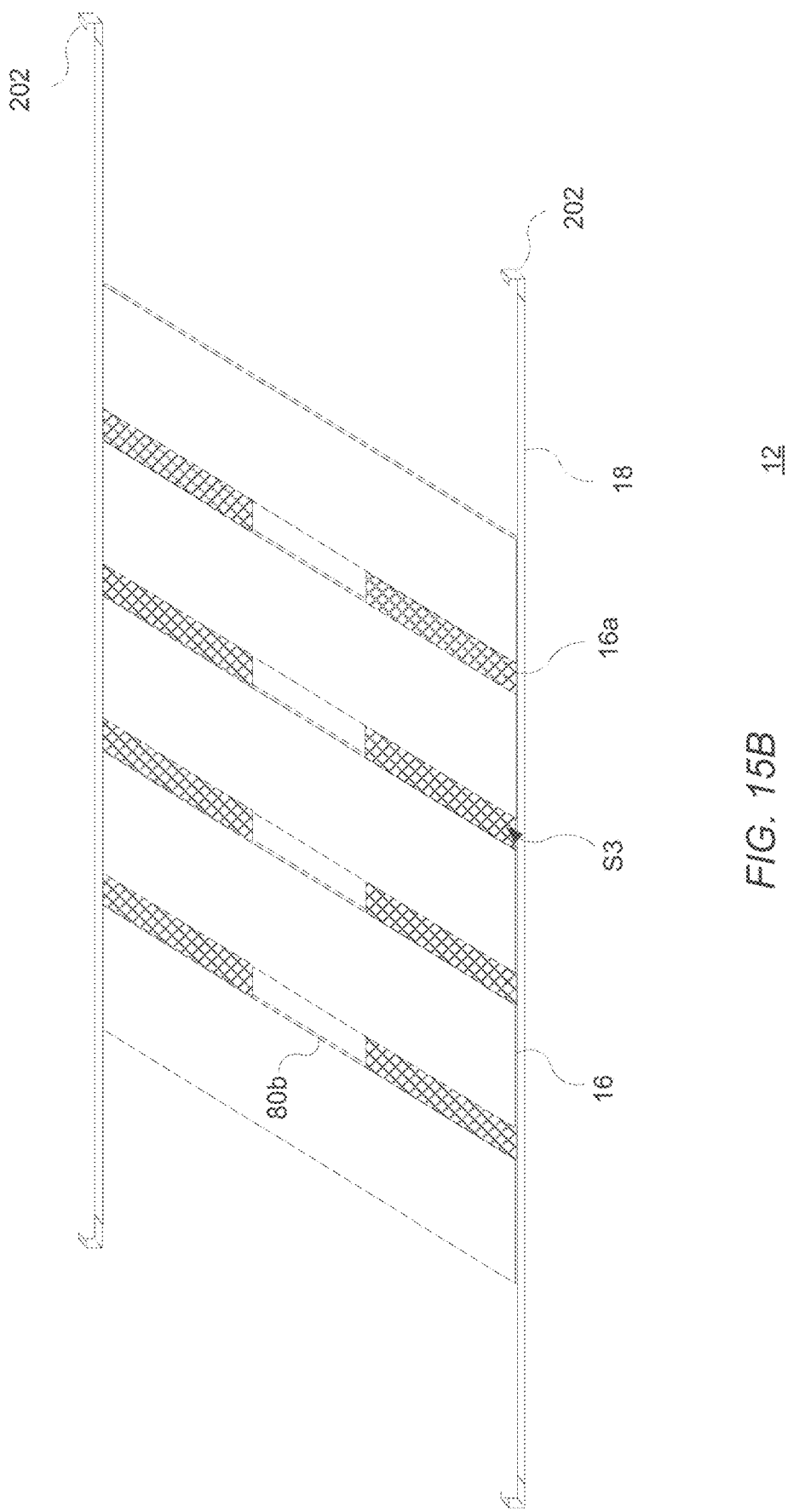

As illustrated in the example embodiment of FIGS. 14, 15A, and 15B, the first canopy 10 and/or the second canopy 12 can include one or more mesh panels, perforated panels, straps, bands, tethers, or the like (e.g., 14a, 16a) disposed in the one or more openings (e.g., S2, S3) between the plurality of parallel planar panels 14, 16, respectively, thereby providing additional stability to the panels 14, 16 while at the same time permitting air to flow through the openings (e.g., S2, S3) between the panels 14, 16 of the canopies 10, 12. For example, the one or more mesh panels, perforated panels, straps, bands, tethers, or the like (e.g., 14a, 16a) disposed in the one or more openings (e.g., S2, S3) between the plurality of parallel planar panels 14, 16, respectively, may reduce flapping of the panels 14, 16 with respect to each other and associate noise (e.g., chattering) resulting from the flow of air through the openings (e.g., S2, S3).

In some examples, the first canopy 10 and/or the second canopy 12 can include one or more gaps 80a, 80b between the mesh panels 14, 16, perforated panels, straps, bands, tethers, or the like (e.g., 14a, 16a) such that the panels 14, 16 are not fixed or coupled across the openings S2, S3 in those locations. In these examples, when air flows through the openings S2, S3 between the panels 14, 16 of the canopies 10, 12, the portions of the panels 14, 16 adjacent to the gap(s) 80a, 80b can be capable of naturally moving (e.g., flexing, curving, bowing, bulging, etc.) in a downstream direction of the airflow (e.g., moving upward or downward, depending on the direction of air flow), which may alter the air flow through the gap(s) 80a, 80b as compared to the air flow through the mesh panels 14a, 16a. For example, since the panels 14, 16 are not coupled across the openings S2, S3 at the locations of the gaps 80a, 80b, the distance between the panels 14, 16 across the openings S2, S3 at the locations of the gaps 80a, 80b is not rigidly fixed. During such flexing, bowing, etc. of the edges of the panels 14, 16 along the gaps 80a, 80b as a result of the air flow, the distance between the panels 14, 16 across the openings S2, S3 along the gaps 80 may be larger than the fixed distance across the openings S2, S3 along the mesh panels 14a, 16a, which may alter the characteristics of the air flow through the openings S2, S3 along the gaps 80a, 80b as compared to the characteristics of the air flow through the openings S2, S3 along the mesh panels 14a, 16a. For example, a larger volume of air may be capable of flowing through the gaps 80a, 80b as compared to through the mesh panels 14a, 16a, a velocity of the air flowing through the gaps 80a, 80b may differ from a velocity of the air flowing through the mesh panels 14a, 16a, a pressure of the air flowing through the gaps 80a, 80b may differ from a pressure of the air flowing through the mesh panels 14a, 16a, etc. The differences in characteristics of the air flowing through the gaps 80a, 80b as compared to through the mesh panels 14a, 16a may help to control and/or guide the air flow through the openings S2, S3 of the panels 14, 16.

Figure 16:
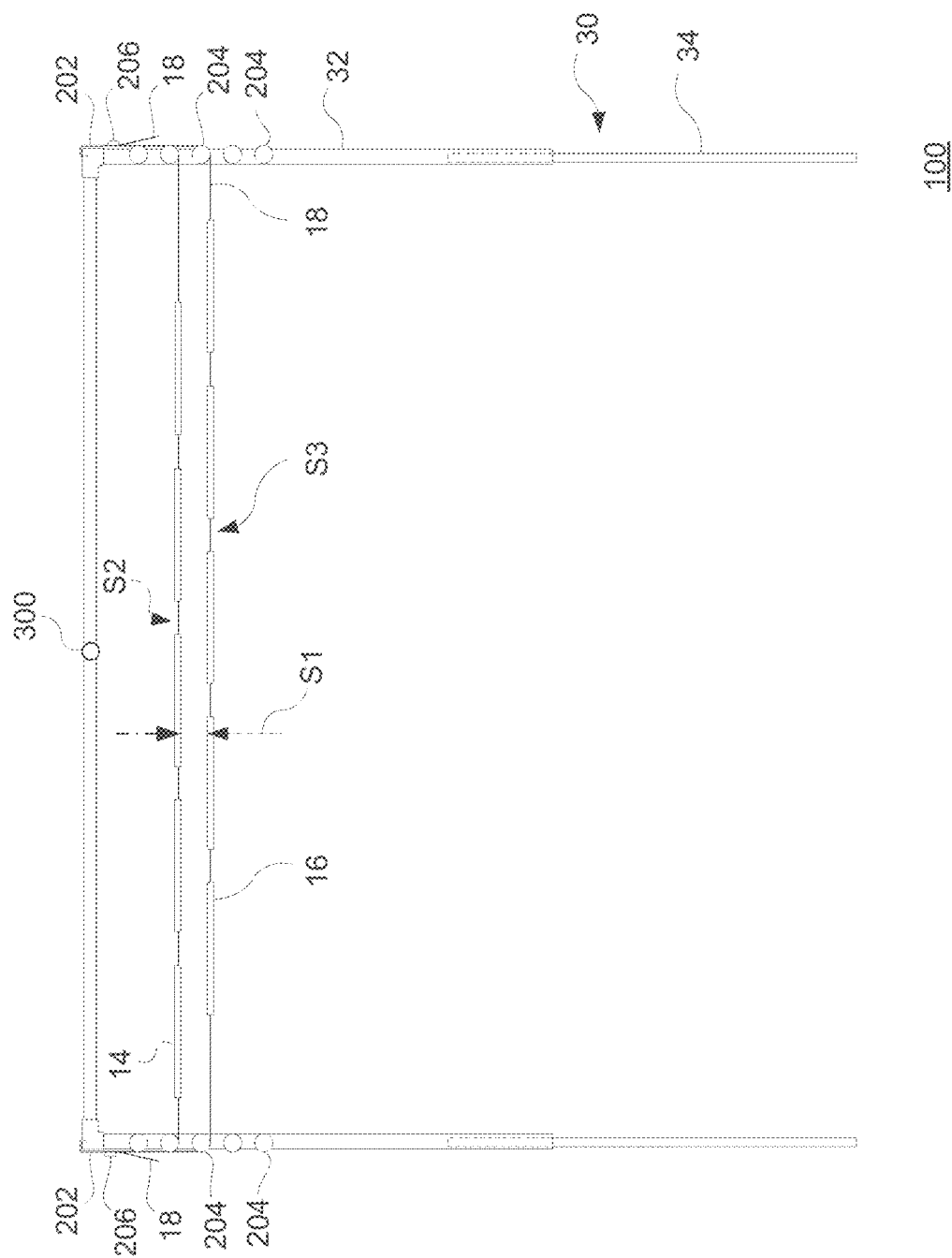
FIG. 16 is a side view of the portable shelter having a plurality of canopies according to an exemplary embodiment.
Figure 17:
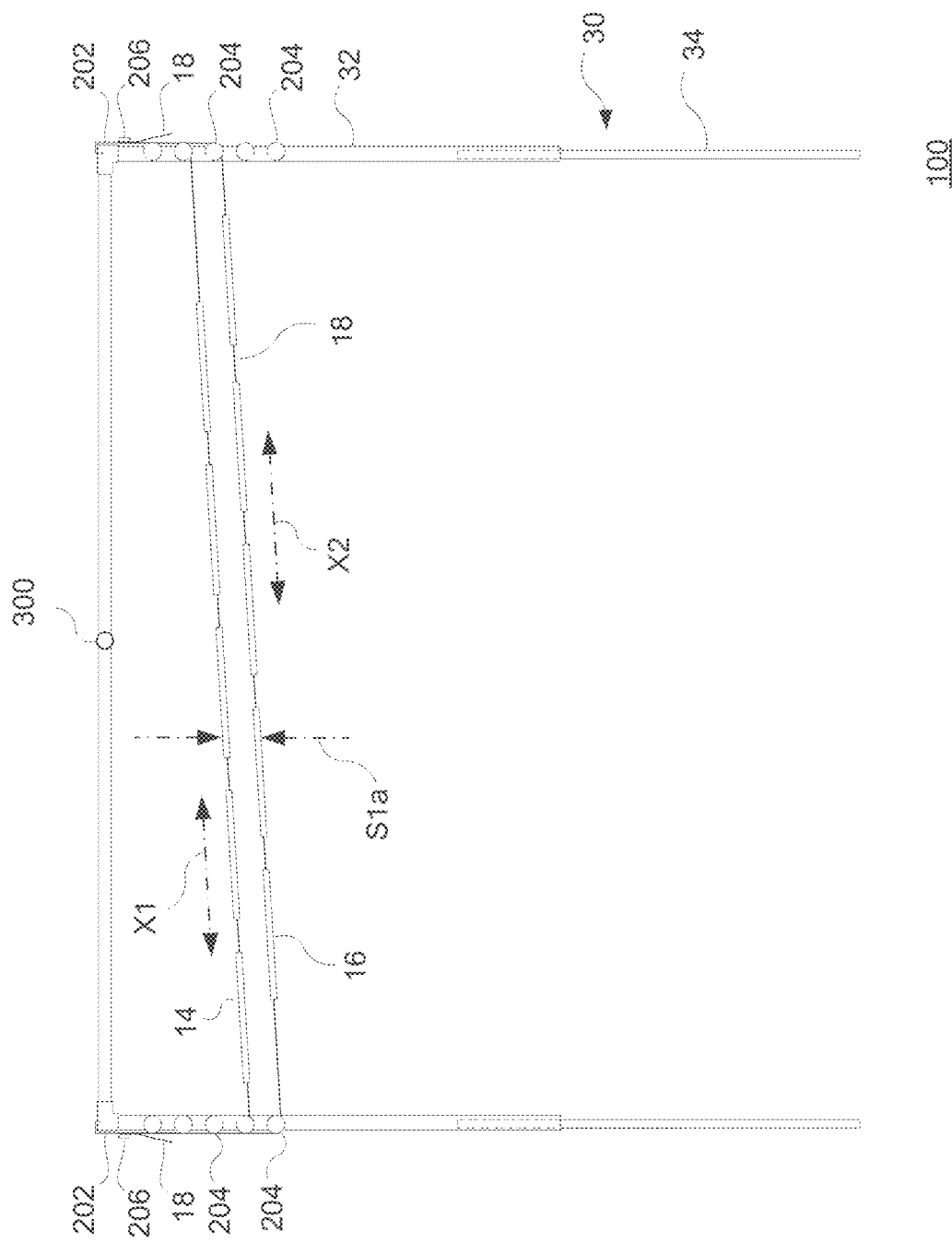
FIG. 17 is a side view of the portable shelter having a plurality of canopies according to an exemplary embodiment.
Figure 18B:
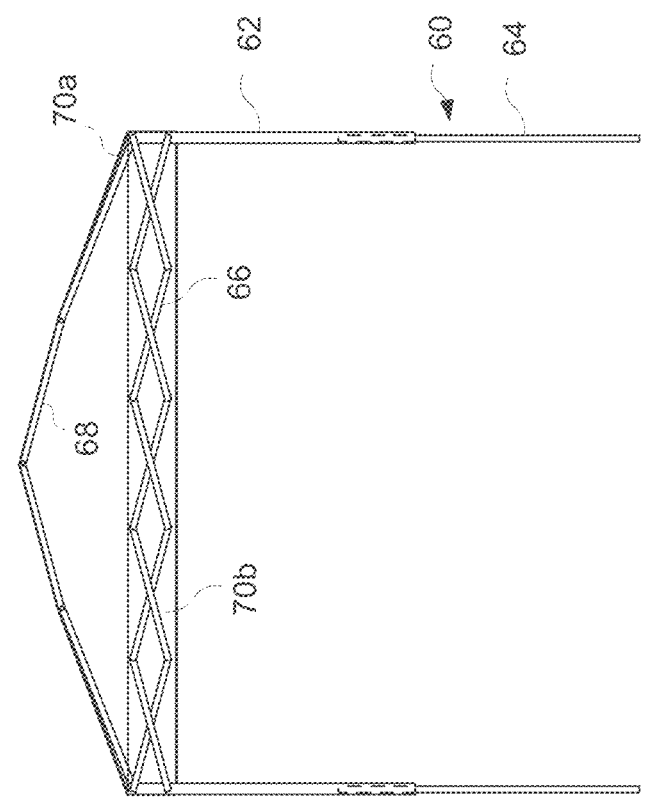
FIG. 18B is a cut-away side views of the conventional portable shelter of FIG. 18A.
Figure 18A:
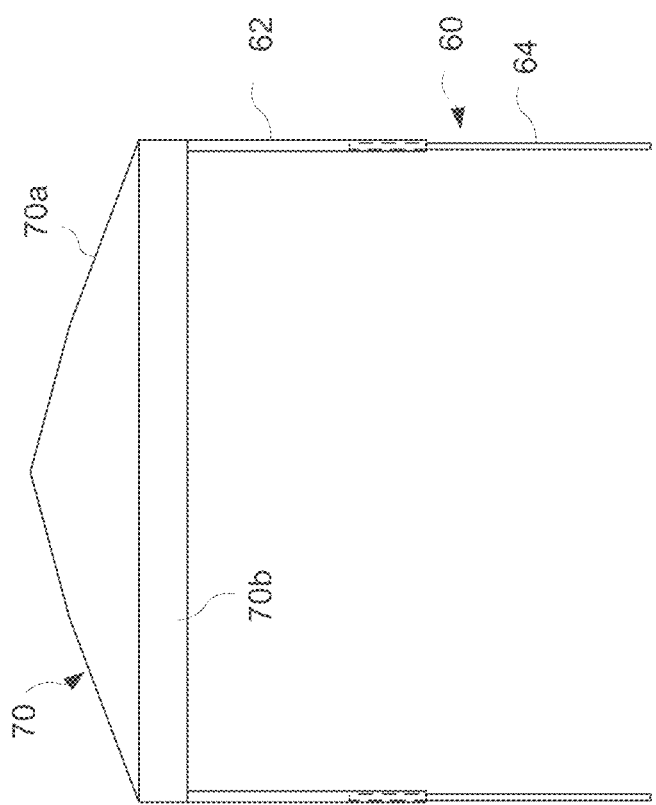
FIG. 18A is a side views of a conventional portable shelter.
Figure 19:
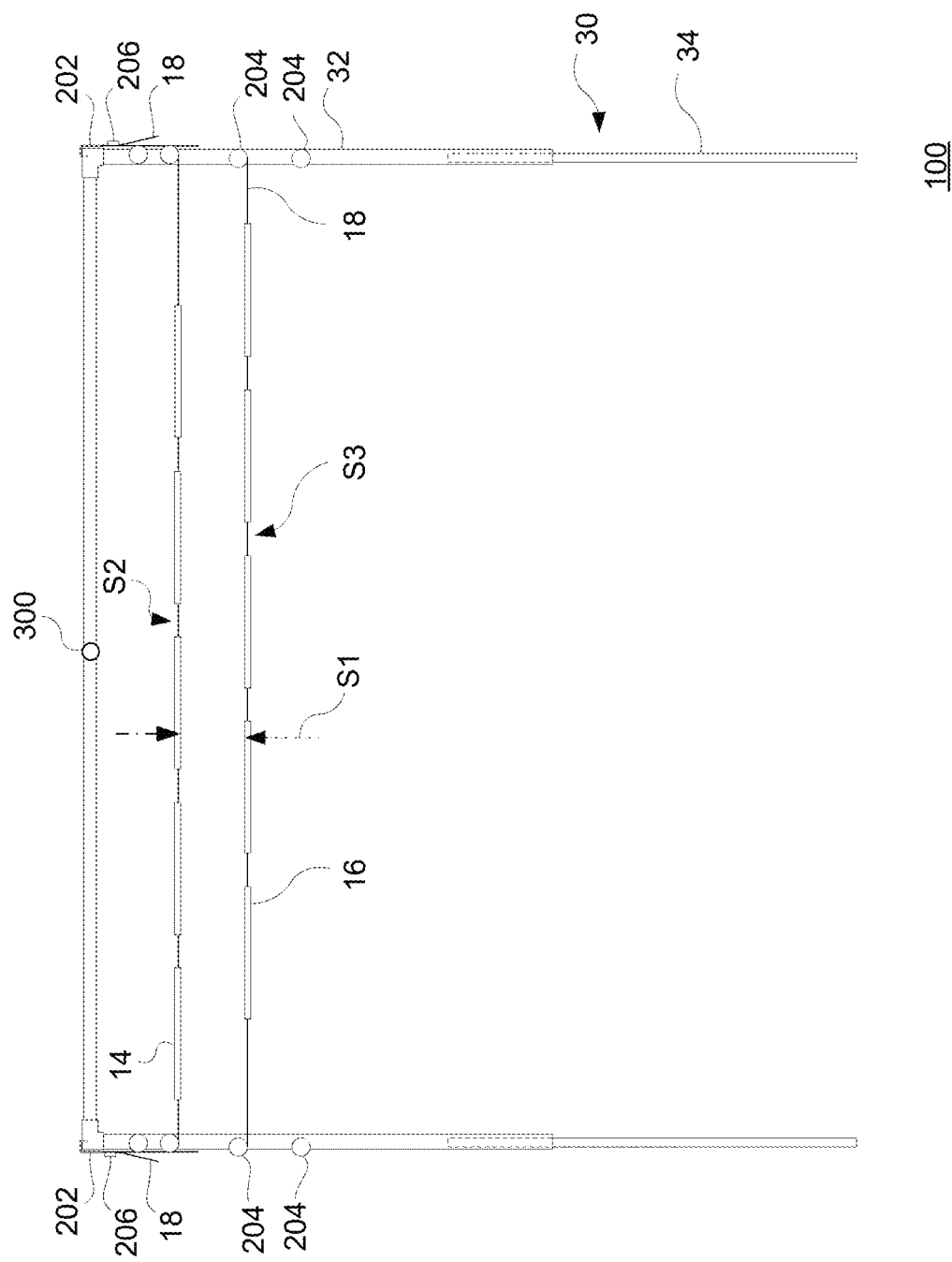
FIG. 19 is a side view of the portable shelter having a plurality of canopies according to an exemplary embodiment.
Figure 20:
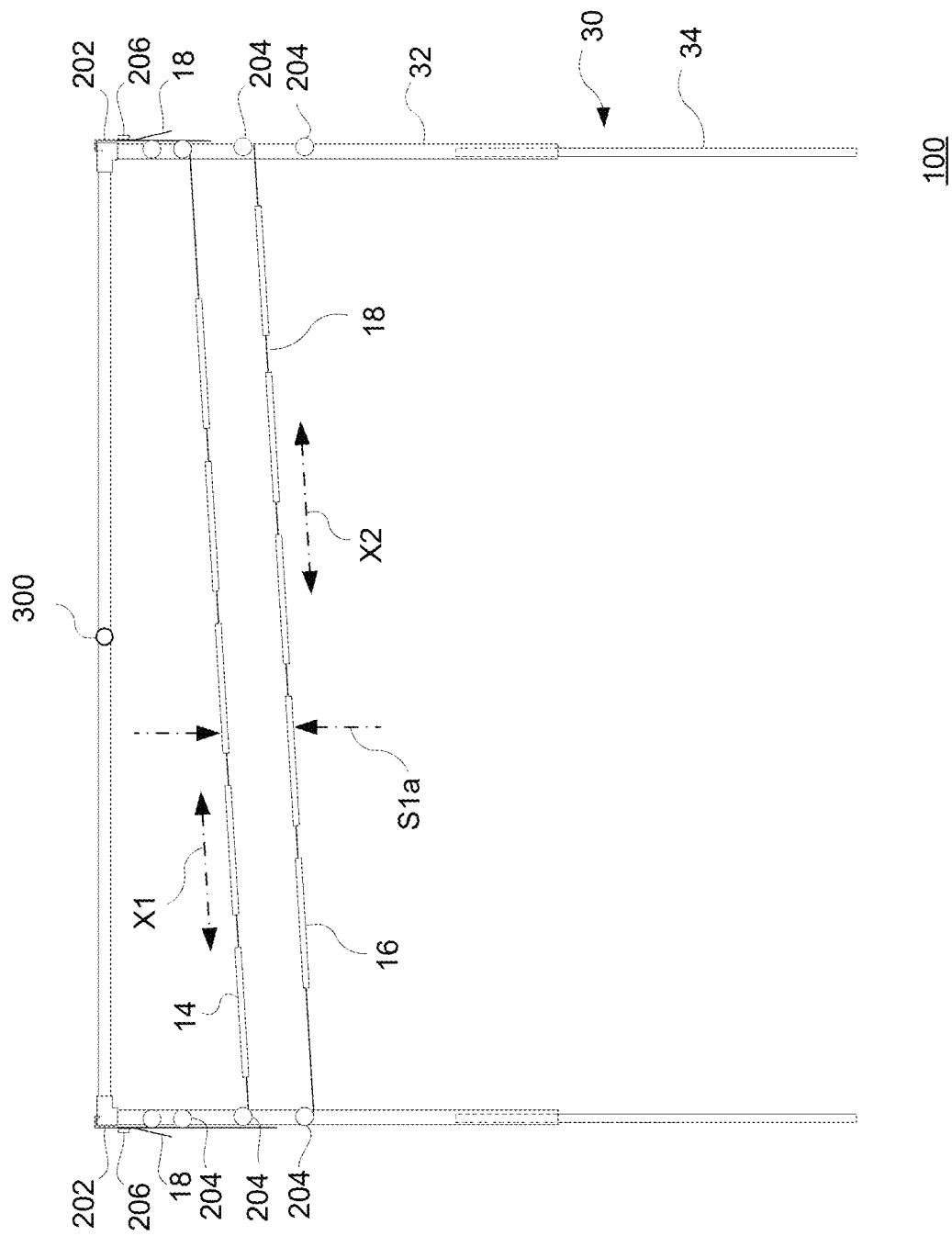
FIG. 20 is a side view of the portable shelter having a plurality of canopies according to an exemplary embodiment.

With reference again to the example embodiment of FIGS. 14, 15A, and 15B, as well as the example embodiments illustrated in FIGS. 16 and 17, the panels 14, 16 can include support lines 18 (e.g., wires, cables, resilient cords or bungee cords, ropes, straps, chains, etc.) configured to support or suspend each of the canopies 10, 12 from the frame 30. The lines 18 can be coupled to the frame 30 in a variety of ways. In some examples, a coupling system can be provided to couple the lines 18 to the frame 30 in various vertical height positions. A coupling system also can be configured to transfer forces exerted on the canopies 10, 12 by air flow (e.g., wind) to the legs 32, 34 of the frame 30, for example, in an axial direction of the legs 30 toward the ground, thereby increasing downforce on the portable shelter and offsetting various forces applied to the canopies 10, 12 by wind and improving stability of the portable shelter. Depending on a number of factors, the canopies 10, 12 may be subjected to various forces by the wind flowing over, under, and/or around the portable shelter, such as a speed, direction, and/or magnitude of the wind, wind gusts, as well as a vertical height position, angle, etc. of each of the canopies 10, 12, a spacing between the canopies 10, 12, among other things. In some instances, the canopies 10, 12 may be subject to an amount of lift forces owing to air flowing under the canopies 10, 12 and escaping upward through the openings S2, S3 in the panels 14, 16. In other instances, the canopies 10, 12 may be subject to an amount of down force owing to air flowing over the canopies 10, 12. In an example, a coupling system can transfer the lift forces and/or downforces exerted on the canopies 10, 12 to the legs 32, 34 of the frame 30, for example, in an axial direction of the legs 30 toward the ground.

For example, in the examples illustrated in FIGS. 16 and 17, the telescopic legs 32 of the frame 30 can include one or more guide elements 204 configured to guide or control a position of each respective end of the lines 18 with respect to the frame 30 and/or to change a direction of the line 18 with respect to the frame 30. For example, as shown in FIGS. 16 and 17, one or more guide elements 204 can be provided on each of the telescopic legs 32, 34 of the frame 30 and configured to selectively fix a height of each respective end of the lines 18 with respect to the frame 30 and to guide or control a position of a portion of the line 18 with respect to the frame 30. For example, one or more guide elements 204 can define a plurality of possible height positions for positioning a portion of the ends of the lines 18 with respect to each of the telescopic legs 32, 34 of the frame 30. In the example shown in FIGS. 16 and 17, the frame 30 includes five height positions for positioning and/or coupling each of the lines 18 with respect to the legs of the frame 30, which can provide a user with flexibility in selectively adjusting a height and/or angle of each of the canopies 10, 12 with respect to the frame 30, thereby enabling the user to independently select and optimize a position of each corner (e.g., line 18) of each of the canopies 10, 12 depending on various factors such as an angle of the sun, a direction and magnitude of the wind, etc. The number of height positions are not limited to any particular number. With reference to the examples in FIGS. 16, 17, 19, and 20, the vertical spacing between the guide elements 204 can be the same or different from each other to provide equal increments for selecting possible vertical height positions on the frame 30 or a variety of different increments for selecting possible vertical height positions on the frame 30.

In some examples, the one or more guide elements 204 can include one or more pulleys (e.g., rotatable wheel with a grooved rim configured to receive and guide the line 18) coupled to each of the telescopic legs 32, 34 of the frame 30 at different height locations. In other examples, the one or more guide elements 204 can include one or more fixed guides (e.g., fixed wheel, cylinder, protrusion, curved portion, or the like) coupled to each of the telescopic legs 32, 34 of the frame 30 at different height locations. In some examples, the one or more fixed guides can include, for example, a groove, flange, etc. for restricting or guiding a position of the line 18. In some examples, the one or more fixed guides can include, for example, a low friction surface for facilitating sliding of the line 18 around the surface of the fixed guide.

With reference again to the examples illustrated in FIGS. 16 and 17, each line 18 can include a securing device 202 at one or both ends of the line 18 that is configured to engage or secure the ends of the line 18 to the frame 30. In these examples, each securing device 202 can be configured to couple, engage, or secure the lines 18 to a top portion of each of the telescopic legs 32, 34 of the frame 30. The top portion of each telescopic leg 32 of the frame 30 can include an element for receiving the securing device 202, such as an opening, notch, protrusion, etc. One or more ends of the lines 18 can include an adjustment device for adjusting a length of the line 18 and securing the line 18 to the frame, such as a tether, cinching, or ratchet tie-down mechanism, or the like.

During set up or adjustment of the portable shelter, a user can position each end of each line 18 such that each line 18 is fitted around one of the guide elements 204 at a desired height position and then couple, engage, or secure each securing device 202 of each line 18 to a top portion of each respective telescopic leg 32 of the frame 30. The user then can cinch or ratchet each line 18 to tightly suspend each of the canopies 10, 12 from the frame 30. In this way, the canopies 10, 12 can be coupled to the frame 30 such that forces exerted on the canopies 10, 12 by air flow (e.g., wind) can be transferred via the lines 18 extending around the guide elements 204 and the securing devices 202 to the top or upper portions of the legs 32, 34 of the frame 30. As a result, the lift forces and/or downforces exerted on the canopies 10, 12 can be transferred to downward forces on the legs 32, 34 of the frame 30, for example, in an axial direction of the legs 30 toward the ground, thereby increasing downforce on the portable shelter and offsetting various forces applied to the canopies 10, 12 by wind and improving stability of the portable shelter.

In other examples, with reference to FIGS. 16 and 17, the frame 30 can include cross-bars 36 having a pivot point or hinge 300 such that the cross-bars 36 of the frame 30 are capable of being folded into smaller sections (e.g., in half). Upon collapsing the telescopic leg sections 32, 34 of the frame 30 and folding the cross-bars 36, the frame 30 can be collapsed for transporting or storing the portable shelter.

The portable shelter according to the invention can include one or more of the features of the described examples. One or more of the panels 14, 16 of the canopies 10, 12 can be formed from a material that is, for example, flexible, foldable, stretchable, etc., to enable the canopies 10, 12 to be easily collapsed and stowed for transporting to another location. One or more of the canopies 10, 12 can include a material or coating that blocks at least a portion of sunlight and/or UV rays, for example, such as canvas, nylon, or other fabric, etc. The panels can be supported by the support lines, or in other aspects, the panels can include a separate frame, an integral frame, a collapsible frame, etc., such as a plurality of frame pieces coupled together with resilient bands and configured to be collapsed.

For example, an exemplary embodiment is directed to a portable shelter for providing shade, the portable shelter comprising a portable, collapsible frame movable between a collapsed position and an extended position; and a plurality of canopies including at least a first canopy and a second canopy, wherein the first canopy is disposed at a higher level than the second canopy, wherein the first canopy is capable of being spaced apart from the second canopy in a vertical direction, and wherein each of the first canopy and the second canopy includes a plurality of openings configured to permit air to pass through the respective first canopy and second canopy in a direction that is substantially normal to a surface of the respective first canopy and second canopy.

An exemplary embodiment is directed to a portable shelter for providing shade, the portable shelter comprising a portable, collapsible frame movable between a collapsed position and an extended position; and a plurality of canopies including at least a first canopy and a second canopy, wherein the first canopy is disposed at a higher level than the second canopy, wherein a position of the first canopy is capable of being adjusted with respect to a position of the second canopy in a vertical direction to alter an amount of space between the first canopy and the second canopy in the vertical direction, and wherein each of the first canopy and the second canopy includes a plurality of openings configured to permit air to pass through the respective first canopy and second canopy in a direction that is substantially normal to a surface of the respective first canopy and second canopy.

In an exemplary embodiment, the first canopy and the second canopy extend across a top of the shelter. In an exemplary embodiment, a position of the first canopy with respect to a position of the second canopy is adjustable such that a space between the first canopy and the second canopy is adjustable. In an exemplary embodiment, the first canopy is moveable in a vertical direction with respect to the second canopy to adjust a space between the first canopy and the second canopy. In an exemplary embodiment, the first canopy is moveable in a horizontal direction with respect to the second canopy to adjust a lateral position of the first canopy with respect to the second canopy. In an exemplary embodiment, the plurality of openings in the first canopy are offset in a horizontal direction with respect to the plurality of openings in the second canopy. In an exemplary embodiment, the plurality of openings in the first canopy are not aligned in a vertical direction with respect to the plurality of openings in the second canopy. In an exemplary embodiment, the plurality of openings in the first canopy are offset with respect to the plurality of openings in the second canopy when viewed in a vertical direction. In an exemplary embodiment, the plurality of openings in the first canopy are not aligned in a horizontal direction with respect to the plurality of openings in the second canopy. In an exemplary embodiment, the plurality of canopies are horizontally disposed. In an exemplary embodiment, each of the plurality of canopies includes a plurality of panels. In an exemplary embodiment, each of the plurality of panels are fixed on a horizontal axis. In an exemplary embodiment, each of the plurality of panels are rotatable about a horizontal axis. In an exemplary embodiment, each of the plurality of panels are arranged in substantially a same horizontal plane. In an exemplary embodiment, a first panel of the plurality of panels of a first canopy is offset in a vertical direction from a second panel of the plurality of panels of a second canopy. In an exemplary embodiment, a first panel of the plurality of panels of a first canopy is offset in a horizontal direction from a second panel of the plurality of panels of a second canopy. In an exemplary embodiment, the plurality of canopies are alternately offset from each other in a vertical direction. In an exemplary embodiment, each of the plurality of panels includes a frame; and a flexible sheet of material supported on the frame. In an exemplary embodiment, each of the plurality of panels includes a flexible planar sheet of material. In an exemplary embodiment, the plurality of panels includes a plurality of planar panels. In an exemplary embodiment, the plurality of panels includes a plurality of tubulars. In an exemplary embodiment, at least one tubular of the plurality of tubulars includes a helical strake. In an exemplary embodiment, at least one tubular of the plurality of tubulars includes a plurality of helical strakes. In an exemplary embodiment, at least one tubular of the plurality of tubulars includes a fairing. In an exemplary embodiment, at least one tubular of the plurality of tubulars is rotatable about an axis of the at least one tubular. In an exemplary embodiment, the plurality of panels includes a plurality of air foils. In an exemplary embodiment, at least one air foil of the plurality of air foils is rotatable about an axis of the at least one air foil. In an exemplary embodiment, the plurality of panels are separated by the plurality of openings. In an exemplary embodiment, the portable shelter includes an air permeable mesh panel in the plurality of openings. Another exemplary embodiment is directed to a portable shelter for providing shade, the portable shelter comprising a portable, collapsible frame movable between a collapsed position and an extended position; and a plurality of canopies supported on the frame in a layered arrangement, wherein a position of at least one of the portable canopies is separately and independently adjustable with respect to a position of another of the portable canopies in at least one of a vertical direction and a horizontal direction, wherein at least two of the plurality of canopies includes a plurality of openings configured to permit air to pass through each respective canopy, and wherein the plurality of openings of adjacent canopies are not aligned with each other.

Another exemplary embodiment is directed to a canopy system for a portable shelter for providing shade, the canopy system comprising a plurality of canopies configured to be supported on a portable, collapsible frame in a layered arrangement, wherein a position of at least one of the portable canopies is separately and independently movable with respect to a position of another of the portable canopies in at least one of a vertical direction and a horizontal direction, wherein at least two of the plurality of canopies includes a plurality of openings configured to permit air to pass through each respective canopy, and wherein the plurality of openings of adjacent canopies are not aligned with each other.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. An adjustable shade shelter for providing shade, the adjustable shade shelter comprising:
   a support frame including a plurality of vertical legs, wherein a leg of the plurality of legs has a first vertical height;
   a plurality of canopies, wherein at least one of the plurality of canopies of the plurality of canopies includes a plurality of openings that permit air to pass through a part of the at least one canopy; and
   a coupling system configured to couple a first canopy of the plurality of canopies to the support frame at a plurality of adjustable vertical height positions with respect to the support frame such that the first canopy of the plurality of canopies can be disposed at different vertical height positions with respect to the support frame.

2. The adjustable shade shelter of claim 1, wherein the coupling system is configured to couple each canopy of the plurality of canopies to the support frame at a vertical height position that is below the first vertical height of the leg.

3. The adjustable shade shelter of claim 1, wherein at least two canopies of the plurality of canopies includes a plurality of openings configured to permit air to pass through each respective canopy, and
   wherein the plurality of openings of the at least two canopies are not aligned with each other.

4. The adjustable shade shelter of claim 1, wherein at least a part of the support frame is at least one of foldable or collapsible or a combination thereof.

5. The adjustable shade shelter of claim 1, wherein each vertical height position of the plurality of vertical height positions is equally spaced from a next successive vertical height position along a vertical direction.

6. The adjustable shade shelter of claim 1, wherein a first spacing between at least two successive vertical height positions of the plurality of vertical height positions is different from a second spacing between at least two other successive vertical height positions of the plurality of vertical height positions.

7. The portable shelter of claim 1, wherein the coupling system comprises:
   a first support line in communication with the first canopy of the plurality of canopies,
   wherein the coupling system is configured to couple the first support line to the portable support frame at the plurality of vertical height positions with respect to the portable support frame such that the first canopy of the plurality of canopies can be adjusted to different vertical height positions with respect to the portable support frame.

8. The portable shelter of claim 7, wherein the coupling system comprises:
   a securing device on the first support line;
   an element on the portable support frame configured to receive the securing device of the first support line; and
   a plurality of guide elements on the portable support frame, each of the plurality of guide elements being disposed at one of the plurality of vertical height positions with respect to the portable support frame and configured to guide a portion of the first support line.

9. The adjustable shade shelter of claim 8, wherein the plurality of guide elements includes at least one of a pulley wheel or a fixed guide element or a combination thereof.

10. The adjustable shade shelter of claim 8, wherein, when engaged with a guide element of the plurality of guide elements, a first portion of the first support line on a first side of the guide element extends in a first direction and a second portion of the first support line on a second side of the guide element extends in a second direction that is different from the first direction.

11. The adjustable shade shelter of claim 8, wherein the element is located at a top portion of a leg of the support frame.

12. The adjustable shade shelter of claim 7, wherein the first support line includes an adjustment device for adjusting a length of the first support line.

13. The adjustable shade shelter of claim 7, wherein the coupling system is configured to couple the first support line to the support frame at the plurality of vertical height positions on one leg of the plurality of vertical legs.

14. The adjustable shade shelter of claim 7, wherein the coupling system is configured to couple the first support line to the support frame such that the first canopy of the plurality of canopies is disposed at a different vertical height position on the support frame than a second canopy of the plurality of canopies.

15. The adjustable shade shelter of claim 7, further comprising:
   a second support line in communication with a second canopy of the plurality of canopies,
   where the coupling system is configured to couple the first support line and the second support line to the support frame at the plurality of vertical height positions with respect to the support frame such that the first canopy and the second canopy of the plurality of canopies can be adjusted to different vertical height positions with respect to the support frame.

16. The adjustable shade shelter of claim 15, wherein the coupling system comprises:
   a first securing device on the first support line;
   a second securing device on the second support line;
   an element on the support frame configured to receive at least one of the first securing device of the first support line or second securing device of the second support line or a combination thereof;
   a plurality of guide elements on the support frame, each of the plurality of guide elements being disposed at one of the plurality of vertical height positions with respect to the support frame and configured to guide a portion of at least one of the first support line or the second support line or a combination thereof.

17. The adjustable shade shelter of claim 16, wherein a portion of the first support line is engaged with a first guide element of the plurality of second guide elements and a portion of the second support line is engaged with a second guide element of the plurality of second guide elements such that the first canopy of the plurality of canopies is disposed at a different vertical height position on the support frame than the second canopy of the plurality of canopies.

18. The adjustable shade shelter of claim 17, wherein the element on the support frame is configured to receive both the first securing device of the first support line and the second securing device of the second support line at the same time.

19. A shelter for providing shade, the shelter comprising:
a portable support frame including a plurality of vertical legs, wherein a leg of the plurality of legs has a first vertical height;
a plurality of canopies supported on the portable frame in a layered arrangement, wherein a first canopy of the plurality of canopies is disposed at a different level of the layered arrangement than a second canopy of the plurality of canopies,
 wherein a position of at least one of the first canopy or the second canopy is adjustable with respect to a position of the other of the first canopy or the second canopy in at least one of a vertical direction or a horizontal direction or a combination thereof,
 wherein at least two of the plurality of canopies includes a plurality of openings configured to permit air to pass through each respective canopy, and
 wherein the plurality of openings of adjacent canopies of the plurality of canopies are not aligned with each other; and
a coupling system configured to couple the first canopy of the plurality of canopies to the portable support frame at a plurality of adjustable vertical height positions with respect to the portable support frame such that the first canopy of the plurality of canopies can be disposed at different vertical height positions with respect to the portable support frame.

20. A canopy system for a shelter for providing shade, the canopy system comprising:
a plurality of canopies configured to be supported on a frame of a shelter in a layered arrangement, wherein at least two canopies of the plurality of canopies includes a plurality of openings configured to permit air to pass through each respective canopy; and
a coupling system configured to couple a first canopy of the plurality of canopies to the frame at a plurality of adjustable vertical height positions with respect to the frame such that the first canopy of the plurality of canopies can be disposed at different vertical height positions with respect to the support frame and such that a position of at least one canopy of the plurality of canopies is capable of being offset with respect to a position of another canopy of the plurality of canopies in at least one of a vertical direction or a horizontal direction or a combination thereof.

* * * * *